US011913359B1

(12) United States Patent
Einwaechter et al.

(10) Patent No.: US 11,913,359 B1
(45) Date of Patent: Feb. 27, 2024

(54) NOZZLE AIRFOIL PROFILE WITH ELLIPTICAL TRAILING EDGE

(71) Applicant: GE Infrastructure Technology, LLC, Greenville, SC (US)

(72) Inventors: James Robert Einwaechter, Greenville, SC (US); Matthew Scott Lutz, Simpsonville, SC (US); Michael John Williams, Jr., Taylors, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/216,692

(22) Filed: Jun. 30, 2023

(51) Int. Cl.
F01D 9/04 (2006.01)

(52) U.S. Cl.
CPC ........ F01D 9/041 (2013.01); *F05D 2240/122* (2013.01); *F05D 2250/14* (2013.01); *F05D 2250/74* (2013.01)

(58) Field of Classification Search
CPC .............. F01D 9/047; F05D 2240/122; F05D 2240/304; F05D 2250/14; F05D 2250/71; F05D 2250/74
See application file for complete search history.

(56) References Cited

U.S. PATENT DOCUMENTS

| 6,398,489 | B1* | 6/2002 | Burdgick ................ F01D 5/141 415/115 |
| 6,503,054 | B1 | 1/2003 | Bielek et al. |
| 7,837,445 | B2* | 11/2010 | Benjamin ............. F01D 25/285 416/DIG. 2 |
| 8,876,485 | B2 | 11/2014 | Gustafson et al. |
| 10,161,255 | B2 | 12/2018 | Brozyna et al. |
| 10,221,710 | B2 | 3/2019 | Winn et al. |
| 10,247,006 | B2 | 4/2019 | Holloway et al. |
| 11,306,735 | B2 | 4/2022 | Pierre et al. |
| 2017/0226878 | A1 | 8/2017 | Brozyna et al. |
| 2018/0320537 | A1 | 11/2018 | Ristau et al. |

* cited by examiner

*Primary Examiner* — Courtney D Heinle
*Assistant Examiner* — Danielle M. Christensen
(74) *Attorney, Agent, or Firm* — James Pemrick; Charlotte Wilson; Hoffman Warnick LLC

(57) ABSTRACT

The disclosure provides a nozzle adapted for placement within a flowpath of a turbomachine. The nozzle includes an airfoil having a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region. An endwall is connected with the root region or the tip region of the airfoil along the suction side, the pressure side, the trailing edge, and the leading edge. The trailing edge of the airfoil has an elliptical shape having a nominal profile substantially in accordance with Cartesian coordinate values of X, Y, and Z set forth in TABLE I.

20 Claims, 10 Drawing Sheets

NOZZLE AIRFOIL PROFILE WITH ELLIPTICAL TRAILING EDGE

FIELD

The subject matter disclosed herein relates to turbomachines. More particularly, the subject matter disclosed herein relates to a nozzle structure airfoil profile with an elliptical trailing edge.

BACKGROUND

Some jet aircraft and simple or combined cycle power plant systems employ turbines, or so-called turbomachines, in their configuration and operation. Some of these turbines employ airfoils (e.g., turbine nozzles, blades, airfoils, etc.), which during operation are exposed to fluid flows. These airfoils are configured to aerodynamically interact with the fluid flows and to generate energy from these fluid flows as part of power generation. For example, airfoils may be used to create thrust, to convert kinetic energy to mechanical energy, and/or to convert thermal energy to mechanical energy. As a result of this interaction and conversion, the aerodynamic characteristics of these airfoils, including those of nozzle structures at each stage of a turbine section, may result in losses affecting system and turbine operation, performance, thrust, efficiency, and power.

BRIEF DESCRIPTION

All aspects, examples and features mentioned below can be combined in any technically possible way.

An aspect of the disclosure provides a nozzle structure adapted for placement within a flowpath of a turbomachine, the nozzle structure including: an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region; and an endwall connected with the root region or the tip region of the airfoil along the suction side, the pressure side, the trailing edge, and the leading edge, wherein the trailing edge of the airfoil has an elliptical shape having a nominal profile substantially in accordance with Cartesian coordinate values of X, Y, and Z set forth in TABLE I, wherein the Cartesian coordinate values are non-dimensional values of from 0% to 100% convertible to distances by multiplying values by a height of the airfoil expressed in units of distance, and wherein X and Y values connected by arcs define airfoil profile sections at each distance Z along at least a portion of the airfoil, the profile sections at the Z distances being joined with each other to form the nominal profile.

Another aspect of the disclosure includes any of the preceding aspects, and wherein the nozzle structure is within a stationary vane of the turbomachine.

Another aspect of the disclosure includes any of the preceding aspects, and wherein the nozzle structure is a first stage blade.

Another aspect of the disclosure includes any of the preceding aspects, and further including a fillet connecting a surface of the endwall to a surface of the airfoil.

Another aspect of the disclosure includes any of the preceding aspects, and wherein the shape having the nominal profile substantially in accordance with the Cartesian coordinate values of X, Y, and Z in TABLE I includes the airfoil profile sections defined within approximately 5% and approximately 95% of the height of the airfoil.

Another aspect of the disclosure includes any of the preceding aspects, and wherein the shape having the nominal profile substantially in accordance with the Cartesian coordinate values of X, Y, and Z in TABLE I includes the airfoil profile sections defined within approximately 10% and approximately 90% of the height of the airfoil.

Another aspect of the disclosure includes any of the preceding aspects, and wherein each of the suction side and the pressure side of the airfoil has a shape having a respective nominal profile substantially in accordance with Cartesian coordinate values of X, Y and Z set forth in TABLE I, wherein the Cartesian coordinate values are non-dimensional values of from 0% to 100% convertible to distances by multiplying the values by the height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the respective nominal profiles.

An aspect of the disclosure includes a turbine section for a turbomachine, the turbine section including: at least one nozzle structure having: an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region; and an endwall connected with the root region or the tip region of the airfoil along the suction side, the pressure side, the trailing edge, and the leading edge, wherein the trailing edge of the airfoil has an elliptical shape having a nominal profile substantially in accordance with Cartesian coordinate values of X, Y, and Z set forth in TABLE I, wherein the Cartesian coordinate values are non-dimensional values of from 0% to 100% convertible to distances by multiplying values by a height of the airfoil expressed in units of distance, and wherein X and Y values connected by arcs define airfoil profile sections at each distance Z along at least a portion of the airfoil, the profile sections at the Z distances being joined with each other to form the nominal profile.

Another aspect of the disclosure includes any of the preceding aspects, and wherein the turbine section is a first stage of the turbomachine.

Another aspect of the disclosure includes any of the preceding aspects, and further including a fillet connecting a surface of the endwall to a surface of the airfoil.

Another aspect of the disclosure includes any of the preceding aspects, and wherein the shape having the nominal profile substantially in accordance with the Cartesian coordinate values of X, Y, and Z in TABLE I includes the airfoil profile sections defined within approximately 5% and approximately 95% of the height of the airfoil.

Another aspect of the disclosure includes any of the preceding aspects, and wherein the shape having the nominal profile substantially in accordance with the Cartesian coordinate values of X, Y, and Z in TABLE I includes the airfoil profile sections defined within approximately 10% and approximately 90% of the height of the airfoil.

Another aspect of the disclosure includes any of the preceding aspects, and wherein each of the suction side and the pressure side of the airfoil has a shape having a respective nominal profile substantially in accordance with Cartesian coordinate values of X, Y and Z set forth in TABLE I, wherein the Cartesian coordinate values are non-dimensional values of from 0% to 100% convertible to distances by multiplying the values by the height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the respective nominal profiles.

An aspect of the disclosure includes a turbine including a plurality of nozzle structures, each of the plurality of nozzle structures including: a nozzle structure within a flowpath of the turbine, the nozzle structure including: an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region; and an endwall connected with the root region or the tip region of the airfoil along the suction side, the pressure side, the trailing edge, and the leading edge, wherein the trailing edge of the airfoil has an elliptical shape having a nominal profile substantially in accordance with Cartesian coordinate values of X, Y, and Z set forth in TABLE I, wherein the Cartesian coordinate values are non-dimensional values of from 0% to 100% convertible to distances by multiplying values by a height of the airfoil expressed in units of distance, and wherein X and Y values connected by arcs define airfoil profile sections at each distance Z along at least a portion of the airfoil, the profile sections at the Z distances being joined with each other to form the nominal profile.

Another aspect of the disclosure includes any of the preceding aspects, and wherein the plurality of nozzle structures is disposed in a first stage of the turbomachine.

Another aspect of the disclosure includes any of the preceding aspects, and further including a fillet connecting a surface of the endwall to a surface of the airfoil.

Another aspect of the disclosure includes any of the preceding aspects, and wherein the shape having the nominal profile substantially in accordance with the Cartesian coordinate values of X, Y, and Z in TABLE I includes the airfoil profile sections defined within approximately 5% and approximately 95% of the height of the airfoil.

Another aspect of the disclosure includes any of the preceding aspects, and wherein the shape having the nominal profile substantially in accordance with the Cartesian coordinate values of X, Y, and Z in TABLE I includes the airfoil profile sections defined within approximately 10% and approximately 90% of the height of the airfoil.

Another aspect of the disclosure includes any of the preceding aspects, and further including an internal cooling circuit defined within the nozzle structure, Another aspect of the disclosure includes any of the preceding aspects, and wherein each of the suction side and the pressure side of the airfoil has a shape having a respective nominal profile substantially in accordance with Cartesian coordinate values of X, Y and Z set forth in Table I, wherein the Cartesian coordinate values are non-dimensional values of from 0% to 100% convertible to distances by multiplying the values by the height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the respective nominal profiles.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
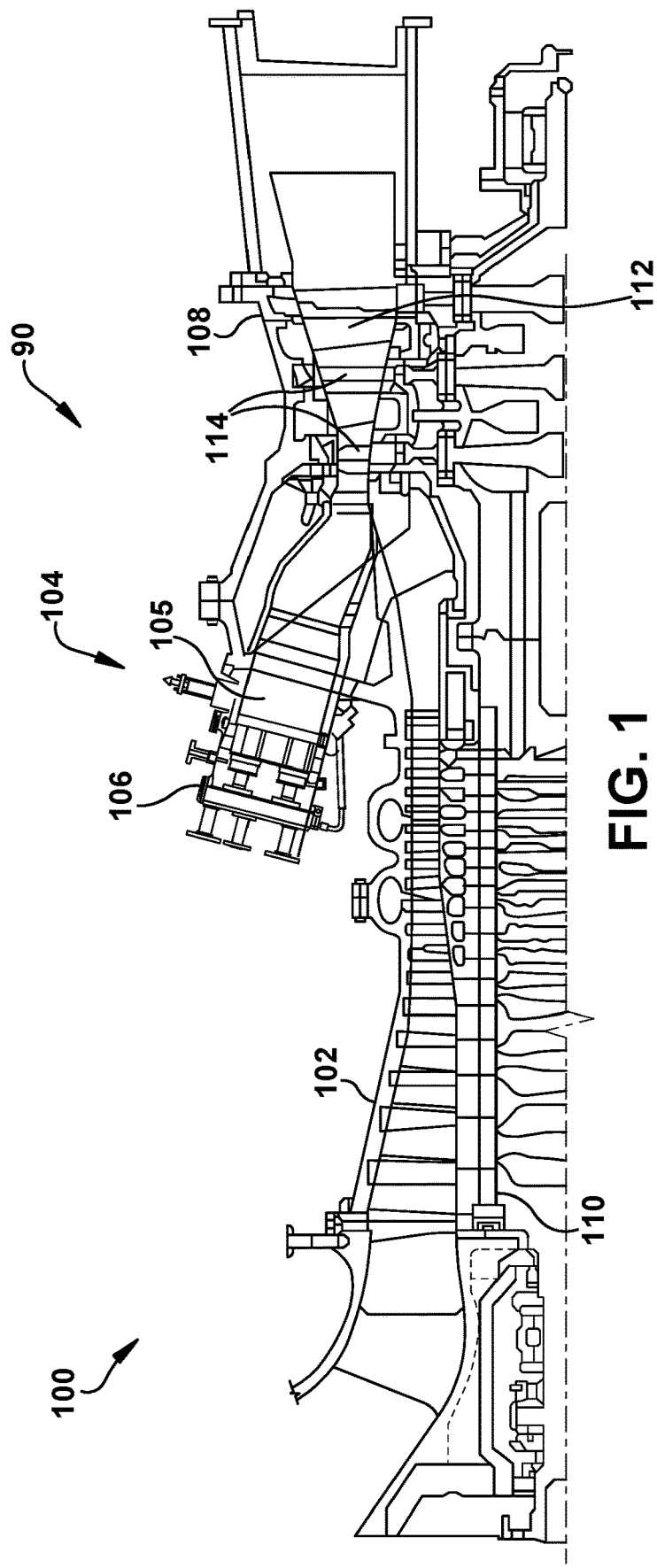
FIG. 1 shows a schematic cross-sectional side view of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first," "second," and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described element or feature may or may not be present, and that the description includes instances where the element or feature is present and instances where it is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As noted herein, various aspects of the disclosure are directed toward turbine nozzles. Various embodiments include a turbine nozzle having: an airfoil having an airfoil shape having a nominal profile substantially in accordance with at least a portion of Cartesian coordinate values of X, Y and Z set forth in TABLE I. The Cartesian coordinate values are non-dimensional values of from 0% to 100% convertible to distances by multiplying the values by a height of the airfoil expressed in units of distance. The X and Y values are connected by smooth continuing arcs that define airfoil profile sections at each distance Z along at least a portion of the airfoil, and the airfoil profile sections at the Z distances are joined smoothly with one another to form the nominal airfoil profile. As referenced herein, the origin of the X, Y, Z coordinate system is defined as: for the X direction, an end of the trailing edge of the airfoil; for the Y direction, the center of gravity of the airfoil; and for the Z direction, the innermost span of the airfoil. In the X-Y plane, a positive coordinate indicates a point downstream from the origin within the flowpath and a negative value indicates a direction upstream from the origin, opposite that of the positive direction.

Embodiments of a nozzle structure according to the disclosure are shaped to include, among other things, an elliptical trailing edge in its airfoil profile. Such geometrical features of the nozzle structure, during operation, may assist a turbomachine in meeting aerodynamic performance targets in particular operating conditions, particularly with respect to interaction between stages of the turbomachine. Embodiments of the disclosure also can be internally cooled to extend the lifespan of individual nozzle structures and/or interconnected components.

Referring to the drawings, FIG. 1 is a schematic view of an illustrative turbomachine 90 in the form of a combustion turbine or gas turbine (GT) system 100 (hereinafter "GT system 100"). GT system 100 includes a compressor 102 and a combustor 104. Combustor 104 includes a combustion region 105 and a fuel nozzle assembly 106. GT system 100 also includes a turbine 108 (e.g., an expansion turbine) and a common compressor/turbine shaft 110 (hereinafter referred to as "rotor 110"). In one embodiment, GT system 100 is a 7HA.03 engine, commercially available from General Electric Company, Greenville, S.C. The present disclosure is not limited to any one particular GT system and may be utilized in connection with other engines including, for example, the other HA, F, B, LM, GT, TM and E-class engine models of General Electric Company and engine models of other companies. Further, the teachings of the disclosure are not necessarily applicable to only a GT system and may be applied to other types of turbomachines, e.g., steam turbines, jet engines, compressors, etc.

Figure 2:
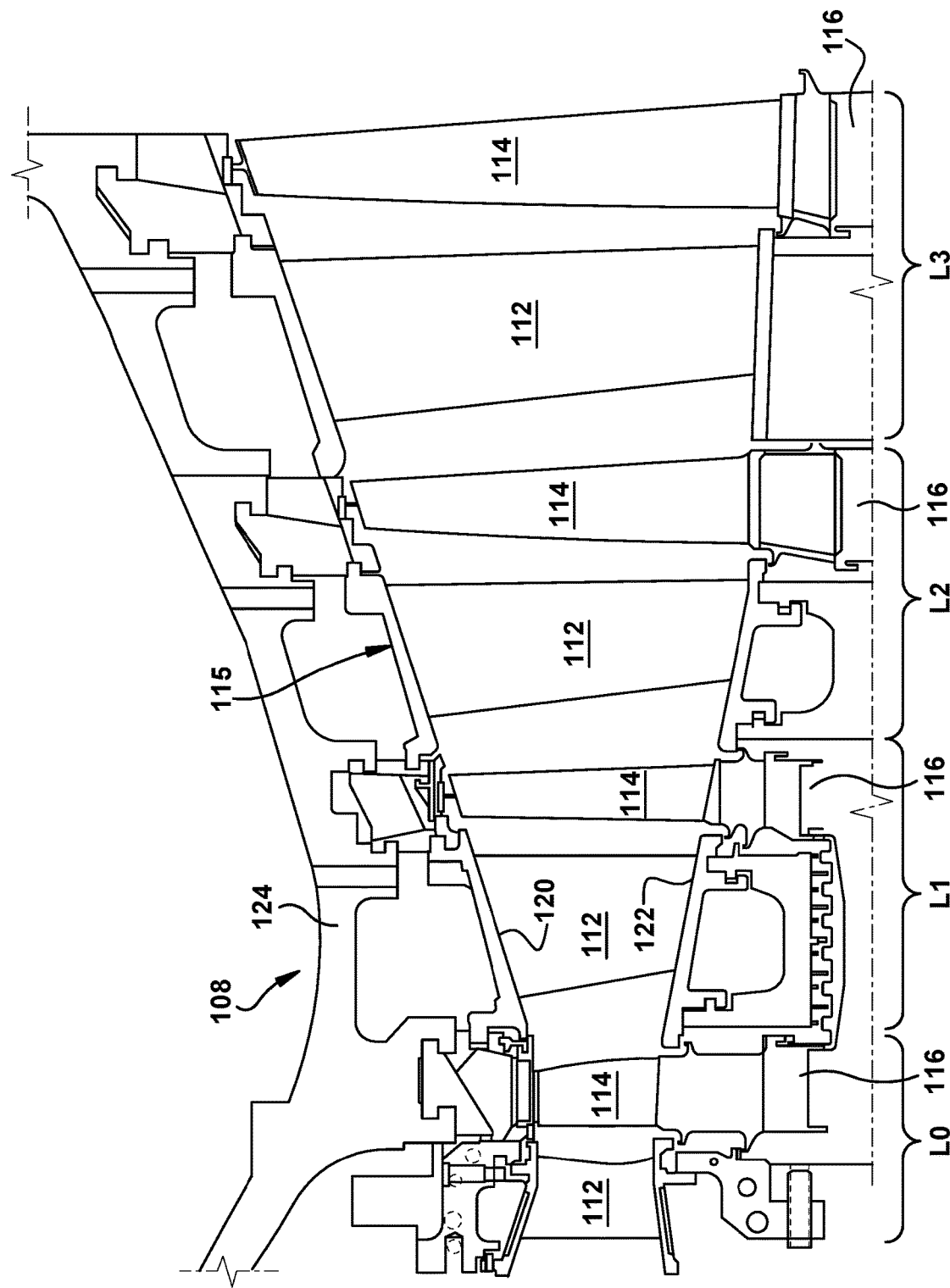
FIG. 2 shows a cross-sectional view of an illustrative turbine section with four stages that may be used with the turbomachine of FIG. 1.

FIG. 2 shows a cross-section view of an illustrative portion of turbine 108 with four stages L0-L3 that may be used with GT system 100 in FIG. 1. The four stages are referred to herein as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one example only, and each turbine may have more or less than four stages.

Figure 3:
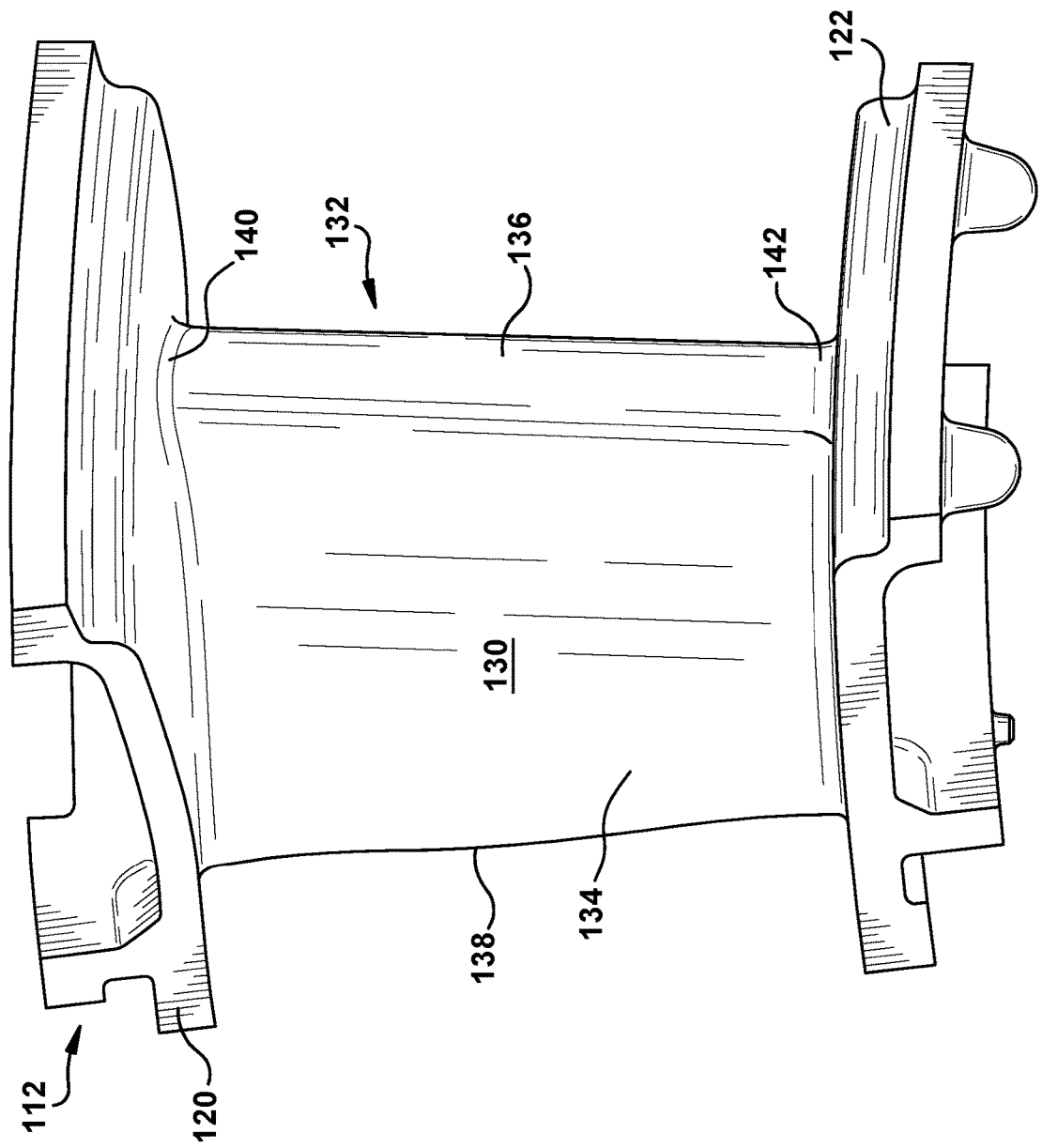
FIG. 3 shows a first perspective view of a nozzle structure in a turbine section according to various embodiments of the disclosure.

A set of nozzle structures (sometimes known as or included within "stationary vanes") 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor 110. That is, a plurality of rotating blades 114 are mechanically coupled in a circumferentially spaced manner to each rotor wheel 116. A static section 115 includes a plurality of nozzle structures 112 circumferentially spaced around rotor 110. Each nozzle structure 112 may include at least one endwall (or platform) 120, 122 connected with airfoil 130 (FIG. 3). In the example shown, nozzle structure 112 includes a radially outer endwall 120 and a radially inner endwall 122. Radially outer endwall 120 couples nozzle structure(s) 112 to a casing 124 of turbine 108.

In operation, air flows through compressor 102, and compressed air is supplied to combustor 104. Specifically, the compressed air is supplied to fuel nozzle assembly 106 that is integral to combustor 104. Fuel nozzle assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 within which gas stream thermal energy is converted to mechanical rotational energy. Turbine 108 is rotatably coupled to and drives rotor 110. Compressor 102 is also rotatably coupled to rotor 110. In the illustrative embodiment, there is a plurality of combustors 104 and fuel nozzle assemblies 106. In the following discussion, unless otherwise indicated, only one of each component will be discussed. At least one end of rotor 110 may extend axially away from turbine 108 and may be attached to a load or machinery (not shown) such as, but not limited to, a generator, a load compressor, and/or another turbine.

Figure 4:
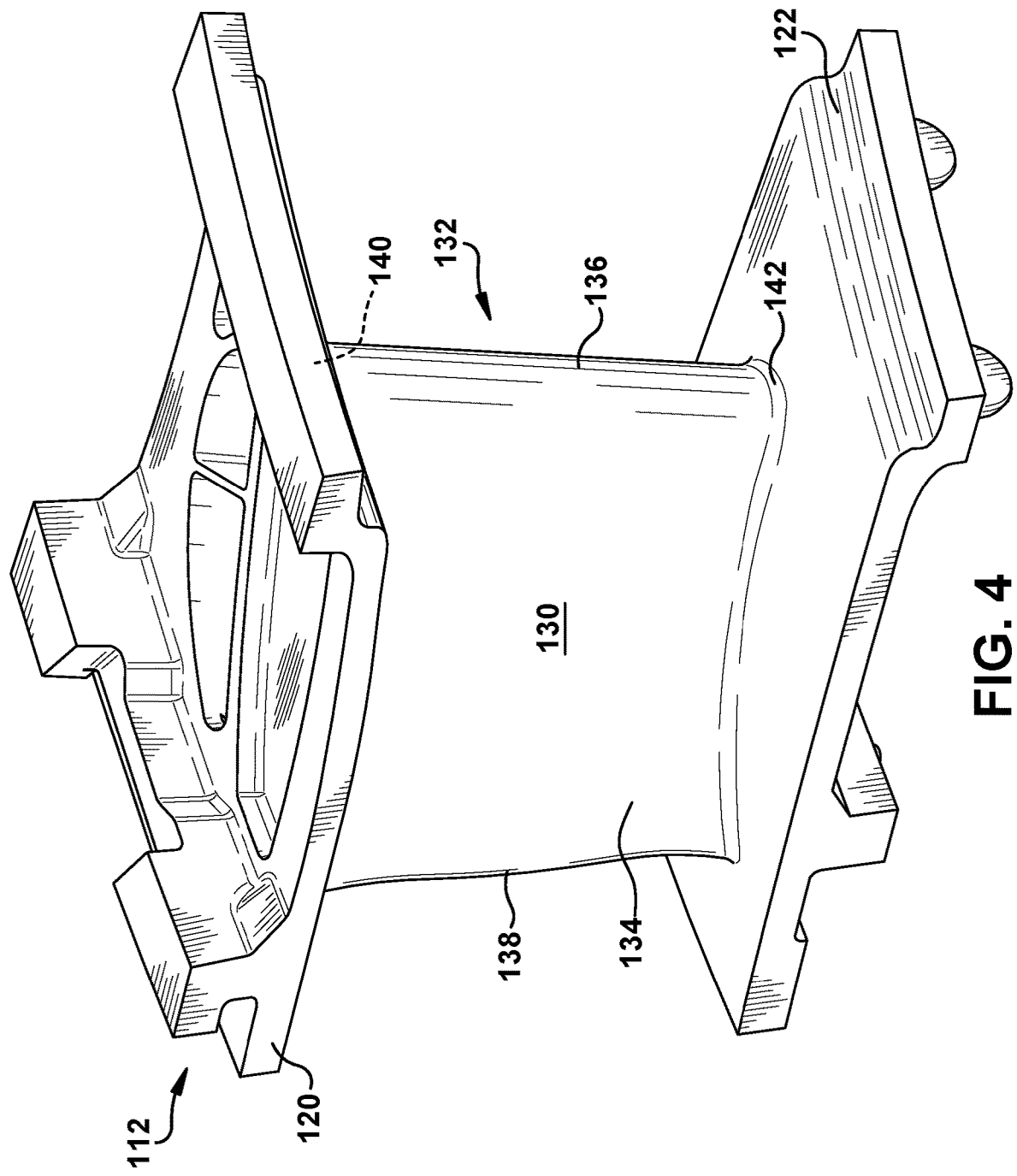
FIG. 4 shows a second perspective view of a nozzle structure in a turbine section according to various embodiments of the disclosure.

Turning to FIGS. 3 and 4, two schematic three-dimensional views of a nozzle structure 112 (i.e., a side perspective view in FIG. 3 and an oblique perspective view in FIG. 4) are shown according to various embodiments to better illustrate the parts of a nozzle structure. Nozzle structure 112 forms part of static section 115 (FIG. 2) and which forms part of an annulus of nozzle structures in a stage of a turbine (e.g., turbine 108), as previously described. That is, during operation of a turbine (e.g., turbine 108), nozzle structure 112 remains stationary to direct the flow of working fluid (e.g., gas or steam) to one or more movable blades (e.g., blades 114 (FIGS. 1, 2)), causing those movable blades 114 to initiate rotation of, or continue rotating, rotor 110. It is understood that nozzle structure 112 may be configured to couple (mechanically couple via fasteners, welds, slot/grooves, etc.) with a plurality of similar or distinct blades (e.g., nozzle structures 112) to form an annulus in a stage L0-L3 of turbine 108.

Nozzle structure 112 can include an airfoil 130 having a convex suction side 132 (obstructed in FIG. 3) and a concave pressure side 134 opposing suction side 132. Nozzle structure 112 can also include a leading edge 136 spanning between pressure side 134 and suction side 132 and a trailing edge 138 opposing leading edge 136 and spanning between pressure side 134 and suction side 132. As shown, and as previously noted, nozzle structure 112 can also include at least one endwall 120, 122 (two shown) connected with airfoil 130 along suction side 132, pressure side 134, trailing edge 138, and leading edge 136. In the example shown, nozzle structure 112 includes a radially outer endwall 120 and a radially inner endwall 122. Radially outer endwall 120 is configured to align on the radially outer side of the static section and to couple respective nozzle structure(s) 112 to casing 124 (FIG. 2) of turbine 108 (FIG. 2). Radially inner endwall 122 is configured to align on the radially inner side of static section 115 (FIG. 2).

In various embodiments, nozzle structure 112 includes a fillet 140, 142 connecting airfoil 130 and each respective endwall 120, 122. Fillet 140 can include a weld or braze fillet, which may be formed via conventional metal-inert gas (MIG) welding, tungsten-inert gas (TIG) welding, brazing, etc. Fillets 140, 142 can overlap a portion of airfoil 130. The extent of overlap can vary from blade to blade, stage to stage, and/or turbine to turbine.

With reference again to FIG. 2, in various embodiments, nozzle structure 112 can include a first stage (L0) nozzle structure, a second stage (L1) nozzle structure, a third stage (L2) nozzle structure, or a fourth stage (L3) nozzle structure. In particular embodiments, nozzle structure 112 is a first stage (L0) nozzle structure, and the improved flow profile across the interface between airfoil 130 and endwall 120, 122 allows first stage (L0) nozzle structure to withstand high-temperature gas at the first stage. In various embodiments, turbine 108 can include a set of nozzle structures 112 in only second stage (L1) of turbine 108, or in only third stage (L2), or in only fourth stage (L3) of turbine 108.

Figure 5:
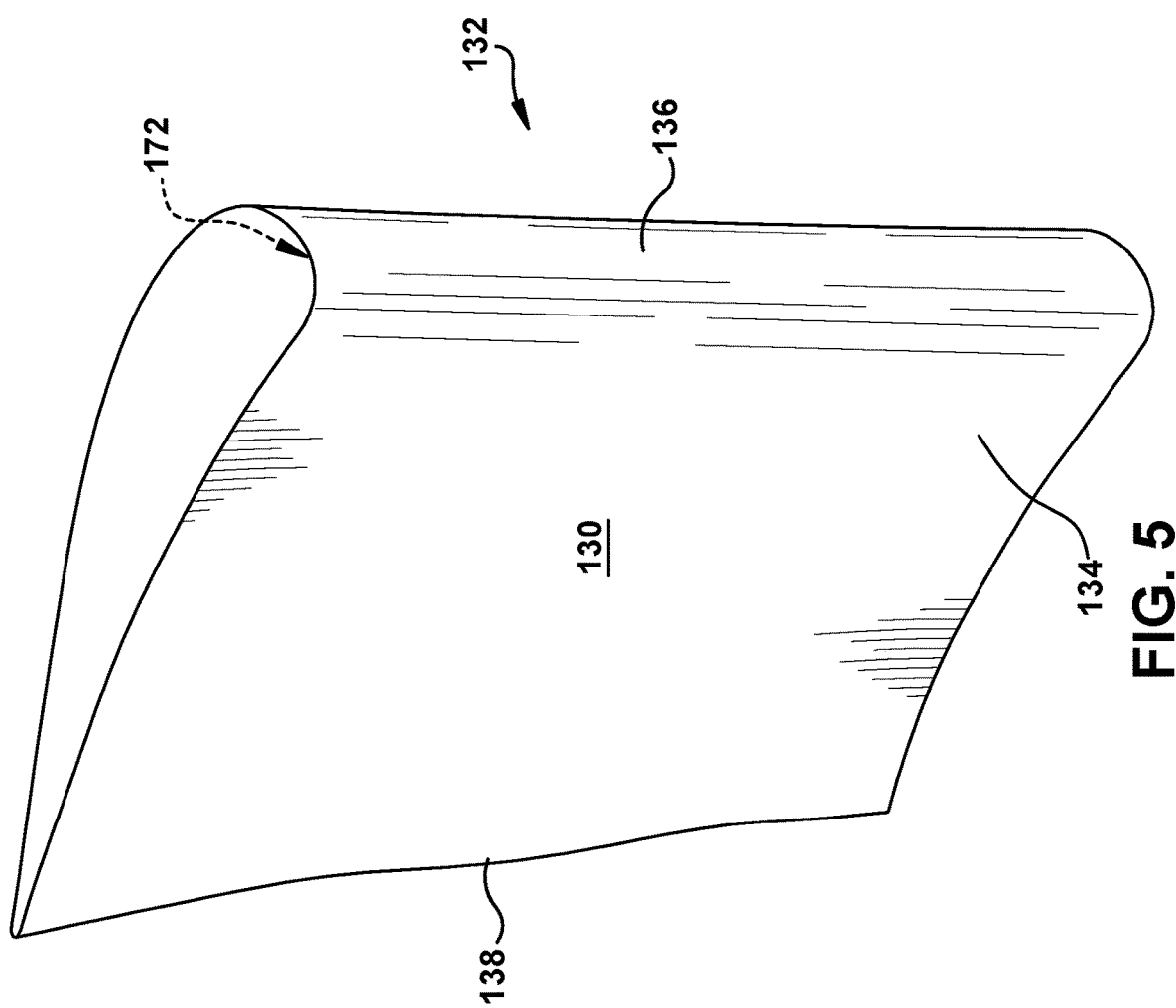
FIG. 5 shows a perspective view of an airfoil geometry for a nozzle structure according to various embodiments of the disclosure.

With reference to FIGS. 3-5, in which FIG. 5 provides a simplified perspective view of airfoil 130 with interconnected parts omitted, suction side 132 and/or pressure side 134 of airfoil 130 shape has a nominal profile that can be expressed substantially in accordance with at least a portion of the Cartesian coordinates, i.e., X, Y, Z coordinates, set forth in TABLE I. A "profile" is the range of the variation between measured points on an airfoil surface and the ideal position listed in TABLE I. The actual profile on a manufactured nozzle structure will be different from that defined in TABLE I, and the design is robust to this variation, meaning that mechanical and aerodynamic function are not impaired.

To allow for typical manufacturing tolerances and/or coating thicknesses, ±values can be added to the values listed in TABLE I, particularly to the X and Y values therein. For example, a tolerance of about five percent to about fifteen percent of a thickness of trailing edge 138 in a direction normal to any surface location along the airfoil profile can define an airfoil profile envelope for a nozzle structure airfoil design at cold or room temperature. In other words, a distance of about 10-20 percent of a thickness of the trailing edge in a direction normal to any surface location along the airfoil profile can define a range of variation between measured points on an actual airfoil surface and ideal positions of those points, particularly at a cold or room temperature, as embodied by the disclosure. Embodiments of an airfoil profile for a nozzle structure, as embodied by the disclosure, are robust to this range of variation without impairment of mechanical and aerodynamic functions.

Figure 6:
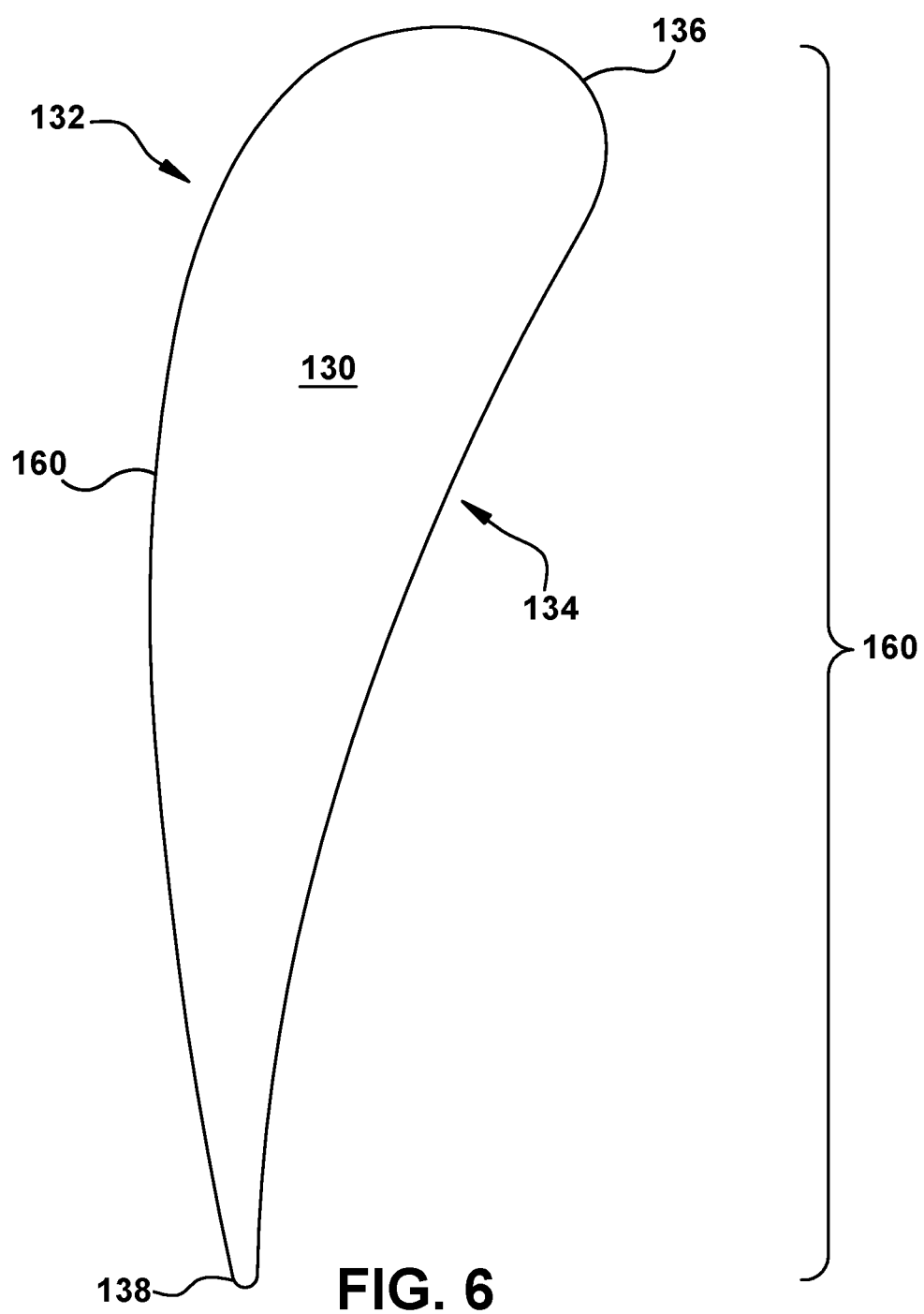
FIG. 6 shows a cross-sectional view of an airfoil profile for a nozzle structure at approximately zero percent radial span according to embodiments of the disclosure.
Figure 7:
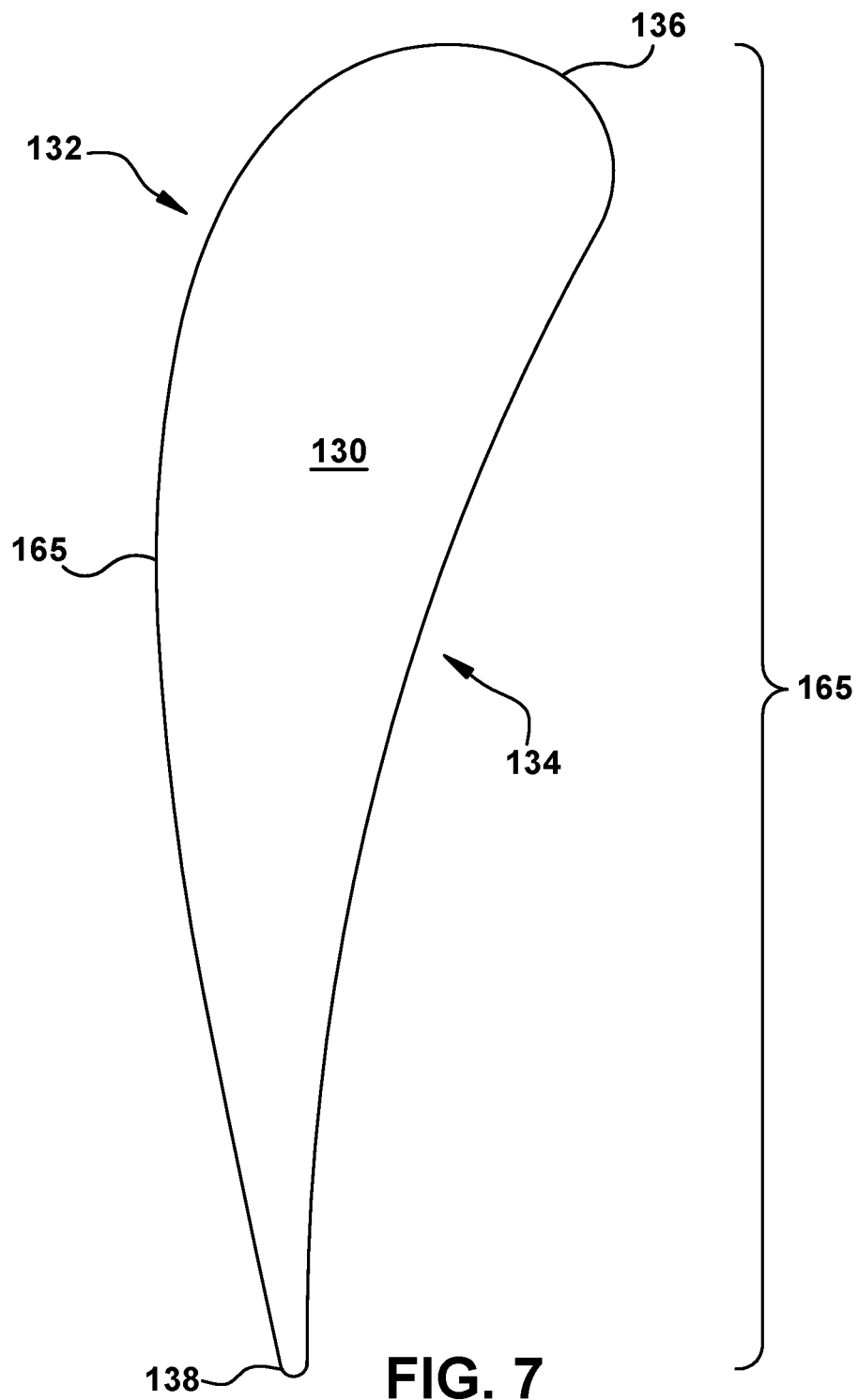
FIG. 7 shows a cross-sectional view of an airfoil profile for a nozzle structure at approximately fifty percent radial span according to embodiments of the disclosure.
Figure 8:
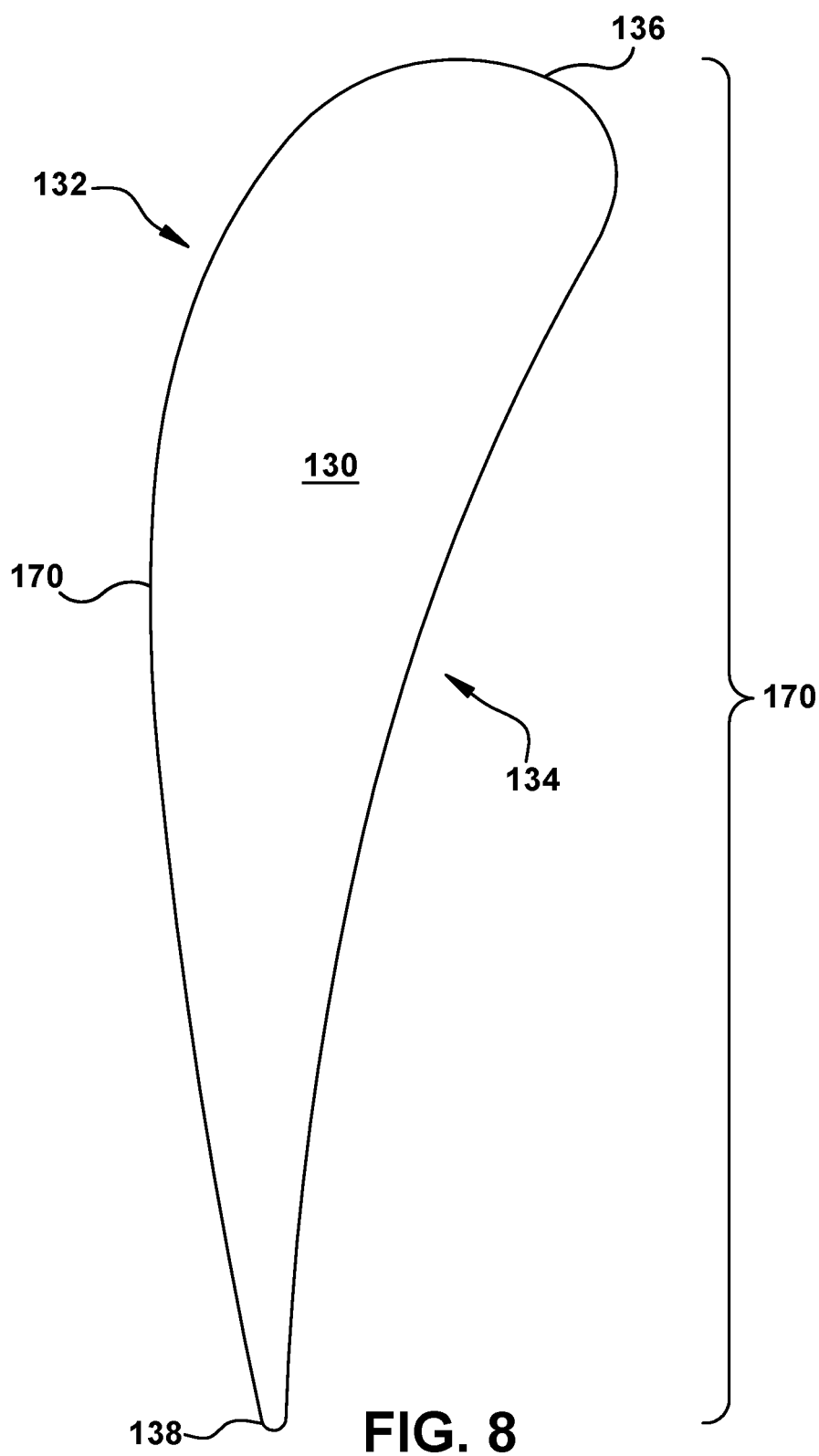
FIG. 8 shows a cross-sectional view of an airfoil profile for a nozzle structure at approximately one-hundred percent radial span according to embodiments of the disclosure.

The Cartesian coordinate system of X, Y and Z values given in TABLE I below defines the profile of an airfoil for a nozzle structure (i.e., airfoil 130) at various locations along its height. To illustrate, FIG. 6-8 shows a plurality of cross sections 160, 165, 170 along span or height H that correspond to Z coordinate values of chord lines. Each cross section 160, 165, 170 of airfoil 130 can be described by a respective set of X and Y coordinates (from TABLE I). For example, 100 or more points can be listed for each of the pressure side and the suction side that collectively define each cross section 160, 165, 170, though it should be apparent that more or fewer points can be used for each cross section, and more or fewer cross sections can be used, as may be desired and/or appropriate.

The coordinate values are stated as non-dimensional values of from 0% to 100% (percentages in TABLE I) convertible to distances by multiplying the values by a height H of airfoil 130 expressed in units of distance. While the X, Y, and Z coordinate values in TABLE I have been expressed in normalized or non-dimensionalized form, it should be apparent that any or all of the coordinate values could instead be expressed in distance units so long as the proportions are maintained. Specifically, the profile and/or layout can be scaled uniformly up or down, such as geometrically, without impairment of operation, and such scaling can be facilitated by use of normalized coordinate values, i.e., multiplying the normalized values by a common scaling factor, which may be a larger or smaller number of distance units than might have originally been used. For example, the values in TABLE I, particularly the X and Y values, could be multiplied by a scaling factor of 0.5, 2, or any other desired scaling factor, to uniformly geometrically scale. Alternatively, the values could be multiplied by a larger or smaller desired height H.

As discussed above, to convert an X, Y or Z value of TABLE I to a respective X, Y or Z coordinate value in units of distance, such as inches or meters, the non-dimensional X, Y or Z value given in TABLE I can be multiplied by 100 and a height H of airfoil 130 in such units of distance. Hence, the profile can be applied to airfoils of different heights H. By connecting the X and Y values with smooth continuing arcs, each profile cross section at each height Z (i.e., cross sections 160, 165, 170) can be fixed. The airfoil profiles of the various surface locations between the heights Z (in TABLE I) can be determined by smoothly connecting adjacent profile sections to one another, thus forming the nominal airfoil profile.

Further, it is noted that where an airfoil profile section uses Z coordinate values not expressly stated in TABLE I, appropriate coordinate values can be mathematically extrapolated from TABLE I. The [X, Y, Z] data points may be joined smoothly with one another (with lines and/or arcs) to form a surface profile for nozzle structure using any now known or later developed curve fitting technique generating a curved surface appropriate for a nozzle structure. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

The values in TABLE I are generated and shown to three decimal places for determining the nominal profile of at least one of a suction side or a pressure side of airfoil 130 at ambient, non-operating, or non-hot conditions and do not take any coatings or fillets 140, 142 (FIG. 3) into account, though embodiments could account for other conditions, coatings, and/or fillets. The Cartesian coordinate values have an origin at an innermost point 172 (FIG. 5 only, shown in dashed lines) of leading edge 136 of airfoil 130 at one end (e.g., the lowermost end) of airfoil 130. It is understood that innermost point 172 may be covered by fillet 140 (FIGS. 3, 4) and that innermost point 172 may be one of the points of cross section 160 (FIG. 6).

Figure 9:
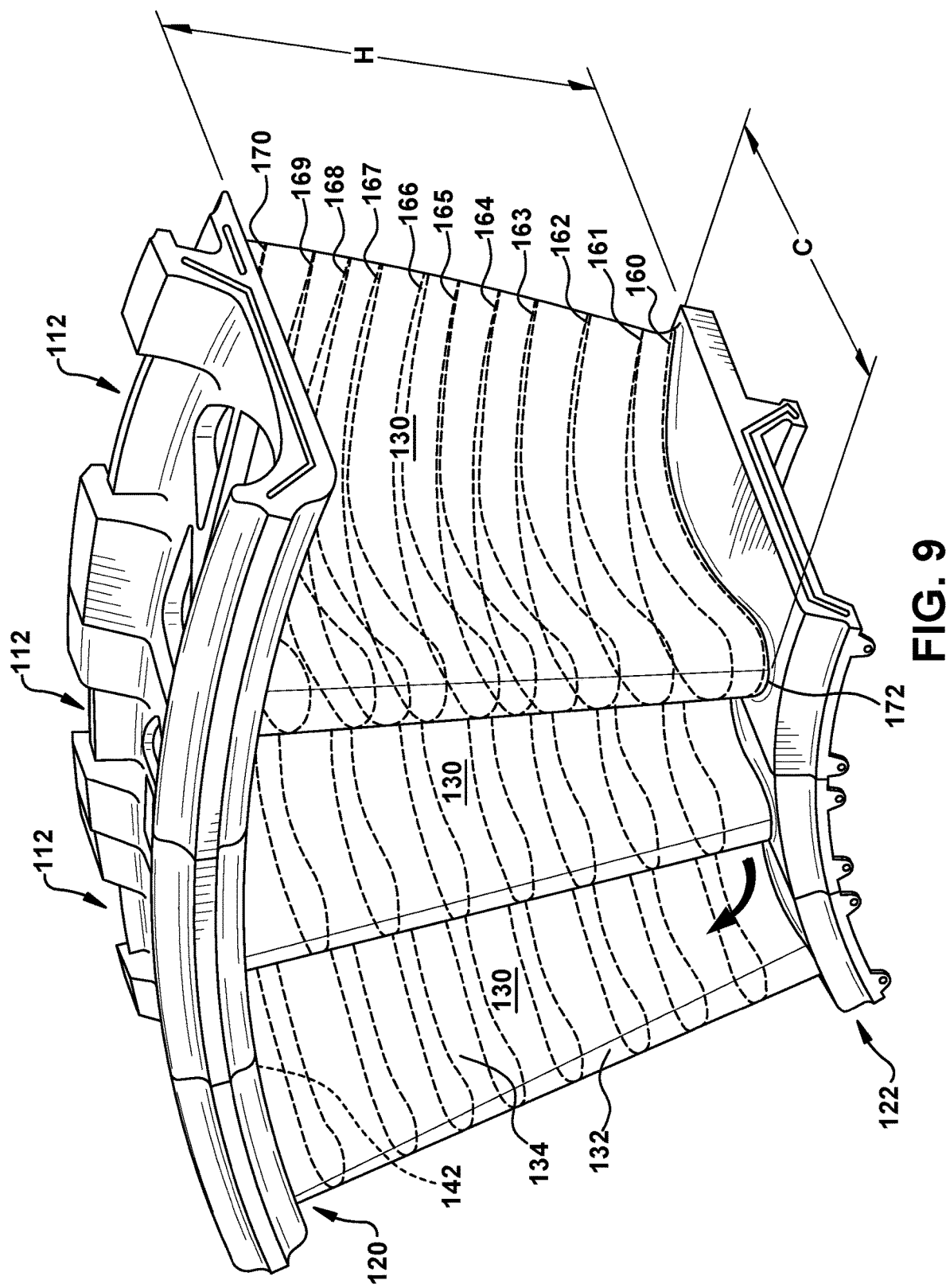
FIG. 9 shows a perspective view of a plurality of nozzle structures according to various embodiments of the disclosure.

FIG. 9 shows, as a further example, a set of nozzle structures 112 each having a profile indicative of all the data from the Cartesian coordinate values of X, Y, and Z set forth in TABLE I (i.e., all data from 0% to 100%), although it is possible that an airfoil profile for another embodiment of nozzle structure(s) 112 may use only a selected portion or subset of Cartesian coordinate values of X, Y, and Z set forth in TABLE I. The origin of the X, Y, Z coordinate system is defined as: for the X direction, an end of the trailing edge of the airfoil; for the Y direction, the center of gravity of the airfoil; and for the Z direction, the innermost span of the airfoil. In the X-Y plane, a positive coordinate indicates a point downstream from the origin within the flowpath and a negative value indicates a direction upstream from the origin, opposite that of the positive direction. For instance, while the Cartesian values in TABLE I provide Z coordinate values at 10% increments between 0% and 100%, only a portion of Cartesian coordinate values set forth in TABLE I may be employed. In one example, the airfoil profile sections may use a portion of Z coordinate values defined within 10% and 90% of the height of the airfoil, i.e., from cross sections 161 to 169. In another example, the airfoil profile sections may use a portion of the Cartesian coordinate values defined within 5% and 95% of the height of the airfoil, i.e., from a plane midway between cross sections 160 and 161 to a plane midway between cross sections 169 and 170. Any portion of Cartesian coordinate values of X, Y and Z set forth in TABLE I may be employed, e.g., from 20% to 30%, 37%-50%, etc.

Figure 10:
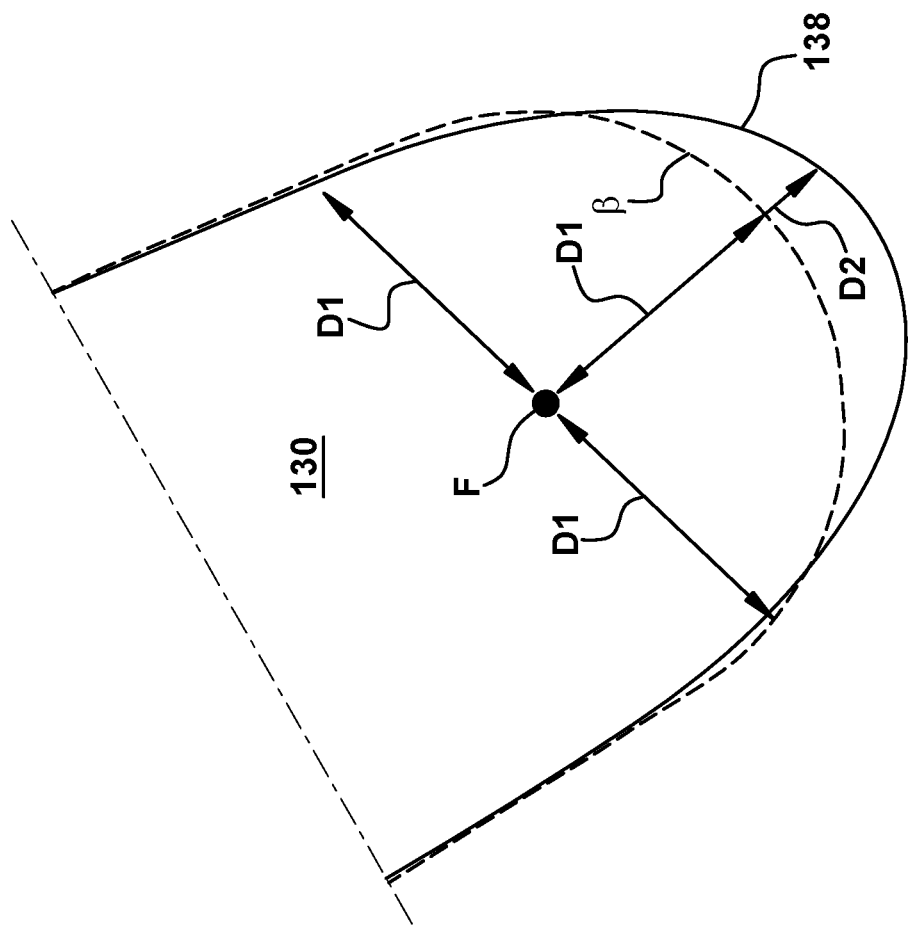
FIG. 10 shows a comparative profile for a conventional trailing edge airfoil profile and a trailing edge airfoil profile according to embodiments of the disclosure.

FIG. 10 depicts a cross-sectional view of a portion of airfoil 130 along its length and width to emphasize certain features of trailing edge 138. Trailing edge 138 of airfoil 130 is compared with a conventional trailing edge profile β (shown in dashed lines). Conventional trailing edge profile β has a substantially rounded profile, i.e., it traverses an arc of points that are approximately equidistant from a focus F defined within airfoil 130. In conventional trailing edge profile β, each point along the trailing edge may be separated from focus F by substantially a first distance D1. In embodiments of the disclosure, trailing edge 138 instead has an elliptical profile. Thus, trailing edge 138 traverses an arc of points in which an intermediate group of points is further away from focus F by a second distance D2, whereas other portions of trailing edge 138 are separated from focus F by first distance D1. An example of such an elliptical shape of airfoil 130 along trailing edge 138 is further defined in TABLE 1 via the example Cartesian coordinate values specified therein.

In some cases, nozzle structure 112 may employ only a selected portion of the Cartesian coordinate values of X, Y and Z set forth in TABLE I to define a section of the span of the airfoil of nozzle structure 112. For example, a nozzle structure 112 may be made using coordinate values that represent a selected section of airfoil 130, such as from 40% of the height to 55% of the height. Coordinates other than those provided in TABLE I may be used to define the rest of the span of the airfoil of nozzle structure 112 (i.e., from 0% to 40% and from 55% to 100%). Each non-dimensionalized value is calculated in TABLE I by reference to span height, per the formula (X, Y, Z/Span Height). TABLE I includes certain information in an abbreviated format. The column labeled "Side" uses the letter "P" to indicate a pressure side point and the letter "S" to indicate a suction side point. The column heading "TE?" in TABLE I refers to whether the point is part of the elliptical trailing edge. The letter "N" indicates that this point is not included in the trailing edge of the airfoil of nozzle structure 112. The letter "Y" indicates that this point is included in the trailing edge of the airfoil of nozzle structure 112.

TABLE I

Non-Dimensionalized Values

| N | Side | X | Y | Z | TE? |
|---|---|---|---|---|---|
| 1 | P | −0.585 | −0.193 | 0.000 | N |
| 2 | P | −0.584 | −0.182 | 0.000 | N |
| 3 | P | −0.582 | −0.171 | 0.000 | N |
| 4 | P | −0.578 | −0.161 | 0.000 | N |
| 5 | P | −0.573 | −0.151 | 0.000 | N |
| 6 | P | −0.566 | −0.142 | 0.000 | N |
| 7 | P | −0.559 | −0.133 | 0.000 | N |
| 8 | P | −0.552 | −0.125 | 0.000 | N |
| 9 | P | −0.543 | −0.118 | 0.000 | N |
| 10 | P | −0.535 | −0.111 | 0.000 | N |
| 11 | P | −0.526 | −0.104 | 0.000 | N |
| 12 | P | −0.517 | −0.097 | 0.000 | N |
| 13 | P | −0.509 | −0.091 | 0.000 | N |
| 14 | P | −0.500 | −0.084 | 0.000 | N |
| 15 | P | −0.492 | −0.077 | 0.000 | N |
| 16 | P | −0.483 | −0.069 | 0.000 | N |
| 17 | P | −0.475 | −0.062 | 0.000 | N |
| 18 | P | −0.466 | −0.055 | 0.000 | N |
| 19 | P | −0.458 | −0.048 | 0.000 | N |
| 20 | P | −0.450 | −0.041 | 0.000 | N |
| 21 | P | −0.441 | −0.034 | 0.000 | N |
| 22 | P | −0.433 | −0.026 | 0.000 | N |
| 23 | P | −0.425 | −0.019 | 0.000 | N |
| 24 | P | −0.416 | −0.012 | 0.000 | N |
| 25 | P | −0.408 | −0.004 | 0.000 | N |
| 26 | P | −0.400 | 0.003 | 0.000 | N |
| 27 | P | −0.392 | 0.011 | 0.000 | N |
| 28 | P | −0.384 | 0.018 | 0.000 | N |
| 29 | P | −0.376 | 0.026 | 0.000 | N |
| 30 | P | −0.368 | 0.034 | 0.000 | N |
| 31 | P | −0.360 | 0.041 | 0.000 | N |
| 32 | P | −0.352 | 0.049 | 0.000 | N |
| 33 | P | −0.344 | 0.057 | 0.000 | N |
| 34 | P | −0.336 | 0.065 | 0.000 | N |
| 35 | P | −0.329 | 0.072 | 0.000 | N |
| 36 | P | −0.321 | 0.080 | 0.000 | N |
| 37 | P | −0.313 | 0.088 | 0.000 | N |
| 38 | P | −0.306 | 0.096 | 0.000 | N |
| 39 | P | −0.298 | 0.104 | 0.000 | N |
| 40 | P | −0.290 | 0.112 | 0.000 | N |
| 41 | P | −0.283 | 0.120 | 0.000 | N |
| 42 | P | −0.275 | 0.129 | 0.000 | N |
| 43 | P | −0.268 | 0.137 | 0.000 | N |
| 44 | P | −0.261 | 0.145 | 0.000 | N |
| 45 | P | −0.253 | 0.153 | 0.000 | N |
| 46 | P | −0.246 | 0.162 | 0.000 | N |
| 47 | P | −0.239 | 0.170 | 0.000 | N |
| 48 | P | −0.232 | 0.178 | 0.000 | N |
| 49 | P | −0.225 | 0.187 | 0.000 | N |
| 50 | P | −0.218 | 0.195 | 0.000 | N |
| 51 | P | −0.211 | 0.204 | 0.000 | N |
| 52 | P | −0.204 | 0.213 | 0.000 | N |
| 53 | P | −0.197 | 0.221 | 0.000 | N |
| 54 | P | −0.190 | 0.230 | 0.000 | N |
| 55 | P | −0.183 | 0.239 | 0.000 | N |
| 56 | P | −0.177 | 0.247 | 0.000 | N |
| 57 | P | −0.170 | 0.256 | 0.000 | N |
| 58 | P | −0.163 | 0.265 | 0.000 | N |
| 59 | P | −0.157 | 0.274 | 0.000 | N |
| 60 | P | −0.150 | 0.283 | 0.000 | N |
| 61 | P | −0.144 | 0.292 | 0.000 | N |
| 62 | P | −0.138 | 0.301 | 0.000 | N |
| 63 | P | −0.131 | 0.310 | 0.000 | N |
| 64 | P | −0.125 | 0.319 | 0.000 | N |
| 65 | P | −0.119 | 0.329 | 0.000 | N |
| 66 | P | −0.113 | 0.338 | 0.000 | N |
| 67 | P | −0.107 | 0.347 | 0.000 | N |
| 68 | P | −0.101 | 0.356 | 0.000 | N |
| 69 | P | −0.095 | 0.366 | 0.000 | N |
| 70 | P | −0.090 | 0.375 | 0.000 | N |
| 71 | P | −0.084 | 0.385 | 0.000 | N |
| 72 | P | −0.078 | 0.394 | 0.000 | N |
| 73 | P | −0.073 | 0.404 | 0.000 | N |
| 74 | P | −0.067 | 0.413 | 0.000 | N |
| 75 | P | −0.062 | 0.423 | 0.000 | N |
| 76 | P | −0.056 | 0.433 | 0.000 | N |
| 77 | P | −0.051 | 0.442 | 0.000 | N |
| 78 | P | −0.046 | 0.452 | 0.000 | N |
| 79 | P | −0.041 | 0.462 | 0.000 | N |
| 80 | P | −0.036 | 0.472 | 0.000 | N |
| 81 | P | −0.031 | 0.482 | 0.000 | N |
| 82 | P | −0.026 | 0.492 | 0.000 | N |
| 83 | P | −0.021 | 0.501 | 0.000 | N |
| 84 | P | −0.017 | 0.511 | 0.000 | N |
| 85 | P | −0.012 | 0.522 | 0.000 | N |
| 86 | P | −0.007 | 0.532 | 0.000 | N |
| 87 | P | −0.003 | 0.542 | 0.000 | N |
| 88 | P | 0.001 | 0.552 | 0.000 | Y |
| 89 | P | 0.003 | 0.556 | 0.000 | Y |
| 90 | P | 0.005 | 0.558 | 0.000 | Y |
| 91 | P | 0.007 | 0.561 | 0.000 | Y |
| 92 | P | 0.010 | 0.562 | 0.000 | Y |
| 93 | P | 0.014 | 0.562 | 0.000 | Y |
| 94 | P | 0.017 | 0.561 | 0.000 | Y |
| 95 | P | 0.021 | 0.556 | 0.000 | Y |
| 96 | P | 0.022 | 0.553 | 0.000 | Y |
| 97 | S | −0.585 | −0.193 | 0.000 | N |
| 98 | S | −0.584 | −0.204 | 0.000 | N |
| 99 | S | −0.582 | −0.215 | 0.000 | N |
| 100 | S | −0.578 | −0.225 | 0.000 | N |
| 101 | S | −0.573 | −0.235 | 0.000 | N |
| 102 | S | −0.567 | −0.244 | 0.000 | N |
| 103 | S | −0.560 | −0.253 | 0.000 | N |
| 104 | S | −0.553 | −0.261 | 0.000 | N |
| 105 | S | −0.545 | −0.268 | 0.000 | N |
| 106 | S | −0.536 | −0.275 | 0.000 | N |
| 107 | S | −0.527 | −0.281 | 0.000 | N |
| 108 | S | −0.518 | −0.287 | 0.000 | N |
| 109 | S | −0.508 | −0.293 | 0.000 | N |
| 110 | S | −0.498 | −0.298 | 0.000 | N |
| 111 | S | −0.488 | −0.302 | 0.000 | N |
| 112 | S | −0.478 | −0.306 | 0.000 | N |
| 113 | S | −0.467 | −0.309 | 0.000 | N |
| 114 | S | −0.456 | −0.311 | 0.000 | N |
| 115 | S | −0.445 | −0.312 | 0.000 | N |
| 116 | S | −0.434 | −0.313 | 0.000 | N |
| 117 | S | −0.423 | −0.313 | 0.000 | N |
| 118 | S | −0.412 | −0.312 | 0.000 | N |
| 119 | S | −0.401 | −0.310 | 0.000 | N |
| 120 | S | −0.390 | −0.308 | 0.000 | N |
| 121 | S | −0.380 | −0.305 | 0.000 | N |
| 122 | S | −0.369 | −0.301 | 0.000 | N |
| 123 | S | −0.359 | −0.297 | 0.000 | N |
| 124 | S | −0.349 | −0.292 | 0.000 | N |
| 125 | S | −0.340 | −0.286 | 0.000 | N |
| 126 | S | −0.330 | −0.281 | 0.000 | N |
| 127 | S | −0.321 | −0.275 | 0.000 | N |
| 128 | S | −0.312 | −0.268 | 0.000 | N |
| 129 | S | −0.303 | −0.261 | 0.000 | N |
| 130 | S | −0.295 | −0.254 | 0.000 | N |
| 131 | S | −0.287 | −0.247 | 0.000 | N |
| 132 | S | −0.279 | −0.239 | 0.000 | N |
| 133 | S | −0.271 | −0.231 | 0.000 | N |
| 134 | S | −0.263 | −0.223 | 0.000 | N |
| 135 | S | −0.256 | −0.215 | 0.000 | N |
| 136 | S | −0.249 | −0.207 | 0.000 | N |
| 137 | S | −0.242 | −0.198 | 0.000 | N |
| 138 | S | −0.235 | −0.189 | 0.000 | N |
| 139 | S | −0.228 | −0.181 | 0.000 | N |
| 140 | S | −0.222 | −0.172 | 0.000 | N |
| 141 | S | −0.216 | −0.163 | 0.000 | N |
| 142 | S | −0.209 | −0.153 | 0.000 | N |
| 143 | S | −0.203 | −0.144 | 0.000 | N |
| 144 | S | −0.197 | −0.135 | 0.000 | N |
| 145 | S | −0.192 | −0.125 | 0.000 | N |
| 146 | S | −0.186 | −0.116 | 0.000 | N |
| 147 | S | −0.181 | −0.106 | 0.000 | N |
| 148 | S | −0.175 | −0.097 | 0.000 | N |
| 149 | S | −0.170 | −0.087 | 0.000 | N |
| 150 | S | −0.165 | −0.077 | 0.000 | N |
| 151 | S | −0.160 | −0.067 | 0.000 | N |
| 152 | S | −0.155 | −0.057 | 0.000 | N |

TABLE I-continued

Non-Dimensionalized Values

| N | Side | X | Y | Z | TE? |
|---|---|---|---|---|---|
| 153 | S | −0.150 | −0.047 | 0.000 | N |
| 154 | S | −0.146 | −0.037 | 0.000 | N |
| 155 | S | −0.141 | −0.027 | 0.000 | N |
| 156 | S | −0.136 | −0.017 | 0.000 | N |
| 157 | S | −0.132 | −0.007 | 0.000 | N |
| 158 | S | −0.128 | 0.003 | 0.000 | N |
| 159 | S | −0.123 | 0.013 | 0.000 | N |
| 160 | S | −0.119 | 0.023 | 0.000 | N |
| 161 | S | −0.115 | 0.034 | 0.000 | N |
| 162 | S | −0.111 | 0.044 | 0.000 | N |
| 163 | S | −0.107 | 0.054 | 0.000 | N |
| 164 | S | −0.103 | 0.065 | 0.000 | N |
| 165 | S | −0.099 | 0.075 | 0.000 | N |
| 166 | S | −0.096 | 0.085 | 0.000 | N |
| 167 | S | −0.092 | 0.096 | 0.000 | N |
| 168 | S | −0.088 | 0.106 | 0.000 | N |
| 169 | S | −0.085 | 0.117 | 0.000 | N |
| 170 | S | −0.081 | 0.127 | 0.000 | N |
| 171 | S | −0.078 | 0.138 | 0.000 | N |
| 172 | S | −0.074 | 0.148 | 0.000 | N |
| 173 | S | −0.071 | 0.159 | 0.000 | N |
| 174 | S | −0.068 | 0.169 | 0.000 | N |
| 175 | S | −0.065 | 0.180 | 0.000 | N |
| 176 | S | −0.061 | 0.190 | 0.000 | N |
| 177 | S | −0.058 | 0.201 | 0.000 | N |
| 178 | S | −0.055 | 0.212 | 0.000 | N |
| 179 | S | −0.052 | 0.222 | 0.000 | N |
| 180 | S | −0.049 | 0.233 | 0.000 | N |
| 181 | S | −0.046 | 0.244 | 0.000 | N |
| 182 | S | −0.043 | 0.254 | 0.000 | N |
| 183 | S | −0.041 | 0.265 | 0.000 | N |
| 184 | S | −0.038 | 0.276 | 0.000 | N |
| 185 | S | −0.035 | 0.286 | 0.000 | N |
| 186 | S | −0.032 | 0.297 | 0.000 | N |
| 187 | S | −0.030 | 0.308 | 0.000 | N |
| 188 | S | −0.027 | 0.318 | 0.000 | N |
| 189 | S | −0.024 | 0.329 | 0.000 | N |
| 190 | S | −0.022 | 0.340 | 0.000 | N |
| 191 | S | −0.019 | 0.351 | 0.000 | N |
| 192 | S | −0.017 | 0.361 | 0.000 | N |
| 193 | S | −0.014 | 0.372 | 0.000 | N |
| 194 | S | −0.012 | 0.383 | 0.000 | N |
| 195 | S | −0.009 | 0.394 | 0.000 | N |
| 196 | S | −0.007 | 0.405 | 0.000 | N |
| 197 | S | −0.005 | 0.415 | 0.000 | N |
| 198 | S | −0.002 | 0.426 | 0.000 | N |
| 199 | S | 0.000 | 0.437 | 0.000 | N |
| 200 | S | 0.002 | 0.448 | 0.000 | N |
| 201 | S | 0.004 | 0.459 | 0.000 | N |
| 202 | S | 0.007 | 0.469 | 0.000 | N |
| 203 | S | 0.009 | 0.480 | 0.000 | N |
| 204 | S | 0.011 | 0.491 | 0.000 | N |
| 205 | S | 0.013 | 0.502 | 0.000 | N |
| 206 | S | 0.015 | 0.513 | 0.000 | N |
| 207 | S | 0.017 | 0.524 | 0.000 | N |
| 208 | S | 0.019 | 0.535 | 0.000 | N |
| 209 | S | 0.021 | 0.545 | 0.000 | Y |
| 210 | S | 0.022 | 0.550 | 0.000 | Y |
| 211 | S | 0.022 | 0.550 | 0.000 | Y |
| 1 | P | −0.590 | −0.198 | 0.100 | N |
| 2 | P | −0.589 | −0.187 | 0.100 | N |
| 3 | P | −0.587 | −0.176 | 0.100 | N |
| 4 | P | −0.583 | −0.165 | 0.100 | N |
| 5 | P | −0.578 | −0.155 | 0.100 | N |
| 6 | P | −0.572 | −0.146 | 0.100 | N |
| 7 | P | −0.565 | −0.137 | 0.100 | N |
| 8 | P | −0.558 | −0.129 | 0.100 | N |
| 9 | P | −0.549 | −0.122 | 0.100 | N |
| 10 | P | −0.541 | −0.115 | 0.100 | N |
| 11 | P | −0.532 | −0.108 | 0.100 | N |
| 12 | P | −0.523 | −0.101 | 0.100 | N |
| 13 | P | −0.515 | −0.094 | 0.100 | N |
| 14 | P | −0.506 | −0.087 | 0.100 | N |
| 15 | P | −0.498 | −0.080 | 0.100 | N |
| 16 | P | −0.489 | −0.073 | 0.100 | N |
| 17 | P | −0.481 | −0.066 | 0.100 | N |
| 18 | P | −0.472 | −0.059 | 0.100 | N |
| 19 | P | −0.464 | −0.051 | 0.100 | N |
| 20 | P | −0.456 | −0.044 | 0.100 | N |
| 21 | P | −0.447 | −0.037 | 0.100 | N |
| 22 | P | −0.439 | −0.029 | 0.100 | N |
| 23 | P | −0.431 | −0.022 | 0.100 | N |
| 24 | P | −0.423 | −0.014 | 0.100 | N |
| 25 | P | −0.414 | −0.007 | 0.100 | N |
| 26 | P | −0.406 | 0.001 | 0.100 | N |
| 27 | P | −0.398 | 0.009 | 0.100 | N |
| 28 | P | −0.390 | 0.016 | 0.100 | N |
| 29 | P | −0.382 | 0.024 | 0.100 | N |
| 30 | P | −0.375 | 0.032 | 0.100 | N |
| 31 | P | −0.367 | 0.040 | 0.100 | N |
| 32 | P | −0.359 | 0.047 | 0.100 | N |
| 33 | P | −0.351 | 0.055 | 0.100 | N |
| 34 | P | −0.343 | 0.063 | 0.100 | N |
| 35 | P | −0.336 | 0.071 | 0.100 | N |
| 36 | P | −0.328 | 0.079 | 0.100 | N |
| 37 | P | −0.321 | 0.088 | 0.100 | N |
| 38 | P | −0.313 | 0.096 | 0.100 | N |
| 39 | P | −0.306 | 0.104 | 0.100 | N |
| 40 | P | −0.298 | 0.112 | 0.100 | N |
| 41 | P | −0.291 | 0.121 | 0.100 | N |
| 42 | P | −0.284 | 0.129 | 0.100 | N |
| 43 | P | −0.276 | 0.137 | 0.100 | N |
| 44 | P | −0.269 | 0.146 | 0.100 | N |
| 45 | P | −0.262 | 0.154 | 0.100 | N |
| 46 | P | −0.255 | 0.163 | 0.100 | N |
| 47 | P | −0.248 | 0.171 | 0.100 | N |
| 48 | P | −0.241 | 0.180 | 0.100 | N |
| 49 | P | −0.234 | 0.189 | 0.100 | N |
| 50 | P | −0.227 | 0.197 | 0.100 | N |
| 51 | P | −0.220 | 0.206 | 0.100 | N |
| 52 | P | −0.214 | 0.215 | 0.100 | N |
| 53 | P | −0.207 | 0.224 | 0.100 | N |
| 54 | P | −0.200 | 0.233 | 0.100 | N |
| 55 | P | −0.194 | 0.242 | 0.100 | N |
| 56 | P | −0.187 | 0.250 | 0.100 | N |
| 57 | P | −0.181 | 0.260 | 0.100 | N |
| 58 | P | −0.174 | 0.269 | 0.100 | N |
| 59 | P | −0.168 | 0.278 | 0.100 | N |
| 60 | P | −0.162 | 0.287 | 0.100 | N |
| 61 | P | −0.155 | 0.296 | 0.100 | N |
| 62 | P | −0.149 | 0.305 | 0.100 | N |
| 63 | P | −0.143 | 0.315 | 0.100 | N |
| 64 | P | −0.137 | 0.324 | 0.100 | N |
| 65 | P | −0.131 | 0.333 | 0.100 | N |
| 66 | P | −0.125 | 0.343 | 0.100 | N |
| 67 | P | −0.120 | 0.352 | 0.100 | N |
| 68 | P | −0.114 | 0.362 | 0.100 | N |
| 69 | P | −0.108 | 0.371 | 0.100 | N |
| 70 | P | −0.103 | 0.381 | 0.100 | N |
| 71 | P | −0.097 | 0.390 | 0.100 | N |
| 72 | P | −0.092 | 0.400 | 0.100 | N |
| 73 | P | −0.086 | 0.410 | 0.100 | N |
| 74 | P | −0.081 | 0.419 | 0.100 | N |
| 75 | P | −0.076 | 0.429 | 0.100 | N |
| 76 | P | −0.070 | 0.439 | 0.100 | N |
| 77 | P | −0.065 | 0.449 | 0.100 | N |
| 78 | P | −0.060 | 0.459 | 0.100 | N |
| 79 | P | −0.055 | 0.468 | 0.100 | N |
| 80 | P | −0.050 | 0.478 | 0.100 | N |
| 81 | P | −0.046 | 0.488 | 0.100 | N |
| 82 | P | −0.041 | 0.498 | 0.100 | N |
| 83 | P | −0.036 | 0.509 | 0.100 | N |
| 84 | P | −0.032 | 0.519 | 0.100 | N |
| 85 | P | −0.027 | 0.529 | 0.100 | N |
| 86 | P | −0.023 | 0.539 | 0.100 | N |
| 87 | P | −0.014 | 0.559 | 0.100 | N |
| 88 | P | −0.012 | 0.563 | 0.100 | Y |
| 89 | P | −0.010 | 0.566 | 0.100 | Y |
| 90 | P | −0.008 | 0.568 | 0.100 | Y |
| 91 | P | −0.005 | 0.570 | 0.100 | Y |
| 92 | P | −0.002 | 0.570 | 0.100 | Y |
| 93 | P | 0.001 | 0.569 | 0.100 | Y |

TABLE I-continued

Non-Dimensionalized Values

| N | Side | X | Y | Z | TE? |
|---|---|---|---|---|---|
| 94 | P | 0.004 | 0.567 | 0.100 | Y |
| 95 | P | 0.006 | 0.564 | 0.100 | Y |
| 96 | P | 0.007 | 0.561 | 0.100 | Y |
| 97 | P | 0.007 | 0.558 | 0.100 | Y |
| 98 | S | −0.590 | −0.198 | 0.100 | N |
| 99 | S | −0.589 | −0.209 | 0.100 | N |
| 100 | S | −0.586 | −0.219 | 0.100 | N |
| 101 | S | −0.582 | −0.230 | 0.100 | N |
| 102 | S | −0.577 | −0.240 | 0.100 | N |
| 103 | S | −0.571 | −0.249 | 0.100 | N |
| 104 | S | −0.564 | −0.257 | 0.100 | N |
| 105 | S | −0.556 | −0.265 | 0.100 | N |
| 106 | S | −0.548 | −0.273 | 0.100 | N |
| 107 | S | −0.539 | −0.280 | 0.100 | N |
| 108 | S | −0.530 | −0.286 | 0.100 | N |
| 109 | S | −0.521 | −0.292 | 0.100 | N |
| 110 | S | −0.511 | −0.297 | 0.100 | N |
| 111 | S | −0.501 | −0.302 | 0.100 | N |
| 112 | S | −0.491 | −0.306 | 0.100 | N |
| 113 | S | −0.480 | −0.310 | 0.100 | N |
| 114 | S | −0.469 | −0.312 | 0.100 | N |
| 115 | S | −0.459 | −0.314 | 0.100 | N |
| 116 | S | −0.448 | −0.315 | 0.100 | N |
| 117 | S | −0.436 | −0.316 | 0.100 | N |
| 118 | S | −0.425 | −0.315 | 0.100 | N |
| 119 | S | −0.414 | −0.314 | 0.100 | N |
| 120 | S | −0.403 | −0.312 | 0.100 | N |
| 121 | S | −0.393 | −0.310 | 0.100 | N |
| 122 | S | −0.382 | −0.306 | 0.100 | N |
| 123 | S | −0.372 | −0.302 | 0.100 | N |
| 124 | S | −0.362 | −0.298 | 0.100 | N |
| 125 | S | −0.352 | −0.293 | 0.100 | N |
| 126 | S | −0.342 | −0.288 | 0.100 | N |
| 127 | S | −0.333 | −0.282 | 0.100 | N |
| 128 | S | −0.323 | −0.275 | 0.100 | N |
| 129 | S | −0.315 | −0.269 | 0.100 | N |
| 130 | S | −0.306 | −0.262 | 0.100 | N |
| 131 | S | −0.298 | −0.255 | 0.100 | N |
| 132 | S | −0.289 | −0.247 | 0.100 | N |
| 133 | S | −0.281 | −0.239 | 0.100 | N |
| 134 | S | −0.274 | −0.231 | 0.100 | N |
| 135 | S | −0.266 | −0.223 | 0.100 | N |
| 136 | S | −0.259 | −0.215 | 0.100 | N |
| 137 | S | −0.252 | −0.206 | 0.100 | N |
| 138 | S | −0.245 | −0.198 | 0.100 | N |
| 139 | S | −0.238 | −0.189 | 0.100 | N |
| 140 | S | −0.232 | −0.180 | 0.100 | N |
| 141 | S | −0.225 | −0.171 | 0.100 | N |
| 142 | S | −0.219 | −0.162 | 0.100 | N |
| 143 | S | −0.213 | −0.152 | 0.100 | N |
| 144 | S | −0.207 | −0.143 | 0.100 | N |
| 145 | S | −0.201 | −0.133 | 0.100 | N |
| 146 | S | −0.196 | −0.124 | 0.100 | N |
| 147 | S | −0.190 | −0.114 | 0.100 | N |
| 148 | S | −0.185 | −0.105 | 0.100 | N |
| 149 | S | −0.180 | −0.095 | 0.100 | N |
| 150 | S | −0.175 | −0.085 | 0.100 | N |
| 151 | S | −0.170 | −0.075 | 0.100 | N |
| 152 | S | −0.165 | −0.065 | 0.100 | N |
| 153 | S | −0.160 | −0.055 | 0.100 | N |
| 154 | S | −0.156 | −0.045 | 0.100 | N |
| 155 | S | −0.151 | −0.035 | 0.100 | N |
| 156 | S | −0.147 | −0.025 | 0.100 | N |
| 157 | S | −0.142 | −0.014 | 0.100 | N |
| 158 | S | −0.138 | −0.004 | 0.100 | N |
| 159 | S | −0.134 | 0.006 | 0.100 | N |
| 160 | S | −0.130 | 0.017 | 0.100 | N |
| 161 | S | −0.126 | 0.027 | 0.100 | N |
| 162 | S | −0.122 | 0.037 | 0.100 | N |
| 163 | S | −0.118 | 0.048 | 0.100 | N |
| 164 | S | −0.115 | 0.058 | 0.100 | N |
| 165 | S | −0.111 | 0.069 | 0.100 | N |
| 166 | S | −0.107 | 0.079 | 0.100 | N |
| 167 | S | −0.104 | 0.090 | 0.100 | N |
| 168 | S | −0.100 | 0.100 | 0.100 | N |
| 169 | S | −0.097 | 0.111 | 0.100 | N |
| 170 | S | −0.094 | 0.121 | 0.100 | N |
| 171 | S | −0.090 | 0.132 | 0.100 | N |
| 172 | S | −0.087 | 0.143 | 0.100 | N |
| 173 | S | −0.084 | 0.153 | 0.100 | N |
| 174 | S | −0.081 | 0.164 | 0.100 | N |
| 175 | S | −0.078 | 0.174 | 0.100 | N |
| 176 | S | −0.075 | 0.185 | 0.100 | N |
| 177 | S | −0.072 | 0.196 | 0.100 | N |
| 178 | S | −0.069 | 0.207 | 0.100 | N |
| 179 | S | −0.066 | 0.217 | 0.100 | N |
| 180 | S | −0.063 | 0.228 | 0.100 | N |
| 181 | S | −0.060 | 0.239 | 0.100 | N |
| 182 | S | −0.058 | 0.249 | 0.100 | N |
| 183 | S | −0.055 | 0.260 | 0.100 | N |
| 184 | S | −0.052 | 0.271 | 0.100 | N |
| 185 | S | −0.050 | 0.282 | 0.100 | N |
| 186 | S | −0.047 | 0.293 | 0.100 | N |
| 187 | S | −0.045 | 0.303 | 0.100 | N |
| 188 | S | −0.042 | 0.314 | 0.100 | N |
| 189 | S | −0.040 | 0.325 | 0.100 | N |
| 190 | S | −0.037 | 0.336 | 0.100 | N |
| 191 | S | −0.035 | 0.347 | 0.100 | N |
| 192 | S | −0.032 | 0.357 | 0.100 | N |
| 193 | S | −0.030 | 0.368 | 0.100 | N |
| 194 | S | −0.028 | 0.379 | 0.100 | N |
| 195 | S | −0.025 | 0.390 | 0.100 | N |
| 196 | S | −0.023 | 0.401 | 0.100 | N |
| 197 | S | −0.021 | 0.412 | 0.100 | N |
| 198 | S | −0.019 | 0.423 | 0.100 | N |
| 199 | S | −0.016 | 0.433 | 0.100 | N |
| 200 | S | −0.014 | 0.444 | 0.100 | N |
| 201 | S | −0.012 | 0.455 | 0.100 | N |
| 202 | S | −0.010 | 0.466 | 0.100 | N |
| 203 | S | −0.008 | 0.477 | 0.100 | N |
| 204 | S | −0.006 | 0.488 | 0.100 | N |
| 205 | S | −0.004 | 0.499 | 0.100 | N |
| 206 | S | −0.002 | 0.510 | 0.100 | N |
| 207 | S | 0.000 | 0.521 | 0.100 | N |
| 208 | S | 0.002 | 0.531 | 0.100 | N |
| 209 | S | 0.004 | 0.542 | 0.100 | Y |
| 210 | S | 0.006 | 0.553 | 0.100 | Y |
| 211 | S | 0.007 | 0.558 | 0.100 | Y |
| 1 | P | −0.594 | −0.201 | 0.200 | N |
| 2 | P | −0.594 | −0.190 | 0.200 | N |
| 3 | P | −0.592 | −0.179 | 0.200 | N |
| 4 | P | −0.588 | −0.168 | 0.200 | N |
| 5 | P | −0.583 | −0.158 | 0.200 | N |
| 6 | P | −0.577 | −0.149 | 0.200 | N |
| 7 | P | −0.570 | −0.140 | 0.200 | N |
| 8 | P | −0.562 | −0.132 | 0.200 | N |
| 9 | P | −0.554 | −0.125 | 0.200 | N |
| 10 | P | −0.545 | −0.118 | 0.200 | N |
| 11 | P | −0.536 | −0.111 | 0.200 | N |
| 12 | P | −0.527 | −0.104 | 0.200 | N |
| 13 | P | −0.519 | −0.096 | 0.200 | N |
| 14 | P | −0.510 | −0.089 | 0.200 | N |
| 15 | P | −0.502 | −0.082 | 0.200 | N |
| 16 | P | −0.493 | −0.075 | 0.200 | N |
| 17 | P | −0.484 | −0.068 | 0.200 | N |
| 18 | P | −0.476 | −0.060 | 0.200 | N |
| 19 | P | −0.468 | −0.053 | 0.200 | N |
| 20 | P | −0.459 | −0.045 | 0.200 | N |
| 21 | P | −0.451 | −0.038 | 0.200 | N |
| 22 | P | −0.443 | −0.030 | 0.200 | N |
| 23 | P | −0.434 | −0.023 | 0.200 | N |
| 24 | P | −0.426 | −0.015 | 0.200 | N |
| 25 | P | −0.418 | −0.007 | 0.200 | N |
| 26 | P | −0.410 | 0.000 | 0.200 | N |
| 27 | P | −0.402 | 0.008 | 0.200 | N |
| 28 | P | −0.394 | 0.016 | 0.200 | N |
| 29 | P | −0.386 | 0.024 | 0.200 | N |
| 30 | P | −0.378 | 0.032 | 0.200 | N |
| 31 | P | −0.370 | 0.040 | 0.200 | N |
| 32 | P | −0.362 | 0.048 | 0.200 | N |
| 33 | P | −0.355 | 0.056 | 0.200 | N |
| 34 | P | −0.347 | 0.064 | 0.200 | N |

TABLE I-continued

Non-Dimensionalized Values

| N | Side | X | Y | Z | TE? |
|---|---|---|---|---|---|
| 35 | P | −0.339 | 0.073 | 0.200 | N |
| 36 | P | −0.332 | 0.081 | 0.200 | N |
| 37 | P | −0.324 | 0.089 | 0.200 | N |
| 38 | P | −0.317 | 0.098 | 0.200 | N |
| 39 | P | −0.309 | 0.106 | 0.200 | N |
| 40 | P | −0.302 | 0.114 | 0.200 | N |
| 41 | P | −0.295 | 0.123 | 0.200 | N |
| 42 | P | −0.288 | 0.131 | 0.200 | N |
| 43 | P | −0.280 | 0.140 | 0.200 | N |
| 44 | P | −0.273 | 0.149 | 0.200 | N |
| 45 | P | −0.266 | 0.157 | 0.200 | N |
| 46 | P | −0.259 | 0.166 | 0.200 | N |
| 47 | P | −0.252 | 0.175 | 0.200 | N |
| 48 | P | −0.245 | 0.184 | 0.200 | N |
| 49 | P | −0.238 | 0.193 | 0.200 | N |
| 50 | P | −0.232 | 0.202 | 0.200 | N |
| 51 | P | −0.225 | 0.211 | 0.200 | N |
| 52 | P | −0.218 | 0.220 | 0.200 | N |
| 53 | P | −0.212 | 0.229 | 0.200 | N |
| 54 | P | −0.205 | 0.238 | 0.200 | N |
| 55 | P | −0.199 | 0.247 | 0.200 | N |
| 56 | P | −0.192 | 0.256 | 0.200 | N |
| 57 | P | −0.186 | 0.265 | 0.200 | N |
| 58 | P | −0.179 | 0.275 | 0.200 | N |
| 59 | P | −0.173 | 0.284 | 0.200 | N |
| 60 | P | −0.167 | 0.293 | 0.200 | N |
| 61 | P | −0.161 | 0.303 | 0.200 | N |
| 62 | P | −0.155 | 0.312 | 0.200 | N |
| 63 | P | −0.149 | 0.321 | 0.200 | N |
| 64 | P | −0.143 | 0.331 | 0.200 | N |
| 65 | P | −0.137 | 0.341 | 0.200 | N |
| 66 | P | −0.131 | 0.350 | 0.200 | N |
| 67 | P | −0.126 | 0.360 | 0.200 | N |
| 68 | P | −0.120 | 0.369 | 0.200 | N |
| 69 | P | −0.114 | 0.379 | 0.200 | N |
| 70 | P | −0.109 | 0.389 | 0.200 | N |
| 71 | P | −0.103 | 0.399 | 0.200 | N |
| 72 | P | −0.098 | 0.409 | 0.200 | N |
| 73 | P | −0.093 | 0.418 | 0.200 | N |
| 74 | P | −0.087 | 0.428 | 0.200 | N |
| 75 | P | −0.082 | 0.438 | 0.200 | N |
| 76 | P | −0.077 | 0.448 | 0.200 | N |
| 77 | P | −0.072 | 0.458 | 0.200 | N |
| 78 | P | −0.067 | 0.468 | 0.200 | N |
| 79 | P | −0.062 | 0.478 | 0.200 | N |
| 80 | P | −0.057 | 0.488 | 0.200 | N |
| 81 | P | −0.052 | 0.499 | 0.200 | N |
| 82 | P | −0.048 | 0.509 | 0.200 | N |
| 83 | P | −0.043 | 0.519 | 0.200 | N |
| 84 | P | −0.039 | 0.529 | 0.200 | N |
| 85 | P | −0.034 | 0.540 | 0.200 | N |
| 86 | P | −0.030 | 0.550 | 0.200 | N |
| 87 | P | −0.025 | 0.560 | 0.200 | N |
| 88 | P | −0.021 | 0.571 | 0.200 | Y |
| 89 | P | −0.019 | 0.574 | 0.200 | Y |
| 90 | P | −0.018 | 0.577 | 0.200 | Y |
| 91 | P | −0.015 | 0.580 | 0.200 | Y |
| 92 | P | −0.012 | 0.581 | 0.200 | Y |
| 93 | P | −0.009 | 0.581 | 0.200 | Y |
| 94 | P | −0.006 | 0.580 | 0.200 | Y |
| 95 | P | −0.003 | 0.578 | 0.200 | Y |
| 96 | P | −0.001 | 0.575 | 0.200 | Y |
| 97 | P | −0.001 | 0.572 | 0.200 | Y |
| 98 | P | 0.000 | 0.569 | 0.200 | Y |
| 99 | S | −0.594 | −0.201 | 0.200 | N |
| 100 | S | −0.593 | −0.212 | 0.200 | N |
| 101 | S | −0.591 | −0.223 | 0.200 | N |
| 102 | S | −0.587 | −0.234 | 0.200 | N |
| 103 | S | −0.581 | −0.243 | 0.200 | N |
| 104 | S | −0.575 | −0.253 | 0.200 | N |
| 105 | S | −0.568 | −0.261 | 0.200 | N |
| 106 | S | −0.560 | −0.269 | 0.200 | N |
| 107 | S | −0.552 | −0.277 | 0.200 | N |
| 108 | S | −0.543 | −0.284 | 0.200 | N |
| 109 | S | −0.533 | −0.290 | 0.200 | N |
| 110 | S | −0.524 | −0.296 | 0.200 | N |
| 111 | S | −0.514 | −0.301 | 0.200 | N |
| 112 | S | −0.504 | −0.306 | 0.200 | N |
| 113 | S | −0.493 | −0.310 | 0.200 | N |
| 114 | S | −0.483 | −0.313 | 0.200 | N |
| 115 | S | −0.472 | −0.316 | 0.200 | N |
| 116 | S | −0.461 | −0.318 | 0.200 | N |
| 117 | S | −0.450 | −0.319 | 0.200 | N |
| 118 | S | −0.438 | −0.319 | 0.200 | N |
| 119 | S | −0.427 | −0.318 | 0.200 | N |
| 120 | S | −0.416 | −0.317 | 0.200 | N |
| 121 | S | −0.405 | −0.315 | 0.200 | N |
| 122 | S | −0.394 | −0.312 | 0.200 | N |
| 123 | S | −0.384 | −0.309 | 0.200 | N |
| 124 | S | −0.373 | −0.305 | 0.200 | N |
| 125 | S | −0.363 | −0.300 | 0.200 | N |
| 126 | S | −0.353 | −0.295 | 0.200 | N |
| 127 | S | −0.343 | −0.289 | 0.200 | N |
| 128 | S | −0.334 | −0.283 | 0.200 | N |
| 129 | S | −0.325 | −0.277 | 0.200 | N |
| 130 | S | −0.316 | −0.270 | 0.200 | N |
| 131 | S | −0.307 | −0.263 | 0.200 | N |
| 132 | S | −0.299 | −0.255 | 0.200 | N |
| 133 | S | −0.290 | −0.248 | 0.200 | N |
| 134 | S | −0.282 | −0.240 | 0.200 | N |
| 135 | S | −0.275 | −0.232 | 0.200 | N |
| 136 | S | −0.267 | −0.223 | 0.200 | N |
| 137 | S | −0.260 | −0.215 | 0.200 | N |
| 138 | S | −0.253 | −0.206 | 0.200 | N |
| 139 | S | −0.246 | −0.197 | 0.200 | N |
| 140 | S | −0.239 | −0.189 | 0.200 | N |
| 141 | S | −0.233 | −0.179 | 0.200 | N |
| 142 | S | −0.226 | −0.170 | 0.200 | N |
| 143 | S | −0.220 | −0.161 | 0.200 | N |
| 144 | S | −0.214 | −0.151 | 0.200 | N |
| 145 | S | −0.208 | −0.142 | 0.200 | N |
| 146 | S | −0.202 | −0.132 | 0.200 | N |
| 147 | S | −0.197 | −0.122 | 0.200 | N |
| 148 | S | −0.192 | −0.113 | 0.200 | N |
| 149 | S | −0.186 | −0.103 | 0.200 | N |
| 150 | S | −0.181 | −0.093 | 0.200 | N |
| 151 | S | −0.176 | −0.083 | 0.200 | N |
| 152 | S | −0.171 | −0.073 | 0.200 | N |
| 153 | S | −0.167 | −0.062 | 0.200 | N |
| 154 | S | −0.162 | −0.052 | 0.200 | N |
| 155 | S | −0.157 | −0.042 | 0.200 | N |
| 156 | S | −0.153 | −0.032 | 0.200 | N |
| 157 | S | −0.149 | −0.021 | 0.200 | N |
| 158 | S | −0.144 | −0.011 | 0.200 | N |
| 159 | S | −0.140 | 0.000 | 0.200 | N |
| 160 | S | −0.136 | 0.010 | 0.200 | N |
| 161 | S | −0.132 | 0.020 | 0.200 | N |
| 162 | S | −0.129 | 0.031 | 0.200 | N |
| 163 | S | −0.125 | 0.042 | 0.200 | N |
| 164 | S | −0.121 | 0.052 | 0.200 | N |
| 165 | S | −0.117 | 0.063 | 0.200 | N |
| 166 | S | −0.114 | 0.073 | 0.200 | N |
| 167 | S | −0.110 | 0.084 | 0.200 | N |
| 168 | S | −0.107 | 0.095 | 0.200 | N |
| 169 | S | −0.104 | 0.105 | 0.200 | N |
| 170 | S | −0.100 | 0.116 | 0.200 | N |
| 171 | S | −0.097 | 0.127 | 0.200 | N |
| 172 | S | −0.094 | 0.138 | 0.200 | N |
| 173 | S | −0.091 | 0.148 | 0.200 | N |
| 174 | S | −0.088 | 0.159 | 0.200 | N |
| 175 | S | −0.085 | 0.170 | 0.200 | N |
| 176 | S | −0.082 | 0.181 | 0.200 | N |
| 177 | S | −0.079 | 0.192 | 0.200 | N |
| 178 | S | −0.076 | 0.203 | 0.200 | N |
| 179 | S | −0.073 | 0.213 | 0.200 | N |
| 180 | S | −0.071 | 0.224 | 0.200 | N |
| 181 | S | −0.068 | 0.235 | 0.200 | N |
| 182 | S | −0.065 | 0.246 | 0.200 | N |
| 183 | S | −0.063 | 0.257 | 0.200 | N |
| 184 | S | −0.060 | 0.268 | 0.200 | N |
| 185 | S | −0.058 | 0.279 | 0.200 | N |
| 186 | S | −0.055 | 0.290 | 0.200 | N |

TABLE I-continued

Non-Dimensionalized Values

| N | Side | X | Y | Z | TE? |
|---|---|---|---|---|---|
| 187 | S | −0.053 | 0.301 | 0.200 | N |
| 188 | S | −0.050 | 0.312 | 0.200 | N |
| 189 | S | −0.048 | 0.323 | 0.200 | N |
| 190 | S | −0.045 | 0.333 | 0.200 | N |
| 191 | S | −0.043 | 0.344 | 0.200 | N |
| 192 | S | −0.041 | 0.355 | 0.200 | N |
| 193 | S | −0.038 | 0.366 | 0.200 | N |
| 194 | S | −0.036 | 0.377 | 0.200 | N |
| 195 | S | −0.034 | 0.388 | 0.200 | N |
| 196 | S | −0.032 | 0.399 | 0.200 | N |
| 197 | S | −0.029 | 0.410 | 0.200 | N |
| 198 | S | −0.027 | 0.421 | 0.200 | N |
| 199 | S | −0.025 | 0.432 | 0.200 | N |
| 200 | S | −0.021 | 0.454 | 0.200 | N |
| 201 | S | −0.019 | 0.465 | 0.200 | N |
| 202 | S | −0.017 | 0.476 | 0.200 | N |
| 203 | S | −0.015 | 0.487 | 0.200 | N |
| 204 | S | −0.013 | 0.498 | 0.200 | N |
| 205 | S | −0.011 | 0.509 | 0.200 | N |
| 206 | S | −0.009 | 0.520 | 0.200 | N |
| 207 | S | −0.007 | 0.532 | 0.200 | N |
| 208 | S | −0.005 | 0.543 | 0.200 | N |
| 209 | S | −0.003 | 0.554 | 0.200 | Y |
| 210 | S | −0.001 | 0.565 | 0.200 | Y |
| 211 | S | 0.000 | 0.569 | 0.200 | Y |
| 1 | P | −0.599 | −0.204 | 0.300 | N |
| 2 | P | −0.598 | −0.193 | 0.300 | N |
| 3 | P | −0.596 | −0.182 | 0.300 | N |
| 4 | P | −0.592 | −0.171 | 0.300 | N |
| 5 | P | −0.587 | −0.161 | 0.300 | N |
| 6 | P | −0.581 | −0.151 | 0.300 | N |
| 7 | P | −0.573 | −0.142 | 0.300 | N |
| 8 | P | −0.566 | −0.134 | 0.300 | N |
| 9 | P | −0.557 | −0.127 | 0.300 | N |
| 10 | P | −0.548 | −0.119 | 0.300 | N |
| 11 | P | −0.539 | −0.112 | 0.300 | N |
| 12 | P | −0.530 | −0.105 | 0.300 | N |
| 13 | P | −0.522 | −0.098 | 0.300 | N |
| 14 | P | −0.513 | −0.091 | 0.300 | N |
| 15 | P | −0.504 | −0.083 | 0.300 | N |
| 16 | P | −0.496 | −0.076 | 0.300 | N |
| 17 | P | −0.487 | −0.069 | 0.300 | N |
| 18 | P | −0.478 | −0.061 | 0.300 | N |
| 19 | P | −0.470 | −0.054 | 0.300 | N |
| 20 | P | −0.461 | −0.046 | 0.300 | N |
| 21 | P | −0.453 | −0.038 | 0.300 | N |
| 22 | P | −0.445 | −0.031 | 0.300 | N |
| 23 | P | −0.436 | −0.023 | 0.300 | N |
| 24 | P | −0.428 | −0.015 | 0.300 | N |
| 25 | P | −0.420 | −0.007 | 0.300 | N |
| 26 | P | −0.412 | 0.001 | 0.300 | N |
| 27 | P | −0.404 | 0.009 | 0.300 | N |
| 28 | P | −0.396 | 0.017 | 0.300 | N |
| 29 | P | −0.388 | 0.025 | 0.300 | N |
| 30 | P | −0.380 | 0.033 | 0.300 | N |
| 31 | P | −0.372 | 0.041 | 0.300 | N |
| 32 | P | −0.364 | 0.050 | 0.300 | N |
| 33 | P | −0.356 | 0.058 | 0.300 | N |
| 34 | P | −0.349 | 0.066 | 0.300 | N |
| 35 | P | −0.341 | 0.075 | 0.300 | N |
| 36 | P | −0.333 | 0.083 | 0.300 | N |
| 37 | P | −0.326 | 0.092 | 0.300 | N |
| 38 | P | −0.318 | 0.100 | 0.300 | N |
| 39 | P | −0.311 | 0.109 | 0.300 | N |
| 40 | P | −0.304 | 0.118 | 0.300 | N |
| 41 | P | −0.296 | 0.126 | 0.300 | N |
| 42 | P | −0.289 | 0.135 | 0.300 | N |
| 43 | P | −0.282 | 0.144 | 0.300 | N |
| 44 | P | −0.275 | 0.153 | 0.300 | N |
| 45 | P | −0.268 | 0.162 | 0.300 | N |
| 46 | P | −0.261 | 0.171 | 0.300 | N |
| 47 | P | −0.254 | 0.180 | 0.300 | N |
| 48 | P | −0.247 | 0.189 | 0.300 | N |
| 49 | P | −0.240 | 0.198 | 0.300 | N |
| 50 | P | −0.233 | 0.207 | 0.300 | N |
| 51 | P | −0.226 | 0.216 | 0.300 | N |
| 52 | P | −0.220 | 0.225 | 0.300 | N |
| 53 | P | −0.213 | 0.235 | 0.300 | N |
| 54 | P | −0.207 | 0.244 | 0.300 | N |
| 55 | P | −0.200 | 0.253 | 0.300 | N |
| 56 | P | −0.194 | 0.263 | 0.300 | N |
| 57 | P | −0.187 | 0.272 | 0.300 | N |
| 58 | P | −0.181 | 0.281 | 0.300 | N |
| 59 | P | −0.175 | 0.291 | 0.300 | N |
| 60 | P | −0.169 | 0.301 | 0.300 | N |
| 61 | P | −0.163 | 0.310 | 0.300 | N |
| 62 | P | −0.157 | 0.320 | 0.300 | N |
| 63 | P | −0.151 | 0.329 | 0.300 | N |
| 64 | P | −0.145 | 0.339 | 0.300 | N |
| 65 | P | −0.139 | 0.349 | 0.300 | N |
| 66 | P | −0.133 | 0.359 | 0.300 | N |
| 67 | P | −0.127 | 0.369 | 0.300 | N |
| 68 | P | −0.122 | 0.378 | 0.300 | N |
| 69 | P | −0.116 | 0.388 | 0.300 | N |
| 70 | P | −0.111 | 0.398 | 0.300 | N |
| 71 | P | −0.105 | 0.408 | 0.300 | N |
| 72 | P | −0.100 | 0.418 | 0.300 | N |
| 73 | P | −0.094 | 0.428 | 0.300 | N |
| 74 | P | −0.089 | 0.438 | 0.300 | N |
| 75 | P | −0.084 | 0.449 | 0.300 | N |
| 76 | P | −0.079 | 0.459 | 0.300 | N |
| 77 | P | −0.074 | 0.469 | 0.300 | N |
| 78 | P | −0.069 | 0.479 | 0.300 | N |
| 79 | P | −0.064 | 0.489 | 0.300 | N |
| 80 | P | −0.059 | 0.500 | 0.300 | N |
| 81 | P | −0.054 | 0.510 | 0.300 | N |
| 82 | P | −0.050 | 0.520 | 0.300 | N |
| 83 | P | −0.045 | 0.531 | 0.300 | N |
| 84 | P | −0.040 | 0.541 | 0.300 | N |
| 85 | P | −0.036 | 0.552 | 0.300 | N |
| 86 | P | −0.032 | 0.562 | 0.300 | N |
| 87 | P | −0.027 | 0.573 | 0.300 | Y |
| 88 | P | −0.023 | 0.583 | 0.300 | Y |
| 89 | P | −0.021 | 0.587 | 0.300 | Y |
| 90 | P | −0.019 | 0.590 | 0.300 | Y |
| 91 | P | −0.017 | 0.592 | 0.300 | Y |
| 92 | P | −0.014 | 0.594 | 0.300 | Y |
| 93 | P | −0.011 | 0.594 | 0.300 | Y |
| 94 | P | −0.008 | 0.593 | 0.300 | Y |
| 95 | P | −0.005 | 0.591 | 0.300 | Y |
| 96 | P | −0.003 | 0.588 | 0.300 | Y |
| 97 | P | −0.002 | 0.582 | 0.300 | Y |
| 98 | S | −0.599 | −0.204 | 0.300 | N |
| 99 | S | −0.598 | −0.215 | 0.300 | N |
| 100 | S | −0.595 | −0.226 | 0.300 | N |
| 101 | S | −0.591 | −0.237 | 0.300 | N |
| 102 | S | −0.586 | −0.247 | 0.300 | N |
| 103 | S | −0.579 | −0.256 | 0.300 | N |
| 104 | S | −0.572 | −0.265 | 0.300 | N |
| 105 | S | −0.564 | −0.273 | 0.300 | N |
| 106 | S | −0.555 | −0.280 | 0.300 | N |
| 107 | S | −0.546 | −0.287 | 0.300 | N |
| 108 | S | −0.537 | −0.294 | 0.300 | N |
| 109 | S | −0.527 | −0.300 | 0.300 | N |
| 110 | S | −0.517 | −0.305 | 0.300 | N |
| 111 | S | −0.507 | −0.310 | 0.300 | N |
| 112 | S | −0.496 | −0.314 | 0.300 | N |
| 113 | S | −0.485 | −0.317 | 0.300 | N |
| 114 | S | −0.474 | −0.320 | 0.300 | N |
| 115 | S | −0.463 | −0.321 | 0.300 | N |
| 116 | S | −0.452 | −0.322 | 0.300 | N |
| 117 | S | −0.440 | −0.322 | 0.300 | N |
| 118 | S | −0.429 | −0.322 | 0.300 | N |
| 119 | S | −0.418 | −0.320 | 0.300 | N |
| 120 | S | −0.406 | −0.318 | 0.300 | N |
| 121 | S | −0.396 | −0.315 | 0.300 | N |
| 122 | S | −0.385 | −0.311 | 0.300 | N |
| 123 | S | −0.374 | −0.307 | 0.300 | N |
| 124 | S | −0.364 | −0.302 | 0.300 | N |
| 125 | S | −0.354 | −0.297 | 0.300 | N |
| 126 | S | −0.344 | −0.291 | 0.300 | N |
| 127 | S | −0.334 | −0.285 | 0.300 | N |

TABLE I-continued

Non-Dimensionalized Values

| N | Side | X | Y | Z | TE? |
|---|---|---|---|---|---|
| 128 | S | −0.325 | −0.278 | 0.300 | N |
| 129 | S | −0.316 | −0.271 | 0.300 | N |
| 130 | S | −0.307 | −0.264 | 0.300 | N |
| 131 | S | −0.299 | −0.257 | 0.300 | N |
| 132 | S | −0.291 | −0.249 | 0.300 | N |
| 133 | S | −0.283 | −0.241 | 0.300 | N |
| 134 | S | −0.275 | −0.233 | 0.300 | N |
| 135 | S | −0.267 | −0.224 | 0.300 | N |
| 136 | S | −0.260 | −0.215 | 0.300 | N |
| 137 | S | −0.253 | −0.207 | 0.300 | N |
| 138 | S | −0.246 | −0.198 | 0.300 | N |
| 139 | S | −0.239 | −0.188 | 0.300 | N |
| 140 | S | −0.232 | −0.179 | 0.300 | N |
| 141 | S | −0.226 | −0.170 | 0.300 | N |
| 142 | S | −0.220 | −0.160 | 0.300 | N |
| 143 | S | −0.214 | −0.151 | 0.300 | N |
| 144 | S | −0.208 | −0.141 | 0.300 | N |
| 145 | S | −0.202 | −0.131 | 0.300 | N |
| 146 | S | −0.196 | −0.121 | 0.300 | N |
| 147 | S | −0.191 | −0.111 | 0.300 | N |
| 148 | S | −0.186 | −0.101 | 0.300 | N |
| 149 | S | −0.181 | −0.091 | 0.300 | N |
| 150 | S | −0.176 | −0.081 | 0.300 | N |
| 151 | S | −0.171 | −0.070 | 0.300 | N |
| 152 | S | −0.166 | −0.060 | 0.300 | N |
| 153 | S | −0.161 | −0.050 | 0.300 | N |
| 154 | S | −0.157 | −0.039 | 0.300 | N |
| 155 | S | −0.153 | −0.029 | 0.300 | N |
| 156 | S | −0.148 | −0.018 | 0.300 | N |
| 157 | S | −0.144 | −0.008 | 0.300 | N |
| 158 | S | −0.140 | 0.003 | 0.300 | N |
| 159 | S | −0.136 | 0.014 | 0.300 | N |
| 160 | S | −0.132 | 0.024 | 0.300 | N |
| 161 | S | −0.128 | 0.035 | 0.300 | N |
| 162 | S | −0.125 | 0.046 | 0.300 | N |
| 163 | S | −0.121 | 0.057 | 0.300 | N |
| 164 | S | −0.117 | 0.067 | 0.300 | N |
| 165 | S | −0.114 | 0.078 | 0.300 | N |
| 166 | S | −0.111 | 0.089 | 0.300 | N |
| 167 | S | −0.107 | 0.100 | 0.300 | N |
| 168 | S | −0.104 | 0.111 | 0.300 | N |
| 169 | S | −0.101 | 0.122 | 0.300 | N |
| 170 | S | −0.098 | 0.133 | 0.300 | N |
| 171 | S | −0.094 | 0.144 | 0.300 | N |
| 172 | S | −0.091 | 0.155 | 0.300 | N |
| 173 | S | −0.088 | 0.166 | 0.300 | N |
| 174 | S | −0.085 | 0.177 | 0.300 | N |
| 175 | S | −0.083 | 0.188 | 0.300 | N |
| 176 | S | −0.080 | 0.199 | 0.300 | N |
| 177 | S | −0.077 | 0.210 | 0.300 | N |
| 178 | S | −0.074 | 0.221 | 0.300 | N |
| 179 | S | −0.071 | 0.232 | 0.300 | N |
| 180 | S | −0.069 | 0.243 | 0.300 | N |
| 181 | S | −0.066 | 0.254 | 0.300 | N |
| 182 | S | −0.064 | 0.265 | 0.300 | N |
| 183 | S | −0.061 | 0.276 | 0.300 | N |
| 184 | S | −0.058 | 0.287 | 0.300 | N |
| 185 | S | −0.056 | 0.298 | 0.300 | N |
| 186 | S | −0.054 | 0.309 | 0.300 | N |
| 187 | S | −0.051 | 0.320 | 0.300 | N |
| 188 | S | −0.049 | 0.331 | 0.300 | N |
| 189 | S | −0.046 | 0.343 | 0.300 | N |
| 190 | S | −0.044 | 0.354 | 0.300 | N |
| 191 | S | −0.042 | 0.365 | 0.300 | N |
| 192 | S | 0.040 | 0.376 | 0.300 | N |
| 193 | S | −0.037 | 0.387 | 0.300 | N |
| 194 | S | −0.035 | 0.398 | 0.300 | N |
| 195 | S | −0.033 | 0.409 | 0.300 | N |
| 196 | S | −0.031 | 0.421 | 0.300 | N |
| 197 | S | −0.029 | 0.432 | 0.300 | N |
| 198 | S | −0.026 | 0.443 | 0.300 | N |
| 199 | S | −0.024 | 0.454 | 0.300 | N |
| 200 | S | −0.022 | 0.465 | 0.300 | N |
| 201 | S | −0.020 | 0.477 | 0.300 | N |
| 202 | S | −0.018 | 0.488 | 0.300 | N |
| 203 | S | −0.016 | 0.499 | 0.300 | N |
| 204 | S | −0.014 | 0.510 | 0.300 | N |
| 205 | S | −0.012 | 0.521 | 0.300 | N |
| 206 | S | −0.010 | 0.533 | 0.300 | N |
| 207 | S | −0.008 | 0.544 | 0.300 | N |
| 208 | S | −0.006 | 0.555 | 0.300 | N |
| 209 | S | −0.005 | 0.566 | 0.300 | Y |
| 210 | S | −0.003 | 0.577 | 0.300 | Y |
| 211 | S | −0.002 | 0.582 | 0.300 | Y |
| 1 | P | −0.604 | −0.206 | 0.400 | N |
| 2 | P | −0.603 | −0.195 | 0.400 | N |
| 3 | P | −0.600 | −0.184 | 0.400 | N |
| 4 | P | −0.596 | −0.173 | 0.400 | N |
| 5 | P | −0.591 | −0.163 | 0.400 | N |
| 6 | P | −0.584 | −0.153 | 0.400 | N |
| 7 | P | −0.577 | −0.144 | 0.400 | N |
| 8 | P | −0.569 | −0.136 | 0.400 | N |
| 9 | P | −0.560 | −0.128 | 0.400 | N |
| 10 | P | −0.551 | −0.121 | 0.400 | N |
| 11 | P | −0.542 | −0.114 | 0.400 | N |
| 12 | P | −0.533 | −0.107 | 0.400 | N |
| 13 | P | −0.524 | −0.099 | 0.400 | N |
| 14 | P | −0.515 | −0.092 | 0.400 | N |
| 15 | P | −0.506 | −0.085 | 0.400 | N |
| 16 | P | −0.498 | −0.077 | 0.400 | N |
| 17 | P | −0.489 | −0.069 | 0.400 | N |
| 18 | P | −0.480 | −0.062 | 0.400 | N |
| 19 | P | −0.472 | −0.054 | 0.400 | N |
| 20 | P | −0.463 | −0.046 | 0.400 | N |
| 21 | P | −0.455 | −0.038 | 0.400 | N |
| 22 | P | −0.446 | −0.031 | 0.400 | N |
| 23 | P | −0.438 | −0.023 | 0.400 | N |
| 24 | P | −0.430 | −0.015 | 0.400 | N |
| 25 | P | −0.421 | −0.007 | 0.400 | N |
| 26 | P | −0.413 | 0.002 | 0.400 | N |
| 27 | P | −0.405 | 0.010 | 0.400 | N |
| 28 | P | −0.397 | 0.018 | 0.400 | N |
| 29 | P | −0.389 | 0.026 | 0.400 | N |
| 30 | P | −0.381 | 0.035 | 0.400 | N |
| 31 | P | −0.373 | 0.043 | 0.400 | N |
| 32 | P | −0.365 | 0.051 | 0.400 | N |
| 33 | P | −0.357 | 0.060 | 0.400 | N |
| 34 | P | −0.350 | 0.068 | 0.400 | N |
| 35 | P | −0.342 | 0.077 | 0.400 | N |
| 36 | P | −0.334 | 0.086 | 0.400 | N |
| 37 | P | −0.327 | 0.094 | 0.400 | N |
| 38 | P | −0.319 | 0.103 | 0.400 | N |
| 39 | P | −0.312 | 0.112 | 0.400 | N |
| 40 | P | −0.304 | 0.121 | 0.400 | N |
| 41 | P | −0.297 | 0.130 | 0.400 | N |
| 42 | P | −0.290 | 0.139 | 0.400 | N |
| 43 | P | −0.282 | 0.148 | 0.400 | N |
| 44 | P | −0.275 | 0.157 | 0.400 | N |
| 45 | P | −0.268 | 0.166 | 0.400 | N |
| 46 | P | −0.261 | 0.175 | 0.400 | N |
| 47 | P | −0.254 | 0.184 | 0.400 | N |
| 48 | P | −0.247 | 0.193 | 0.400 | N |
| 49 | P | −0.240 | 0.203 | 0.400 | N |
| 50 | P | −0.233 | 0.212 | 0.400 | N |
| 51 | P | −0.227 | 0.221 | 0.400 | N |
| 52 | P | −0.220 | 0.231 | 0.400 | N |
| 53 | P | −0.213 | 0.240 | 0.400 | N |
| 54 | P | −0.207 | 0.250 | 0.400 | N |
| 55 | P | −0.200 | 0.259 | 0.400 | N |
| 56 | P | −0.194 | 0.269 | 0.400 | N |
| 57 | P | −0.187 | 0.278 | 0.400 | N |
| 58 | P | −0.181 | 0.288 | 0.400 | N |
| 59 | P | −0.175 | 0.298 | 0.400 | N |
| 60 | P | −0.169 | 0.307 | 0.400 | N |
| 61 | P | −0.163 | 0.317 | 0.400 | N |
| 62 | P | −0.157 | 0.327 | 0.400 | N |
| 63 | P | −0.151 | 0.337 | 0.400 | N |
| 64 | P | −0.145 | 0.347 | 0.400 | N |
| 65 | P | −0.139 | 0.357 | 0.400 | N |
| 66 | P | −0.133 | 0.367 | 0.400 | N |
| 67 | P | −0.127 | 0.377 | 0.400 | N |
| 68 | P | −0.122 | 0.387 | 0.400 | N |

TABLE I-continued

Non-Dimensionalized Values

| N | Side | X | Y | Z | TE? |
|---|---|---|---|---|---|
| 69 | P | −0.116 | 0.397 | 0.400 | N |
| 70 | P | −0.110 | 0.407 | 0.400 | N |
| 71 | P | −0.105 | 0.417 | 0.400 | N |
| 72 | P | −0.100 | 0.427 | 0.400 | N |
| 73 | P | −0.094 | 0.438 | 0.400 | N |
| 74 | P | −0.089 | 0.448 | 0.400 | N |
| 75 | P | −0.084 | 0.458 | 0.400 | N |
| 76 | P | −0.079 | 0.468 | 0.400 | N |
| 77 | P | −0.073 | 0.479 | 0.400 | N |
| 78 | P | −0.068 | 0.489 | 0.400 | N |
| 79 | P | −0.064 | 0.500 | 0.400 | N |
| 80 | P | −0.059 | 0.510 | 0.400 | N |
| 81 | P | −0.054 | 0.521 | 0.400 | N |
| 82 | P | −0.049 | 0.531 | 0.400 | N |
| 83 | P | −0.045 | 0.542 | 0.400 | N |
| 84 | P | −0.040 | 0.552 | 0.400 | N |
| 85 | P | −0.035 | 0.563 | 0.400 | N |
| 86 | P | −0.031 | 0.574 | 0.400 | N |
| 87 | P | −0.027 | 0.584 | 0.400 | N |
| 88 | P | −0.022 | 0.595 | 0.400 | Y |
| 89 | P | −0.020 | 0.599 | 0.400 | Y |
| 90 | P | −0.019 | 0.602 | 0.400 | Y |
| 91 | P | −0.016 | 0.604 | 0.400 | Y |
| 92 | P | −0.013 | 0.605 | 0.400 | Y |
| 93 | P | −0.010 | 0.606 | 0.400 | Y |
| 94 | P | −0.007 | 0.605 | 0.400 | Y |
| 95 | P | −0.004 | 0.603 | 0.400 | Y |
| 96 | P | −0.002 | 0.600 | 0.400 | Y |
| 97 | P | −0.002 | 0.597 | 0.400 | Y |
| 98 | P | −0.002 | 0.593 | 0.400 | Y |
| 99 | S | −0.604 | −0.206 | 0.400 | N |
| 100 | S | −0.603 | −0.218 | 0.400 | N |
| 101 | S | −0.600 | −0.229 | 0.400 | N |
| 102 | S | −0.596 | −0.240 | 0.400 | N |
| 103 | S | −0.590 | −0.250 | 0.400 | N |
| 104 | S | −0.584 | −0.259 | 0.400 | N |
| 105 | S | −0.576 | −0.268 | 0.400 | N |
| 106 | S | −0.568 | −0.276 | 0.400 | N |
| 107 | S | −0.559 | −0.284 | 0.400 | N |
| 108 | S | −0.550 | −0.291 | 0.400 | N |
| 109 | S | −0.541 | −0.297 | 0.400 | N |
| 110 | S | −0.531 | −0.303 | 0.400 | N |
| 111 | S | −0.520 | −0.309 | 0.400 | N |
| 112 | S | −0.510 | −0.313 | 0.400 | N |
| 113 | S | −0.499 | −0.317 | 0.400 | N |
| 114 | S | −0.488 | −0.321 | 0.400 | N |
| 115 | S | −0.477 | −0.323 | 0.400 | N |
| 116 | S | −0.465 | −0.325 | 0.400 | N |
| 117 | S | −0.454 | −0.325 | 0.400 | N |
| 118 | S | −0.442 | −0.325 | 0.400 | N |
| 119 | S | −0.431 | −0.325 | 0.400 | N |
| 120 | S | −0.419 | −0.323 | 0.400 | N |
| 121 | S | −0.408 | −0.321 | 0.400 | N |
| 122 | S | −0.397 | −0.317 | 0.400 | N |
| 123 | S | −0.386 | −0.314 | 0.400 | N |
| 124 | S | −0.375 | −0.309 | 0.400 | N |
| 125 | S | −0.365 | −0.305 | 0.400 | N |
| 126 | S | −0.355 | −0.299 | 0.400 | N |
| 127 | S | −0.345 | −0.293 | 0.400 | N |
| 128 | S | −0.335 | −0.287 | 0.400 | N |
| 129 | S | −0.326 | −0.280 | 0.400 | N |
| 130 | S | −0.316 | −0.273 | 0.400 | N |
| 131 | S | −0.308 | −0.266 | 0.400 | N |
| 132 | S | −0.299 | −0.258 | 0.400 | N |
| 133 | S | −0.291 | −0.250 | 0.400 | N |
| 134 | S | −0.282 | −0.242 | 0.400 | N |
| 135 | S | −0.274 | −0.234 | 0.400 | N |
| 136 | S | −0.267 | −0.225 | 0.400 | N |
| 137 | S | −0.259 | −0.216 | 0.400 | N |
| 138 | S | −0.252 | −0.207 | 0.400 | N |
| 139 | S | −0.245 | −0.198 | 0.400 | N |
| 140 | S | −0.238 | −0.189 | 0.400 | N |
| 141 | S | −0.231 | −0.179 | 0.400 | N |
| 142 | S | −0.225 | −0.170 | 0.400 | N |
| 143 | S | −0.219 | −0.160 | 0.400 | N |
| 144 | S | −0.213 | −0.150 | 0.400 | N |
| 145 | S | −0.207 | −0.141 | 0.400 | N |
| 146 | S | −0.201 | −0.131 | 0.400 | N |
| 147 | S | −0.195 | −0.120 | 0.400 | N |
| 148 | S | −0.190 | −0.110 | 0.400 | N |
| 149 | S | −0.185 | −0.100 | 0.400 | N |
| 150 | S | −0.179 | −0.090 | 0.400 | N |
| 151 | S | −0.174 | −0.079 | 0.400 | N |
| 152 | S | −0.169 | −0.069 | 0.400 | N |
| 153 | S | −0.165 | −0.058 | 0.400 | N |
| 154 | S | −0.160 | −0.048 | 0.400 | N |
| 155 | S | −0.156 | −0.037 | 0.400 | N |
| 156 | S | −0.151 | −0.027 | 0.400 | N |
| 157 | S | −0.147 | −0.016 | 0.400 | N |
| 158 | S | −0.143 | −0.005 | 0.400 | N |
| 159 | S | −0.139 | 0.006 | 0.400 | N |
| 160 | S | −0.135 | 0.017 | 0.400 | N |
| 161 | S | −0.131 | 0.027 | 0.400 | N |
| 162 | S | −0.127 | 0.038 | 0.400 | N |
| 163 | S | −0.123 | 0.049 | 0.400 | N |
| 164 | S | −0.120 | 0.060 | 0.400 | N |
| 165 | S | −0.116 | 0.071 | 0.400 | N |
| 166 | S | −0.113 | 0.082 | 0.400 | N |
| 167 | S | −0.109 | 0.093 | 0.400 | N |
| 168 | S | −0.106 | 0.104 | 0.400 | N |
| 169 | S | −0.103 | 0.115 | 0.400 | N |
| 170 | S | −0.099 | 0.126 | 0.400 | N |
| 171 | S | −0.096 | 0.138 | 0.400 | N |
| 172 | S | −0.093 | 0.149 | 0.400 | N |
| 173 | S | −0.090 | 0.160 | 0.400 | N |
| 174 | S | −0.087 | 0.171 | 0.400 | N |
| 175 | S | −0.084 | 0.182 | 0.400 | N |
| 176 | S | −0.081 | 0.193 | 0.400 | N |
| 177 | S | −0.079 | 0.204 | 0.400 | N |
| 178 | S | −0.076 | 0.216 | 0.400 | N |
| 179 | S | −0.073 | 0.227 | 0.400 | N |
| 180 | S | −0.070 | 0.238 | 0.400 | N |
| 181 | S | −0.068 | 0.249 | 0.400 | N |
| 182 | S | −0.065 | 0.261 | 0.400 | N |
| 183 | S | −0.062 | 0.272 | 0.400 | N |
| 184 | S | −0.060 | 0.283 | 0.400 | N |
| 185 | S | −0.057 | 0.294 | 0.400 | N |
| 186 | S | −0.055 | 0.306 | 0.400 | N |
| 187 | S | −0.053 | 0.317 | 0.400 | N |
| 188 | S | −0.050 | 0.328 | 0.400 | N |
| 189 | S | −0.048 | 0.340 | 0.400 | N |
| 190 | S | −0.045 | 0.351 | 0.400 | N |
| 191 | S | −0.043 | 0.362 | 0.400 | N |
| 192 | S | −0.041 | 0.373 | 0.400 | N |
| 193 | S | −0.039 | 0.385 | 0.400 | N |
| 194 | S | −0.036 | 0.396 | 0.400 | N |
| 195 | S | −0.034 | 0.407 | 0.400 | N |
| 196 | S | −0.032 | 0.419 | 0.400 | N |
| 197 | S | −0.028 | 0.441 | 0.400 | N |
| 198 | S | −0.026 | 0.453 | 0.400 | N |
| 199 | S | −0.024 | 0.464 | 0.400 | N |
| 200 | S | −0.022 | 0.475 | 0.400 | N |
| 201 | S | −0.019 | 0.487 | 0.400 | N |
| 202 | S | −0.017 | 0.498 | 0.400 | N |
| 203 | S | −0.015 | 0.510 | 0.400 | N |
| 204 | S | −0.013 | 0.521 | 0.400 | N |
| 205 | S | −0.012 | 0.532 | 0.400 | N |
| 206 | S | −0.010 | 0.544 | 0.400 | N |
| 207 | S | −0.008 | 0.555 | 0.400 | N |
| 208 | S | −0.006 | 0.566 | 0.400 | N |
| 209 | S | −0.004 | 0.578 | 0.400 | Y |
| 210 | S | −0.002 | 0.589 | 0.400 | Y |
| 211 | S | −0.002 | 0.593 | 0.400 | Y |
| 1 | P | −0.608 | −0.209 | 0.500 | N |
| 2 | P | −0.607 | −0.197 | 0.500 | N |
| 3 | P | −0.604 | −0.186 | 0.500 | N |
| 4 | P | −0.600 | −0.175 | 0.500 | N |
| 5 | P | −0.595 | −0.165 | 0.500 | N |
| 6 | P | −0.588 | −0.155 | 0.500 | N |
| 7 | P | −0.580 | −0.146 | 0.500 | N |
| 8 | P | −0.572 | −0.138 | 0.500 | N |
| 9 | P | −0.563 | −0.131 | 0.500 | N |

TABLE I-continued

Non-Dimensionalized Values

| N | Side | X | Y | Z | TE? |
|---|---|---|---|---|---|
| 10 | P | −0.554 | −0.123 | 0.500 | N |
| 11 | P | −0.545 | −0.116 | 0.500 | N |
| 12 | P | −0.536 | −0.109 | 0.500 | N |
| 13 | P | −0.527 | −0.101 | 0.500 | N |
| 14 | P | −0.518 | −0.094 | 0.500 | N |
| 15 | P | −0.509 | −0.086 | 0.500 | N |
| 16 | P | −0.500 | −0.078 | 0.500 | N |
| 17 | P | −0.491 | −0.071 | 0.500 | N |
| 18 | P | −0.483 | −0.063 | 0.500 | N |
| 19 | P | −0.474 | −0.055 | 0.500 | N |
| 20 | P | −0.465 | −0.047 | 0.500 | N |
| 21 | P | −0.457 | −0.039 | 0.500 | N |
| 22 | P | −0.448 | −0.031 | 0.500 | N |
| 23 | P | −0.440 | −0.023 | 0.500 | N |
| 24 | P | −0.432 | −0.015 | 0.500 | N |
| 25 | P | −0.423 | −0.007 | 0.500 | N |
| 26 | P | −0.415 | 0.001 | 0.500 | N |
| 27 | P | −0.407 | 0.010 | 0.500 | N |
| 28 | P | −0.399 | 0.018 | 0.500 | N |
| 29 | P | −0.391 | 0.027 | 0.500 | N |
| 30 | P | −0.383 | 0.035 | 0.500 | N |
| 31 | P | −0.375 | 0.044 | 0.500 | N |
| 32 | P | −0.367 | 0.052 | 0.500 | N |
| 33 | P | −0.359 | 0.061 | 0.500 | N |
| 34 | P | −0.351 | 0.069 | 0.500 | N |
| 35 | P | −0.343 | 0.078 | 0.500 | N |
| 36 | P | −0.336 | 0.087 | 0.500 | N |
| 37 | P | −0.328 | 0.096 | 0.500 | N |
| 38 | P | −0.320 | 0.105 | 0.500 | N |
| 39 | P | −0.313 | 0.114 | 0.500 | N |
| 40 | P | −0.305 | 0.123 | 0.500 | N |
| 41 | P | −0.298 | 0.132 | 0.500 | N |
| 42 | P | −0.291 | 0.141 | 0.500 | N |
| 43 | P | −0.283 | 0.150 | 0.500 | N |
| 44 | P | −0.276 | 0.159 | 0.500 | N |
| 45 | P | −0.269 | 0.168 | 0.500 | N |
| 46 | P | −0.262 | 0.178 | 0.500 | N |
| 47 | P | −0.255 | 0.187 | 0.500 | N |
| 48 | P | −0.248 | 0.196 | 0.500 | N |
| 49 | P | −0.241 | 0.206 | 0.500 | N |
| 50 | P | −0.234 | 0.215 | 0.500 | N |
| 51 | P | −0.227 | 0.225 | 0.500 | N |
| 52 | P | −0.221 | 0.234 | 0.500 | N |
| 53 | P | −0.214 | 0.244 | 0.500 | N |
| 54 | P | −0.207 | 0.253 | 0.500 | N |
| 55 | P | −0.201 | 0.263 | 0.500 | N |
| 56 | P | −0.194 | 0.273 | 0.500 | N |
| 57 | P | −0.188 | 0.283 | 0.500 | N |
| 58 | P | −0.182 | 0.292 | 0.500 | N |
| 59 | P | −0.175 | 0.302 | 0.500 | N |
| 60 | P | −0.169 | 0.312 | 0.500 | N |
| 61 | P | −0.163 | 0.322 | 0.500 | N |
| 62 | P | −0.157 | 0.332 | 0.500 | N |
| 63 | P | −0.151 | 0.342 | 0.500 | N |
| 64 | P | −0.145 | 0.352 | 0.500 | N |
| 65 | P | −0.139 | 0.362 | 0.500 | N |
| 66 | P | −0.133 | 0.372 | 0.500 | N |
| 67 | P | −0.127 | 0.382 | 0.500 | N |
| 68 | P | −0.122 | 0.393 | 0.500 | N |
| 69 | P | −0.116 | 0.403 | 0.500 | N |
| 70 | P | −0.111 | 0.413 | 0.500 | N |
| 71 | P | −0.105 | 0.423 | 0.500 | N |
| 72 | P | −0.100 | 0.434 | 0.500 | N |
| 73 | P | −0.094 | 0.444 | 0.500 | N |
| 74 | P | −0.089 | 0.455 | 0.500 | N |
| 75 | P | −0.084 | 0.465 | 0.500 | N |
| 76 | P | −0.079 | 0.476 | 0.500 | N |
| 77 | P | −0.073 | 0.486 | 0.500 | N |
| 78 | P | −0.068 | 0.497 | 0.500 | N |
| 79 | P | −0.063 | 0.507 | 0.500 | N |
| 80 | P | −0.059 | 0.518 | 0.500 | N |
| 81 | P | −0.054 | 0.528 | 0.500 | N |
| 82 | P | −0.049 | 0.539 | 0.500 | N |
| 83 | P | −0.044 | 0.550 | 0.500 | N |
| 84 | P | −0.040 | 0.560 | 0.500 | N |
| 85 | P | −0.035 | 0.571 | 0.500 | N |
| 86 | P | −0.031 | 0.582 | 0.500 | N |
| 87 | P | −0.026 | 0.593 | 0.500 | Y |
| 88 | P | −0.022 | 0.604 | 0.500 | Y |
| 89 | P | −0.018 | 0.610 | 0.500 | Y |
| 90 | P | −0.016 | 0.613 | 0.500 | Y |
| 91 | P | −0.013 | 0.614 | 0.500 | Y |
| 92 | P | −0.010 | 0.614 | 0.500 | Y |
| 93 | P | −0.007 | 0.613 | 0.500 | Y |
| 94 | P | −0.004 | 0.612 | 0.500 | Y |
| 95 | P | −0.002 | 0.609 | 0.500 | Y |
| 96 | P | −0.001 | 0.606 | 0.500 | Y |
| 97 | P | −0.001 | 0.602 | 0.500 | Y |
| 98 | S | −0.608 | −0.209 | 0.500 | N |
| 99 | S | −0.607 | −0.220 | 0.500 | N |
| 100 | S | −0.605 | −0.232 | 0.500 | N |
| 101 | S | −0.600 | −0.243 | 0.500 | N |
| 102 | S | −0.595 | −0.253 | 0.500 | N |
| 103 | S | −0.588 | −0.263 | 0.500 | N |
| 104 | S | −0.580 | −0.271 | 0.500 | N |
| 105 | S | −0.572 | −0.280 | 0.500 | N |
| 106 | S | −0.563 | −0.287 | 0.500 | N |
| 107 | S | −0.554 | −0.294 | 0.500 | N |
| 108 | S | −0.544 | −0.301 | 0.500 | N |
| 109 | S | −0.534 | −0.307 | 0.500 | N |
| 110 | S | −0.524 | −0.312 | 0.500 | N |
| 111 | S | −0.513 | −0.317 | 0.500 | N |
| 112 | S | −0.502 | −0.321 | 0.500 | N |
| 113 | S | −0.491 | −0.324 | 0.500 | N |
| 114 | S | −0.479 | −0.326 | 0.500 | N |
| 115 | S | −0.468 | −0.328 | 0.500 | N |
| 116 | S | −0.456 | −0.328 | 0.500 | N |
| 117 | S | −0.444 | 0.328 | 0.500 | N |
| 118 | S | −0.433 | −0.327 | 0.500 | N |
| 119 | S | −0.421 | −0.326 | 0.500 | N |
| 120 | S | −0.410 | −0.323 | 0.500 | N |
| 121 | S | −0.399 | −0.320 | 0.500 | N |
| 122 | S | −0.388 | −0.316 | 0.500 | N |
| 123 | S | −0.377 | −0.312 | 0.500 | N |
| 124 | S | −0.366 | −0.307 | 0.500 | N |
| 125 | S | −0.356 | −0.301 | 0.500 | N |
| 126 | S | −0.346 | −0.295 | 0.500 | N |
| 127 | S | −0.336 | −0.289 | 0.500 | N |
| 128 | S | −0.327 | −0.282 | 0.500 | N |
| 129 | S | −0.317 | −0.275 | 0.500 | N |
| 130 | S | −0.308 | −0.268 | 0.500 | N |
| 131 | S | −0.300 | −0.260 | 0.500 | N |
| 132 | S | −0.291 | −0.252 | 0.500 | N |
| 133 | S | −0.283 | −0.244 | 0.500 | N |
| 134 | S | −0.275 | −0.235 | 0.500 | N |
| 135 | S | −0.267 | −0.227 | 0.500 | N |
| 136 | S | −0.259 | −0.218 | 0.500 | N |
| 137 | S | −0.252 | −0.209 | 0.500 | N |
| 138 | S | −0.245 | −0.199 | 0.500 | N |
| 139 | S | −0.238 | −0.190 | 0.500 | N |
| 140 | S | −0.231 | −0.180 | 0.500 | N |
| 141 | S | −0.225 | −0.171 | 0.500 | N |
| 142 | S | −0.218 | −0.161 | 0.500 | N |
| 143 | S | −0.212 | −0.151 | 0.500 | N |
| 144 | S | −0.206 | −0.141 | 0.500 | N |
| 145 | S | −0.200 | −0.131 | 0.500 | N |
| 146 | S | −0.195 | −0.121 | 0.500 | N |
| 147 | S | −0.189 | −0.110 | 0.500 | N |
| 148 | S | −0.184 | −0.100 | 0.500 | N |
| 149 | S | −0.179 | −0.090 | 0.500 | N |
| 150 | S | −0.173 | −0.079 | 0.500 | N |
| 151 | S | −0.169 | −0.068 | 0.500 | N |
| 152 | S | −0.164 | −0.058 | 0.500 | N |
| 153 | S | −0.159 | −0.047 | 0.500 | N |
| 154 | S | −0.155 | −0.036 | 0.500 | N |
| 155 | S | −0.150 | −0.026 | 0.500 | N |
| 156 | S | −0.146 | −0.015 | 0.500 | N |
| 157 | S | −0.142 | −0.004 | 0.500 | N |
| 158 | S | −0.138 | 0.007 | 0.500 | N |
| 159 | S | −0.134 | 0.018 | 0.500 | N |
| 160 | S | −0.130 | 0.029 | 0.500 | N |
| 161 | S | −0.126 | 0.040 | 0.500 | N |

TABLE I-continued

Non-Dimensionalized Values

| N | Side | X | Y | Z | TE? |
|---|---|---|---|---|---|
| 162 | S | −0.122 | 0.051 | 0.500 | N |
| 163 | S | −0.119 | 0.062 | 0.500 | N |
| 164 | S | −0.115 | 0.073 | 0.500 | N |
| 165 | S | −0.112 | 0.085 | 0.500 | N |
| 166 | S | −0.108 | 0.096 | 0.500 | N |
| 167 | S | −0.105 | 0.107 | 0.500 | N |
| 168 | S | −0.102 | 0.118 | 0.500 | N |
| 169 | S | −0.098 | 0.129 | 0.500 | N |
| 170 | S | −0.095 | 0.141 | 0.500 | N |
| 171 | S | −0.092 | 0.152 | 0.500 | N |
| 172 | S | −0.089 | 0.163 | 0.500 | N |
| 173 | S | −0.086 | 0.175 | 0.500 | N |
| 174 | S | −0.083 | 0.186 | 0.500 | N |
| 175 | S | −0.080 | 0.197 | 0.500 | N |
| 176 | S | −0.078 | 0.208 | 0.500 | N |
| 177 | S | −0.075 | 0.220 | 0.500 | N |
| 178 | S | −0.072 | 0.231 | 0.500 | N |
| 179 | S | −0.069 | 0.243 | 0.500 | N |
| 180 | S | −0.067 | 0.254 | 0.500 | N |
| 181 | S | −0.064 | 0.265 | 0.500 | N |
| 182 | S | −0.062 | 0.277 | 0.500 | N |
| 183 | S | −0.059 | 0.288 | 0.500 | N |
| 184 | S | −0.057 | 0.300 | 0.500 | N |
| 185 | S | −0.054 | 0.311 | 0.500 | N |
| 186 | S | −0.052 | 0.322 | 0.500 | N |
| 187 | S | −0.049 | 0.334 | 0.500 | N |
| 188 | S | −0.047 | 0.345 | 0.500 | N |
| 189 | S | −0.045 | 0.357 | 0.500 | N |
| 190 | S | −0.042 | 0.368 | 0.500 | N |
| 191 | S | −0.040 | 0.380 | 0.500 | N |
| 192 | S | −0.038 | 0.391 | 0.500 | N |
| 193 | S | −0.036 | 0.403 | 0.500 | N |
| 194 | S | −0.034 | 0.414 | 0.500 | N |
| 195 | S | −0.031 | 0.425 | 0.500 | N |
| 196 | S | −0.029 | 0.437 | 0.500 | N |
| 197 | S | −0.027 | 0.448 | 0.500 | N |
| 198 | S | −0.025 | 0.460 | 0.500 | N |
| 199 | S | −0.023 | 0.471 | 0.500 | N |
| 200 | S | −0.021 | 0.483 | 0.500 | N |
| 201 | S | −0.019 | 0.494 | 0.500 | N |
| 202 | S | −0.017 | 0.506 | 0.500 | N |
| 203 | S | −0.015 | 0.517 | 0.500 | N |
| 204 | S | −0.013 | 0.529 | 0.500 | N |
| 205 | S | −0.011 | 0.540 | 0.500 | N |
| 206 | S | −0.009 | 0.552 | 0.500 | N |
| 207 | S | −0.007 | 0.564 | 0.500 | N |
| 208 | S | −0.005 | 0.575 | 0.500 | N |
| 209 | S | −0.004 | 0.587 | 0.500 | Y |
| 210 | S | −0.002 | 0.598 | 0.500 | Y |
| 211 | S | −0.001 | 0.602 | 0.500 | Y |
| 1 | P | −0.613 | −0.211 | 0.600 | N |
| 2 | P | −0.612 | −0.200 | 0.600 | N |
| 3 | P | −0.609 | −0.188 | 0.600 | N |
| 4 | P | −0.604 | −0.177 | 0.600 | N |
| 5 | P | −0.598 | −0.167 | 0.600 | N |
| 6 | P | −0.592 | −0.158 | 0.600 | N |
| 7 | P | −0.584 | −0.149 | 0.600 | N |
| 8 | P | −0.575 | −0.141 | 0.600 | N |
| 9 | P | −0.566 | −0.133 | 0.600 | N |
| 10 | P | −0.557 | −0.126 | 0.600 | N |
| 11 | P | −0.548 | −0.118 | 0.600 | N |
| 12 | P | −0.539 | −0.111 | 0.600 | N |
| 13 | P | −0.530 | −0.103 | 0.600 | N |
| 14 | P | −0.521 | −0.096 | 0.600 | N |
| 15 | P | −0.512 | −0.088 | 0.600 | N |
| 16 | P | −0.503 | −0.080 | 0.600 | N |
| 17 | P | −0.494 | −0.072 | 0.600 | N |
| 18 | P | −0.486 | −0.065 | 0.600 | N |
| 19 | P | −0.477 | −0.057 | 0.600 | N |
| 20 | P | −0.468 | −0.049 | 0.600 | N |
| 21 | P | −0.460 | −0.041 | 0.600 | N |
| 22 | P | −0.451 | −0.032 | 0.600 | N |
| 23 | P | −0.443 | −0.024 | 0.600 | N |
| 24 | P | −0.434 | −0.016 | 0.600 | N |
| 25 | P | −0.426 | −0.008 | 0.600 | N |
| 26 | P | −0.418 | 0.001 | 0.600 | N |
| 27 | P | −0.409 | 0.009 | 0.600 | N |
| 28 | P | −0.401 | 0.017 | 0.600 | N |
| 29 | P | −0.393 | 0.026 | 0.600 | N |
| 30 | P | −0.385 | 0.035 | 0.600 | N |
| 31 | P | −0.377 | 0.043 | 0.600 | N |
| 32 | P | −0.369 | 0.052 | 0.600 | N |
| 33 | P | −0.361 | 0.061 | 0.600 | N |
| 34 | P | −0.353 | 0.069 | 0.600 | N |
| 35 | P | −0.345 | 0.078 | 0.600 | N |
| 36 | P | −0.338 | 0.087 | 0.600 | N |
| 37 | P | −0.330 | 0.096 | 0.600 | N |
| 38 | P | −0.322 | 0.105 | 0.600 | N |
| 39 | P | −0.315 | 0.114 | 0.600 | N |
| 40 | P | −0.307 | 0.123 | 0.600 | N |
| 41 | P | −0.300 | 0.132 | 0.600 | N |
| 42 | P | −0.293 | 0.142 | 0.600 | N |
| 43 | P | −0.285 | 0.151 | 0.600 | N |
| 44 | P | −0.278 | 0.160 | 0.600 | N |
| 45 | P | −0.271 | 0.169 | 0.600 | N |
| 46 | P | −0.264 | 0.179 | 0.600 | N |
| 47 | P | −0.257 | 0.188 | 0.600 | N |
| 48 | P | −0.250 | 0.198 | 0.600 | N |
| 49 | P | −0.243 | 0.207 | 0.600 | N |
| 50 | P | −0.236 | 0.217 | 0.600 | N |
| 51 | P | −0.229 | 0.226 | 0.600 | N |
| 52 | P | −0.222 | 0.236 | 0.600 | N |
| 53 | P | −0.216 | 0.246 | 0.600 | N |
| 54 | P | −0.209 | 0.255 | 0.600 | N |
| 55 | P | −0.203 | 0.265 | 0.600 | N |
| 56 | P | −0.196 | 0.275 | 0.600 | N |
| 57 | P | −0.190 | 0.285 | 0.600 | N |
| 58 | P | −0.183 | 0.295 | 0.600 | N |
| 59 | P | −0.177 | 0.305 | 0.600 | N |
| 60 | P | −0.171 | 0.315 | 0.600 | N |
| 61 | P | −0.165 | 0.325 | 0.600 | N |
| 62 | P | −0.158 | 0.335 | 0.600 | N |
| 63 | P | −0.152 | 0.345 | 0.600 | N |
| 64 | P | −0.146 | 0.355 | 0.600 | N |
| 65 | P | −0.141 | 0.365 | 0.600 | N |
| 66 | P | −0.135 | 0.375 | 0.600 | N |
| 67 | P | −0.129 | 0.386 | 0.600 | N |
| 68 | P | −0.123 | 0.396 | 0.600 | N |
| 69 | P | −0.118 | 0.406 | 0.600 | N |
| 70 | P | −0.112 | 0.417 | 0.600 | N |
| 71 | P | −0.106 | 0.427 | 0.600 | N |
| 72 | P | −0.101 | 0.437 | 0.600 | N |
| 73 | P | −0.096 | 0.448 | 0.600 | N |
| 74 | P | −0.090 | 0.458 | 0.600 | N |
| 75 | P | −0.085 | 0.469 | 0.600 | N |
| 76 | P | −0.080 | 0.480 | 0.600 | N |
| 77 | P | −0.075 | 0.490 | 0.600 | N |
| 78 | P | −0.070 | 0.501 | 0.600 | N |
| 79 | P | −0.065 | 0.511 | 0.600 | N |
| 80 | P | −0.060 | 0.522 | 0.600 | N |
| 81 | P | −0.055 | 0.533 | 0.600 | N |
| 82 | P | −0.050 | 0.544 | 0.600 | N |
| 83 | P | −0.046 | 0.554 | 0.600 | N |
| 84 | P | −0.041 | 0.565 | 0.600 | N |
| 85 | P | −0.036 | 0.576 | 0.600 | N |
| 86 | P | −0.032 | 0.587 | 0.600 | Y |
| 87 | P | −0.027 | 0.598 | 0.600 | Y |
| 88 | P | −0.023 | 0.609 | 0.600 | Y |
| 89 | P | −0.021 | 0.613 | 0.600 | Y |
| 90 | P | −0.020 | 0.616 | 0.600 | Y |
| 91 | P | −0.017 | 0.618 | 0.600 | Y |
| 92 | P | −0.014 | 0.619 | 0.600 | Y |
| 93 | P | −0.011 | 0.620 | 0.600 | Y |
| 94 | P | −0.005 | 0.617 | 0.600 | Y |
| 95 | P | −0.003 | 0.614 | 0.600 | Y |
| 96 | P | −0.003 | 0.611 | 0.600 | Y |
| 97 | S | −0.613 | −0.211 | 0.600 | N |
| 98 | S | −0.612 | −0.223 | 0.600 | N |
| 99 | S | −0.609 | −0.235 | 0.600 | N |
| 100 | S | −0.605 | −0.246 | 0.600 | N |
| 101 | S | −0.599 | −0.256 | 0.600 | N |
| 102 | S | −0.592 | −0.265 | 0.600 | N |

TABLE I-continued

Non-Dimensionalized Values

| N | Side | X | Y | Z | TE? |
|---|---|---|---|---|---|
| 103 | S | −0.585 | −0.274 | 0.600 | N |
| 104 | S | −0.576 | −0.283 | 0.600 | N |
| 105 | S | −0.567 | −0.290 | 0.600 | N |
| 106 | S | −0.558 | −0.297 | 0.600 | N |
| 107 | S | −0.548 | −0.304 | 0.600 | N |
| 108 | S | −0.538 | −0.310 | 0.600 | N |
| 109 | S | −0.527 | −0.315 | 0.600 | N |
| 110 | S | −0.517 | −0.320 | 0.600 | N |
| 111 | S | −0.505 | −0.324 | 0.600 | N |
| 112 | S | −0.494 | −0.327 | 0.600 | N |
| 113 | S | −0.483 | −0.329 | 0.600 | N |
| 114 | S | −0.471 | −0.330 | 0.600 | N |
| 115 | S | −0.459 | −0.331 | 0.600 | N |
| 116 | S | −0.447 | −0.331 | 0.600 | N |
| 117 | S | −0.436 | −0.330 | 0.600 | N |
| 118 | S | −0.424 | −0.328 | 0.600 | N |
| 119 | S | −0.413 | −0.326 | 0.600 | N |
| 120 | S | −0.401 | −0.322 | 0.600 | N |
| 121 | S | −0.390 | −0.318 | 0.600 | N |
| 122 | S | −0.379 | −0.314 | 0.600 | N |
| 123 | S | −0.369 | −0.309 | 0.600 | N |
| 124 | S | −0.358 | −0.303 | 0.600 | N |
| 125 | S | −0.348 | −0.297 | 0.600 | N |
| 126 | S | −0.338 | −0.291 | 0.600 | N |
| 127 | S | −0.329 | −0.284 | 0.600 | N |
| 128 | S | −0.319 | −0.277 | 0.600 | N |
| 129 | S | −0.310 | −0.270 | 0.600 | N |
| 130 | S | −0.301 | −0.262 | 0.600 | N |
| 131 | S | −0.293 | −0.254 | 0.600 | N |
| 132 | S | −0.284 | −0.246 | 0.600 | N |
| 133 | S | −0.276 | −0.237 | 0.600 | N |
| 134 | S | −0.268 | −0.228 | 0.600 | N |
| 135 | S | −0.261 | −0.219 | 0.600 | N |
| 136 | S | −0.253 | −0.210 | 0.600 | N |
| 137 | S | −0.246 | −0.201 | 0.600 | N |
| 138 | S | −0.239 | −0.192 | 0.600 | N |
| 139 | S | −0.232 | −0.182 | 0.600 | N |
| 140 | S | −0.225 | −0.172 | 0.600 | N |
| 141 | S | −0.219 | −0.162 | 0.600 | N |
| 142 | S | −0.213 | −0.152 | 0.600 | N |
| 143 | S | −0.207 | −0.142 | 0.600 | N |
| 144 | S | −0.201 | −0.132 | 0.600 | N |
| 145 | S | −0.195 | −0.122 | 0.600 | N |
| 146 | S | −0.189 | −0.111 | 0.600 | N |
| 147 | S | −0.184 | −0.101 | 0.600 | N |
| 148 | S | −0.179 | −0.090 | 0.600 | N |
| 149 | S | −0.174 | −0.080 | 0.600 | N |
| 150 | S | −0.169 | −0.069 | 0.600 | N |
| 151 | S | −0.164 | −0.058 | 0.600 | N |
| 152 | S | −0.159 | −0.048 | 0.600 | N |
| 153 | S | −0.155 | −0.037 | 0.600 | N |
| 154 | S | −0.150 | −0.026 | 0.600 | N |
| 155 | S | −0.146 | −0.015 | 0.600 | N |
| 156 | S | −0.142 | −0.004 | 0.600 | N |
| 157 | S | −0.138 | 0.007 | 0.600 | N |
| 158 | S | −0.134 | 0.018 | 0.600 | N |
| 159 | S | −0.130 | 0.029 | 0.600 | N |
| 160 | S | −0.126 | 0.040 | 0.600 | N |
| 161 | S | −0.122 | 0.052 | 0.600 | N |
| 162 | S | −0.119 | 0.063 | 0.600 | N |
| 163 | S | −0.115 | 0.074 | 0.600 | N |
| 164 | S | −0.112 | 0.085 | 0.600 | N |
| 165 | S | −0.108 | 0.097 | 0.600 | N |
| 166 | S | −0.105 | 0.108 | 0.600 | N |
| 167 | S | −0.102 | 0.119 | 0.600 | N |
| 168 | S | −0.099 | 0.131 | 0.600 | N |
| 169 | S | −0.095 | 0.142 | 0.600 | N |
| 170 | S | −0.092 | 0.153 | 0.600 | N |
| 171 | S | −0.089 | 0.165 | 0.600 | N |
| 172 | S | −0.086 | 0.176 | 0.600 | N |
| 173 | S | −0.084 | 0.187 | 0.600 | N |
| 174 | S | −0.081 | 0.199 | 0.600 | N |
| 175 | S | −0.078 | 0.210 | 0.600 | N |
| 176 | S | −0.075 | 0.222 | 0.600 | N |
| 177 | S | −0.072 | 0.233 | 0.600 | N |
| 178 | S | −0.070 | 0.245 | 0.600 | N |
| 179 | S | −0.067 | 0.256 | 0.600 | N |
| 180 | S | −0.065 | 0.268 | 0.600 | N |
| 181 | S | −0.062 | 0.279 | 0.600 | N |
| 182 | S | −0.060 | 0.291 | 0.600 | N |
| 183 | S | −0.057 | 0.302 | 0.600 | N |
| 184 | S | −0.055 | 0.314 | 0.600 | N |
| 185 | S | −0.052 | 0.325 | 0.600 | N |
| 186 | S | −0.050 | 0.337 | 0.600 | N |
| 187 | S | −0.048 | 0.348 | 0.600 | N |
| 188 | S | −0.045 | 0.360 | 0.600 | N |
| 189 | S | −0.043 | 0.371 | 0.600 | N |
| 190 | S | −0.041 | 0.383 | 0.600 | N |
| 191 | S | −0.039 | 0.395 | 0.600 | N |
| 192 | S | −0.036 | 0.406 | 0.600 | N |
| 193 | S | −0.034 | 0.418 | 0.600 | N |
| 194 | S | −0.032 | 0.429 | 0.600 | N |
| 195 | S | −0.030 | 0.441 | 0.600 | N |
| 196 | S | −0.028 | 0.452 | 0.600 | N |
| 197 | S | −0.026 | 0.464 | 0.600 | N |
| 198 | S | −0.024 | 0.476 | 0.600 | N |
| 199 | S | −0.022 | 0.487 | 0.600 | N |
| 200 | S | −0.020 | 0.499 | 0.600 | N |
| 201 | S | −0.018 | 0.510 | 0.600 | N |
| 202 | S | −0.016 | 0.522 | 0.600 | N |
| 203 | S | −0.014 | 0.534 | 0.600 | N |
| 204 | S | −0.012 | 0.545 | 0.600 | N |
| 205 | S | −0.010 | 0.557 | 0.600 | N |
| 206 | S | −0.008 | 0.568 | 0.600 | N |
| 207 | S | −0.006 | 0.580 | 0.600 | N |
| 208 | S | −0.005 | 0.592 | 0.600 | N |
| 209 | S | −0.003 | 0.603 | 0.600 | Y |
| 210 | S | −0.002 | 0.608 | 0.600 | Y |
| 211 | S | −0.002 | 0.608 | 0.600 | Y |
| 1 | P | −0.617 | −0.214 | 0.700 | N |
| 2 | P | −0.616 | −0.202 | 0.700 | N |
| 3 | P | −0.613 | −0.190 | 0.700 | N |
| 4 | P | −0.608 | −0.180 | 0.700 | N |
| 5 | P | −0.602 | −0.169 | 0.700 | N |
| 6 | P | −0.595 | −0.160 | 0.700 | N |
| 7 | P | −0.587 | −0.151 | 0.700 | N |
| 8 | P | −0.579 | −0.143 | 0.700 | N |
| 9 | P | −0.570 | −0.135 | 0.700 | N |
| 10 | P | −0.560 | −0.128 | 0.700 | N |
| 11 | P | −0.551 | −0.120 | 0.700 | N |
| 12 | P | −0.542 | −0.113 | 0.700 | N |
| 13 | P | −0.533 | −0.105 | 0.700 | N |
| 14 | P | −0.524 | −0.098 | 0.700 | N |
| 15 | P | −0.515 | −0.090 | 0.700 | N |
| 16 | P | −0.506 | −0.082 | 0.700 | N |
| 17 | P | −0.497 | −0.074 | 0.700 | N |
| 18 | P | −0.488 | −0.066 | 0.700 | N |
| 19 | P | −0.480 | −0.058 | 0.700 | N |
| 20 | P | −0.471 | −0.050 | 0.700 | N |
| 21 | P | −0.462 | −0.042 | 0.700 | N |
| 22 | P | −0.454 | −0.034 | 0.700 | N |
| 23 | P | −0.445 | −0.026 | 0.700 | N |
| 24 | P | −0.437 | −0.017 | 0.700 | N |
| 25 | P | −0.428 | −0.009 | 0.700 | N |
| 26 | P | −0.420 | 0.000 | 0.700 | N |
| 27 | P | −0.412 | 0.008 | 0.700 | N |
| 28 | P | −0.404 | 0.017 | 0.700 | N |
| 29 | P | −0.395 | 0.025 | 0.700 | N |
| 30 | P | −0.387 | 0.034 | 0.700 | N |
| 31 | P | −0.379 | 0.043 | 0.700 | N |
| 32 | P | −0.371 | 0.051 | 0.700 | N |
| 33 | P | −0.363 | 0.060 | 0.700 | N |
| 34 | P | −0.355 | 0.069 | 0.700 | N |
| 35 | P | −0.348 | 0.078 | 0.700 | N |
| 36 | P | −0.340 | 0.087 | 0.700 | N |
| 37 | P | −0.332 | 0.096 | 0.700 | N |
| 38 | P | −0.325 | 0.105 | 0.700 | N |
| 39 | P | −0.317 | 0.114 | 0.700 | N |
| 40 | P | −0.310 | 0.123 | 0.700 | N |
| 41 | P | −0.302 | 0.133 | 0.700 | N |
| 42 | P | −0.295 | 0.142 | 0.700 | N |
| 43 | P | −0.287 | 0.151 | 0.700 | N |

TABLE I-continued

Non-Dimensionalized Values

| N | Side | X | Y | Z | TE? |
|---|------|---|---|---|-----|
| 44 | P | −0.280 | 0.160 | 0.700 | N |
| 45 | P | −0.273 | 0.170 | 0.700 | N |
| 46 | P | −0.266 | 0.179 | 0.700 | N |
| 47 | P | −0.259 | 0.189 | 0.700 | N |
| 48 | P | −0.252 | 0.198 | 0.700 | N |
| 49 | P | −0.245 | 0.208 | 0.700 | N |
| 50 | P | −0.238 | 0.218 | 0.700 | N |
| 51 | P | −0.231 | 0.227 | 0.700 | N |
| 52 | P | −0.224 | 0.237 | 0.700 | N |
| 53 | P | −0.217 | 0.247 | 0.700 | N |
| 54 | P | −0.211 | 0.257 | 0.700 | N |
| 55 | P | −0.204 | 0.266 | 0.700 | N |
| 56 | P | −0.198 | 0.276 | 0.700 | N |
| 57 | P | −0.191 | 0.286 | 0.700 | N |
| 58 | P | −0.185 | 0.296 | 0.700 | N |
| 59 | P | −0.179 | 0.306 | 0.700 | N |
| 60 | P | −0.172 | 0.316 | 0.700 | N |
| 61 | P | −0.166 | 0.326 | 0.700 | N |
| 62 | P | −0.160 | 0.337 | 0.700 | N |
| 63 | P | −0.154 | 0.347 | 0.700 | N |
| 64 | P | −0.148 | 0.357 | 0.700 | N |
| 65 | P | −0.142 | 0.367 | 0.700 | N |
| 66 | P | −0.136 | 0.377 | 0.700 | N |
| 67 | P | −0.130 | 0.388 | 0.700 | N |
| 68 | P | −0.124 | 0.398 | 0.700 | N |
| 69 | P | −0.119 | 0.409 | 0.700 | N |
| 70 | P | −0.113 | 0.419 | 0.700 | N |
| 71 | P | −0.108 | 0.429 | 0.700 | N |
| 72 | P | −0.102 | 0.440 | 0.700 | N |
| 73 | P | −0.097 | 0.451 | 0.700 | N |
| 74 | P | −0.091 | 0.461 | 0.700 | N |
| 75 | P | −0.086 | 0.472 | 0.700 | N |
| 76 | P | −0.081 | 0.482 | 0.700 | N |
| 77 | P | −0.076 | 0.493 | 0.700 | N |
| 78 | P | −0.071 | 0.504 | 0.700 | N |
| 79 | P | −0.066 | 0.514 | 0.700 | N |
| 80 | P | −0.061 | 0.525 | 0.700 | N |
| 81 | P | −0.056 | 0.536 | 0.700 | N |
| 82 | P | −0.051 | 0.547 | 0.700 | N |
| 83 | P | −0.046 | 0.558 | 0.700 | N |
| 84 | P | −0.042 | 0.569 | 0.700 | N |
| 85 | P | −0.037 | 0.580 | 0.700 | N |
| 86 | P | −0.032 | 0.591 | 0.700 | N |
| 87 | P | −0.028 | 0.601 | 0.700 | N |
| 88 | P | −0.024 | 0.613 | 0.700 | Y |
| 89 | P | −0.022 | 0.616 | 0.700 | Y |
| 90 | P | −0.020 | 0.619 | 0.700 | Y |
| 91 | P | −0.018 | 0.621 | 0.700 | Y |
| 92 | P | −0.015 | 0.623 | 0.700 | Y |
| 93 | P | −0.011 | 0.623 | 0.700 | Y |
| 94 | P | −0.008 | 0.622 | 0.700 | Y |
| 95 | P | −0.006 | 0.620 | 0.700 | Y |
| 96 | P | −0.004 | 0.618 | 0.700 | Y |
| 97 | P | −0.003 | 0.614 | 0.700 | Y |
| 98 | P | −0.003 | 0.611 | 0.700 | Y |
| 99 | S | −0.617 | −0.214 | 0.700 | N |
| 100 | S | −0.616 | −0.226 | 0.700 | N |
| 101 | S | −0.614 | −0.237 | 0.700 | N |
| 102 | S | −0.609 | −0.248 | 0.700 | N |
| 103 | S | −0.604 | −0.259 | 0.700 | N |
| 104 | S | −0.597 | −0.268 | 0.700 | N |
| 105 | S | −0.589 | −0.277 | 0.700 | N |
| 106 | S | −0.581 | −0.285 | 0.700 | N |
| 107 | S | −0.572 | −0.293 | 0.700 | N |
| 108 | S | −0.562 | −0.300 | 0.700 | N |
| 109 | S | −0.552 | −0.307 | 0.700 | N |
| 110 | S | −0.542 | −0.313 | 0.700 | N |
| 111 | S | −0.531 | −0.318 | 0.700 | N |
| 112 | S | −0.521 | −0.323 | 0.700 | N |
| 113 | S | −0.509 | −0.326 | 0.700 | N |
| 114 | S | −0.498 | −0.329 | 0.700 | N |
| 115 | S | −0.486 | −0.332 | 0.700 | N |
| 116 | S | −0.474 | −0.333 | 0.700 | N |
| 117 | S | −0.463 | −0.334 | 0.700 | N |
| 118 | S | −0.451 | −0.333 | 0.700 | N |
| 119 | S | −0.439 | −0.332 | 0.700 | N |
| 120 | S | −0.427 | −0.330 | 0.700 | N |
| 121 | S | −0.416 | −0.328 | 0.700 | N |
| 122 | S | −0.404 | −0.324 | 0.700 | N |
| 123 | S | −0.393 | −0.320 | 0.700 | N |
| 124 | S | −0.382 | −0.316 | 0.700 | N |
| 125 | S | −0.371 | −0.311 | 0.700 | N |
| 126 | S | −0.361 | −0.305 | 0.700 | N |
| 127 | S | −0.351 | −0.299 | 0.700 | N |
| 128 | S | −0.341 | −0.293 | 0.700 | N |
| 129 | S | −0.331 | −0.286 | 0.700 | N |
| 130 | S | −0.322 | −0.279 | 0.700 | N |
| 131 | S | −0.312 | −0.272 | 0.700 | N |
| 132 | S | −0.303 | −0.264 | 0.700 | N |
| 133 | S | −0.295 | −0.256 | 0.700 | N |
| 134 | S | −0.286 | −0.248 | 0.700 | N |
| 135 | S | −0.278 | −0.239 | 0.700 | N |
| 136 | S | −0.270 | −0.230 | 0.700 | N |
| 137 | S | −0.262 | −0.221 | 0.700 | N |
| 138 | S | −0.255 | −0.212 | 0.700 | N |
| 139 | S | −0.247 | −0.203 | 0.700 | N |
| 140 | S | −0.240 | −0.193 | 0.700 | N |
| 141 | S | −0.233 | −0.184 | 0.700 | N |
| 142 | S | −0.227 | −0.174 | 0.700 | N |
| 143 | S | −0.220 | −0.164 | 0.700 | N |
| 144 | S | −0.214 | −0.154 | 0.700 | N |
| 145 | S | −0.208 | −0.144 | 0.700 | N |
| 146 | S | −0.202 | −0.134 | 0.700 | N |
| 147 | S | −0.196 | −0.123 | 0.700 | N |
| 148 | S | −0.190 | −0.113 | 0.700 | N |
| 149 | S | −0.185 | −0.102 | 0.700 | N |
| 150 | S | −0.180 | −0.092 | 0.700 | N |
| 151 | S | −0.174 | −0.081 | 0.700 | N |
| 152 | S | −0.169 | −0.070 | 0.700 | N |
| 153 | S | −0.165 | −0.060 | 0.700 | N |
| 154 | S | −0.160 | −0.049 | 0.700 | N |
| 155 | S | −0.155 | −0.038 | 0.700 | N |
| 156 | S | −0.151 | 0.027 | 0.700 | N |
| 157 | S | −0.147 | −0.016 | 0.700 | N |
| 158 | S | −0.142 | −0.005 | 0.700 | N |
| 159 | S | −0.138 | 0.007 | 0.700 | N |
| 160 | S | −0.134 | 0.018 | 0.700 | N |
| 161 | S | −0.130 | 0.029 | 0.700 | N |
| 162 | S | −0.127 | 0.040 | 0.700 | N |
| 163 | S | −0.123 | 0.051 | 0.700 | N |
| 164 | S | −0.119 | 0.063 | 0.700 | N |
| 165 | S | −0.116 | 0.074 | 0.700 | N |
| 166 | S | −0.112 | 0.085 | 0.700 | N |
| 167 | S | −0.109 | 0.097 | 0.700 | N |
| 168 | S | −0.106 | 0.108 | 0.700 | N |
| 169 | S | −0.102 | 0.119 | 0.700 | N |
| 170 | S | −0.099 | 0.131 | 0.700 | N |
| 171 | S | −0.096 | 0.142 | 0.700 | N |
| 172 | S | −0.093 | 0.154 | 0.700 | N |
| 173 | S | −0.090 | 0.165 | 0.700 | N |
| 174 | S | −0.087 | 0.177 | 0.700 | N |
| 175 | S | −0.084 | 0.188 | 0.700 | N |
| 176 | S | −0.081 | 0.200 | 0.700 | N |
| 177 | S | −0.079 | 0.211 | 0.700 | N |
| 178 | S | −0.076 | 0.223 | 0.700 | N |
| 179 | S | −0.073 | 0.234 | 0.700 | N |
| 180 | S | −0.071 | 0.246 | 0.700 | N |
| 181 | S | −0.068 | 0.257 | 0.700 | N |
| 182 | S | −0.065 | 0.269 | 0.700 | N |
| 183 | S | −0.063 | 0.281 | 0.700 | N |
| 184 | S | −0.060 | 0.292 | 0.700 | N |
| 185 | S | −0.058 | 0.304 | 0.700 | N |
| 186 | S | −0.056 | 0.315 | 0.700 | N |
| 187 | S | −0.053 | 0.327 | 0.700 | N |
| 188 | S | −0.051 | 0.339 | 0.700 | N |
| 189 | S | −0.048 | 0.350 | 0.700 | N |
| 190 | S | −0.046 | 0.362 | 0.700 | N |
| 191 | S | −0.044 | 0.373 | 0.700 | N |
| 192 | S | −0.042 | 0.385 | 0.700 | N |
| 193 | S | −0.039 | 0.397 | 0.700 | N |
| 194 | S | −0.037 | 0.408 | 0.700 | N |
| 195 | S | −0.035 | 0.420 | 0.700 | N |

TABLE I-continued

Non-Dimensionalized Values

| N | Side | X | Y | Z | TE? |
|---|---|---|---|---|---|
| 196 | S | −0.033 | 0.432 | 0.700 | N |
| 197 | S | −0.031 | 0.443 | 0.700 | N |
| 198 | S | −0.029 | 0.455 | 0.700 | N |
| 199 | S | −0.027 | 0.467 | 0.700 | N |
| 200 | S | −0.025 | 0.478 | 0.700 | N |
| 201 | S | −0.023 | 0.490 | 0.700 | N |
| 202 | S | −0.021 | 0.502 | 0.700 | N |
| 203 | S | −0.017 | 0.525 | 0.700 | N |
| 204 | S | −0.015 | 0.537 | 0.700 | N |
| 205 | S | −0.013 | 0.548 | 0.700 | N |
| 206 | S | −0.011 | 0.560 | 0.700 | N |
| 207 | S | −0.009 | 0.572 | 0.700 | N |
| 208 | S | −0.007 | 0.584 | 0.700 | N |
| 209 | S | −0.005 | 0.595 | 0.700 | Y |
| 210 | S | −0.003 | 0.607 | 0.700 | Y |
| 211 | S | −0.003 | 0.611 | 0.700 | Y |
| 1 | P | −0.621 | −0.215 | 0.800 | N |
| 2 | P | −0.620 | −0.203 | 0.800 | N |
| 3 | P | −0.617 | −0.192 | 0.800 | N |
| 4 | P | −0.612 | −0.181 | 0.800 | N |
| 5 | P | −0.606 | −0.171 | 0.800 | N |
| 6 | P | −0.598 | −0.161 | 0.800 | N |
| 7 | P | −0.590 | −0.153 | 0.800 | N |
| 8 | P | −0.581 | −0.145 | 0.800 | N |
| 9 | P | −0.572 | −0.137 | 0.800 | N |
| 10 | P | −0.563 | −0.130 | 0.800 | N |
| 11 | P | −0.554 | −0.122 | 0.800 | N |
| 12 | P | −0.544 | −0.114 | 0.800 | N |
| 13 | P | −0.535 | −0.107 | 0.800 | N |
| 14 | P | −0.526 | −0.099 | 0.800 | N |
| 15 | P | −0.517 | −0.091 | 0.800 | N |
| 16 | P | −0.508 | −0.083 | 0.800 | N |
| 17 | P | −0.499 | −0.075 | 0.800 | N |
| 18 | P | −0.490 | −0.067 | 0.800 | N |
| 19 | P | −0.482 | −0.059 | 0.800 | N |
| 20 | P | −0.473 | −0.051 | 0.800 | N |
| 21 | P | −0.464 | −0.043 | 0.800 | N |
| 22 | P | −0.456 | −0.034 | 0.800 | N |
| 23 | P | −0.447 | −0.026 | 0.800 | N |
| 24 | P | −0.438 | −0.018 | 0.800 | N |
| 25 | P | −0.430 | −0.009 | 0.800 | N |
| 26 | P | −0.422 | −0.001 | 0.800 | N |
| 27 | P | −0.413 | 0.008 | 0.800 | N |
| 28 | P | −0.405 | 0.016 | 0.800 | N |
| 29 | P | −0.397 | 0.025 | 0.800 | N |
| 30 | P | −0.389 | 0.034 | 0.800 | N |
| 31 | P | −0.381 | 0.043 | 0.800 | N |
| 32 | P | −0.373 | 0.051 | 0.800 | N |
| 33 | P | −0.365 | 0.060 | 0.800 | N |
| 34 | P | −0.357 | 0.069 | 0.800 | N |
| 35 | P | −0.349 | 0.078 | 0.800 | N |
| 36 | P | −0.341 | 0.087 | 0.800 | N |
| 37 | P | −0.333 | 0.096 | 0.800 | N |
| 38 | P | −0.326 | 0.106 | 0.800 | N |
| 39 | P | −0.318 | 0.115 | 0.800 | N |
| 40 | P | −0.310 | 0.124 | 0.800 | N |
| 41 | P | −0.303 | 0.133 | 0.800 | N |
| 42 | P | −0.295 | 0.143 | 0.800 | N |
| 43 | P | −0.288 | 0.152 | 0.800 | N |
| 44 | P | −0.281 | 0.162 | 0.800 | N |
| 45 | P | −0.273 | 0.171 | 0.800 | N |
| 46 | P | −0.266 | 0.181 | 0.800 | N |
| 47 | P | −0.259 | 0.190 | 0.800 | N |
| 48 | P | −0.252 | 0.200 | 0.800 | N |
| 49 | P | −0.245 | 0.209 | 0.800 | N |
| 50 | P | −0.238 | 0.219 | 0.800 | N |
| 51 | P | −0.231 | 0.229 | 0.800 | N |
| 52 | P | −0.224 | 0.239 | 0.800 | N |
| 53 | P | −0.218 | 0.249 | 0.800 | N |
| 54 | P | −0.211 | 0.259 | 0.800 | N |
| 55 | P | −0.204 | 0.268 | 0.800 | N |
| 56 | P | −0.198 | 0.278 | 0.800 | N |
| 57 | P | −0.191 | 0.288 | 0.800 | N |
| 58 | P | −0.185 | 0.298 | 0.800 | N |
| 59 | P | −0.178 | 0.309 | 0.800 | N |
| 60 | P | −0.172 | 0.319 | 0.800 | N |
| 61 | P | −0.166 | 0.329 | 0.800 | N |
| 62 | P | −0.159 | 0.339 | 0.800 | N |
| 63 | P | −0.153 | 0.349 | 0.800 | N |
| 64 | P | −0.147 | 0.360 | 0.800 | N |
| 65 | P | −0.141 | 0.370 | 0.800 | N |
| 66 | P | −0.135 | 0.380 | 0.800 | N |
| 67 | P | −0.129 | 0.391 | 0.800 | N |
| 68 | P | −0.124 | 0.401 | 0.800 | N |
| 69 | P | −0.118 | 0.412 | 0.800 | N |
| 70 | P | −0.112 | 0.422 | 0.800 | N |
| 71 | P | −0.106 | 0.433 | 0.800 | N |
| 72 | P | −0.101 | 0.443 | 0.800 | N |
| 73 | P | −0.095 | 0.454 | 0.800 | N |
| 74 | P | −0.090 | 0.465 | 0.800 | N |
| 75 | P | −0.085 | 0.475 | 0.800 | N |
| 76 | P | −0.079 | 0.486 | 0.800 | N |
| 77 | P | −0.074 | 0.497 | 0.800 | N |
| 78 | P | −0.069 | 0.507 | 0.800 | N |
| 79 | P | −0.064 | 0.518 | 0.800 | N |
| 80 | P | −0.059 | 0.529 | 0.800 | N |
| 81 | P | −0.054 | 0.540 | 0.800 | N |
| 82 | P | −0.049 | 0.551 | 0.800 | N |
| 83 | P | −0.044 | 0.562 | 0.800 | N |
| 84 | P | −0.039 | 0.573 | 0.800 | N |
| 85 | P | −0.035 | 0.584 | 0.800 | N |
| 86 | P | −0.030 | 0.595 | 0.800 | N |
| 87 | P | −0.025 | 0.606 | 0.800 | Y |
| 88 | P | −0.021 | 0.617 | 0.800 | Y |
| 89 | P | −0.019 | 0.621 | 0.800 | Y |
| 90 | P | −0.017 | 0.623 | 0.800 | Y |
| 91 | P | −0.015 | 0.626 | 0.800 | Y |
| 92 | P | −0.012 | 0.627 | 0.800 | Y |
| 93 | P | −0.009 | 0.627 | 0.800 | Y |
| 94 | P | −0.006 | 0.626 | 0.800 | Y |
| 95 | P | −0.003 | 0.624 | 0.800 | Y |
| 96 | P | −0.001 | 0.622 | 0.800 | Y |
| 97 | P | 0.000 | 0.619 | 0.800 | Y |
| 98 | S | −0.621 | −0.215 | 0.800 | N |
| 99 | S | −0.621 | −0.227 | 0.800 | N |
| 100 | S | −0.618 | −0.239 | 0.800 | N |
| 101 | S | −0.614 | −0.250 | 0.800 | N |
| 102 | S | −0.609 | −0.261 | 0.800 | N |
| 103 | S | −0.602 | −0.270 | 0.800 | N |
| 104 | S | −0.594 | −0.280 | 0.800 | N |
| 105 | S | −0.586 | −0.288 | 0.800 | N |
| 106 | S | −0.577 | −0.296 | 0.800 | N |
| 107 | S | −0.567 | −0.303 | 0.800 | N |
| 108 | S | −0.557 | −0.310 | 0.800 | N |
| 109 | S | −0.547 | −0.316 | 0.800 | N |
| 110 | S | −0.536 | −0.321 | 0.800 | N |
| 111 | S | −0.525 | −0.325 | 0.800 | N |
| 112 | S | −0.514 | −0.329 | 0.800 | N |
| 113 | S | −0.502 | −0.332 | 0.800 | N |
| 114 | S | −0.490 | −0.334 | 0.800 | N |
| 115 | S | −0.478 | 0.336 | 0.800 | N |
| 116 | S | −0.466 | −0.336 | 0.800 | N |
| 117 | S | −0.454 | −0.336 | 0.800 | N |
| 118 | S | −0.443 | −0.334 | 0.800 | N |
| 119 | S | −0.431 | −0.333 | 0.800 | N |
| 120 | S | −0.419 | −0.330 | 0.800 | N |
| 121 | S | −0.408 | −0.327 | 0.800 | N |
| 122 | S | −0.396 | −0.323 | 0.800 | N |
| 123 | S | −0.385 | −0.318 | 0.800 | N |
| 124 | S | −0.374 | −0.313 | 0.800 | N |
| 125 | S | −0.364 | −0.308 | 0.800 | N |
| 126 | S | −0.354 | −0.302 | 0.800 | N |
| 127 | S | −0.343 | −0.295 | 0.800 | N |
| 128 | S | −0.334 | −0.288 | 0.800 | N |
| 129 | S | −0.324 | −0.281 | 0.800 | N |
| 130 | S | −0.315 | −0.274 | 0.800 | N |
| 131 | S | −0.306 | −0.266 | 0.800 | N |
| 132 | S | −0.297 | −0.258 | 0.800 | N |
| 133 | S | −0.288 | −0.250 | 0.800 | N |
| 134 | S | −0.280 | −0.241 | 0.800 | N |
| 135 | S | −0.272 | −0.232 | 0.800 | N |
| 136 | S | −0.264 | −0.223 | 0.800 | N |

TABLE I-continued

Non-Dimensionalized Values

| N | Side | X | Y | Z | TE? |
|---|---|---|---|---|---|
| 137 | S | −0.256 | −0.214 | 0.800 | N |
| 138 | S | −0.249 | −0.205 | 0.800 | N |
| 139 | S | −0.241 | −0.195 | 0.800 | N |
| 140 | S | −0.234 | −0.186 | 0.800 | N |
| 141 | S | −0.228 | −0.176 | 0.800 | N |
| 142 | S | −0.221 | −0.166 | 0.800 | N |
| 143 | S | −0.215 | −0.156 | 0.800 | N |
| 144 | S | −0.208 | −0.146 | 0.800 | N |
| 145 | S | −0.202 | −0.135 | 0.800 | N |
| 146 | S | −0.196 | −0.125 | 0.800 | N |
| 147 | S | −0.191 | −0.114 | 0.800 | N |
| 148 | S | −0.185 | −0.104 | 0.800 | N |
| 149 | S | −0.180 | −0.093 | 0.800 | N |
| 150 | S | −0.175 | −0.082 | 0.800 | N |
| 151 | S | −0.170 | −0.071 | 0.800 | N |
| 152 | S | −0.165 | −0.061 | 0.800 | N |
| 153 | S | −0.160 | −0.050 | 0.800 | N |
| 154 | S | −0.156 | −0.039 | 0.800 | N |
| 155 | S | −0.151 | −0.027 | 0.800 | N |
| 156 | S | −0.147 | −0.016 | 0.800 | N |
| 157 | S | −0.142 | −0.005 | 0.800 | N |
| 158 | S | −0.138 | 0.006 | 0.800 | N |
| 159 | S | −0.134 | 0.017 | 0.800 | N |
| 160 | S | −0.130 | 0.029 | 0.800 | N |
| 161 | S | −0.127 | 0.040 | 0.800 | N |
| 162 | S | −0.123 | 0.051 | 0.800 | N |
| 163 | S | −0.119 | 0.063 | 0.800 | N |
| 164 | S | −0.116 | 0.074 | 0.800 | N |
| 165 | S | −0.112 | 0.085 | 0.800 | N |
| 166 | S | −0.109 | 0.097 | 0.800 | N |
| 167 | S | −0.105 | 0.108 | 0.800 | N |
| 168 | S | −0.102 | 0.120 | 0.800 | N |
| 169 | S | −0.099 | 0.131 | 0.800 | N |
| 170 | S | −0.096 | 0.143 | 0.800 | N |
| 171 | S | −0.093 | 0.154 | 0.800 | N |
| 172 | S | −0.090 | 0.166 | 0.800 | N |
| 173 | S | −0.087 | 0.178 | 0.800 | N |
| 174 | S | −0.084 | 0.189 | 0.800 | N |
| 175 | S | −0.081 | 0.201 | 0.800 | N |
| 176 | S | −0.078 | 0.212 | 0.800 | N |
| 177 | S | −0.075 | 0.224 | 0.800 | N |
| 178 | S | −0.073 | 0.236 | 0.800 | N |
| 179 | S | −0.070 | 0.247 | 0.800 | N |
| 180 | S | −0.067 | 0.259 | 0.800 | N |
| 181 | S | −0.065 | 0.271 | 0.800 | N |
| 182 | S | −0.062 | 0.282 | 0.800 | N |
| 183 | S | −0.060 | 0.294 | 0.800 | N |
| 184 | S | −0.057 | 0.306 | 0.800 | N |
| 185 | S | −0.055 | 0.317 | 0.800 | N |
| 186 | S | −0.052 | 0.329 | 0.800 | N |
| 187 | S | −0.050 | 0.341 | 0.800 | N |
| 188 | S | −0.047 | 0.353 | 0.800 | N |
| 189 | S | −0.045 | 0.364 | 0.800 | N |
| 190 | S | −0.043 | 0.376 | 0.800 | N |
| 191 | S | −0.040 | 0.388 | 0.800 | N |
| 192 | S | −0.038 | 0.399 | 0.800 | N |
| 193 | S | −0.036 | 0.411 | 0.800 | N |
| 194 | S | −0.034 | 0.423 | 0.800 | N |
| 195 | S | −0.032 | 0.435 | 0.800 | N |
| 196 | S | −0.029 | 0.446 | 0.800 | N |
| 197 | S | −0.027 | 0.458 | 0.800 | N |
| 198 | S | −0.023 | 0.482 | 0.800 | N |
| 199 | S | −0.021 | 0.493 | 0.800 | N |
| 200 | S | −0.019 | 0.505 | 0.800 | N |
| 201 | S | −0.017 | 0.517 | 0.800 | N |
| 202 | S | −0.015 | 0.529 | 0.800 | N |
| 203 | S | −0.013 | 0.541 | 0.800 | N |
| 204 | S | −0.011 | 0.552 | 0.800 | N |
| 205 | S | −0.009 | 0.564 | 0.800 | N |
| 206 | S | −0.007 | 0.576 | 0.800 | N |
| 207 | S | −0.005 | 0.588 | 0.800 | N |
| 208 | S | −0.003 | 0.599 | 0.800 | N |
| 209 | S | −0.001 | 0.611 | 0.800 | Y |
| 210 | S | 0.000 | 0.615 | 0.800 | Y |
| 211 | S | 0.000 | 0.615 | 0.800 | Y |
| 1 | P | −0.626 | −0.216 | 0.900 | N |
| 2 | P | −0.624 | −0.204 | 0.900 | N |
| 3 | P | −0.620 | −0.192 | 0.900 | N |
| 4 | P | −0.615 | −0.182 | 0.900 | N |
| 5 | P | −0.608 | −0.171 | 0.900 | N |
| 6 | P | −0.601 | −0.162 | 0.900 | N |
| 7 | P | −0.592 | −0.153 | 0.900 | N |
| 8 | P | −0.583 | −0.145 | 0.900 | N |
| 9 | P | −0.574 | −0.138 | 0.900 | N |
| 10 | P | −0.564 | −0.130 | 0.900 | N |
| 11 | P | −0.555 | −0.123 | 0.900 | N |
| 12 | P | −0.546 | −0.115 | 0.900 | N |
| 13 | P | −0.536 | −0.107 | 0.900 | N |
| 14 | P | −0.527 | −0.099 | 0.900 | N |
| 15 | P | −0.518 | −0.091 | 0.900 | N |
| 16 | P | −0.509 | −0.083 | 0.900 | N |
| 17 | P | −0.500 | −0.075 | 0.900 | N |
| 18 | P | −0.491 | −0.067 | 0.900 | N |
| 19 | P | −0.482 | −0.059 | 0.900 | N |
| 20 | P | −0.473 | −0.051 | 0.900 | N |
| 21 | P | −0.464 | −0.042 | 0.900 | N |
| 22 | P | −0.456 | −0.034 | 0.900 | N |
| 23 | P | −0.447 | −0.025 | 0.900 | N |
| 24 | P | −0.438 | −0.017 | 0.900 | N |
| 25 | P | −0.430 | −0.008 | 0.900 | N |
| 26 | P | −0.421 | 0.000 | 0.900 | N |
| 27 | P | −0.413 | 0.009 | 0.900 | N |
| 28 | P | −0.405 | 0.018 | 0.900 | N |
| 29 | P | −0.396 | 0.027 | 0.900 | N |
| 30 | P | −0.388 | 0.035 | 0.900 | N |
| 31 | P | −0.380 | 0.044 | 0.900 | N |
| 32 | P | −0.372 | 0.053 | 0.900 | N |
| 33 | P | −0.363 | 0.062 | 0.900 | N |
| 34 | P | −0.355 | 0.071 | 0.900 | N |
| 35 | P | −0.347 | 0.080 | 0.900 | N |
| 36 | P | −0.340 | 0.090 | 0.900 | N |
| 37 | P | −0.332 | 0.099 | 0.900 | N |
| 38 | P | −0.324 | 0.108 | 0.900 | N |
| 39 | P | −0.316 | 0.117 | 0.900 | N |
| 40 | P | −0.309 | 0.127 | 0.900 | N |
| 41 | P | −0.301 | 0.136 | 0.900 | N |
| 42 | P | −0.293 | 0.146 | 0.900 | N |
| 43 | P | −0.286 | 0.155 | 0.900 | N |
| 44 | P | −0.278 | 0.165 | 0.900 | N |
| 45 | P | −0.271 | 0.174 | 0.900 | N |
| 46 | P | −0.264 | 0.184 | 0.900 | N |
| 47 | P | −0.256 | 0.194 | 0.900 | N |
| 48 | P | −0.249 | 0.203 | 0.900 | N |
| 49 | P | −0.242 | 0.213 | 0.900 | N |
| 50 | P | −0.235 | 0.223 | 0.900 | N |
| 51 | P | −0.228 | 0.233 | 0.900 | N |
| 52 | P | −0.221 | 0.243 | 0.900 | N |
| 53 | P | −0.214 | 0.253 | 0.900 | N |
| 54 | P | −0.207 | 0.263 | 0.900 | N |
| 55 | P | −0.201 | 0.273 | 0.900 | N |
| 56 | P | −0.194 | 0.283 | 0.900 | N |
| 57 | P | −0.187 | 0.293 | 0.900 | N |
| 58 | P | −0.181 | 0.303 | 0.900 | N |
| 59 | P | −0.174 | 0.313 | 0.900 | N |
| 60 | P | −0.168 | 0.323 | 0.900 | N |
| 61 | P | −0.161 | 0.334 | 0.900 | N |
| 62 | P | −0.155 | 0.344 | 0.900 | N |
| 63 | P | −0.149 | 0.354 | 0.900 | N |
| 64 | P | −0.143 | 0.365 | 0.900 | N |
| 65 | P | −0.137 | 0.375 | 0.900 | N |
| 66 | P | −0.131 | 0.386 | 0.900 | N |
| 67 | P | −0.125 | 0.396 | 0.900 | N |
| 68 | P | −0.119 | 0.407 | 0.900 | N |
| 69 | P | −0.113 | 0.417 | 0.900 | N |
| 70 | P | −0.107 | 0.428 | 0.900 | N |
| 71 | P | −0.101 | 0.439 | 0.900 | N |
| 72 | P | −0.095 | 0.449 | 0.900 | N |
| 73 | P | −0.090 | 0.460 | 0.900 | N |
| 74 | P | −0.084 | 0.471 | 0.900 | N |
| 75 | P | −0.079 | 0.482 | 0.900 | N |
| 76 | P | −0.073 | 0.492 | 0.900 | N |
| 77 | P | −0.068 | 0.503 | 0.900 | N |

TABLE I-continued

Non-Dimensionalized Values

| N | Side | X | Y | Z | TE? |
|---|---|---|---|---|---|
| 78 | P | −0.063 | 0.514 | 0.900 | N |
| 79 | P | −0.057 | 0.525 | 0.900 | N |
| 80 | P | −0.052 | 0.536 | 0.900 | N |
| 81 | P | −0.047 | 0.547 | 0.900 | N |
| 82 | P | −0.042 | 0.558 | 0.900 | N |
| 83 | P | −0.037 | 0.569 | 0.900 | N |
| 84 | P | −0.032 | 0.580 | 0.900 | N |
| 85 | P | −0.027 | 0.591 | 0.900 | N |
| 86 | P | −0.022 | 0.602 | 0.900 | N |
| 87 | P | −0.017 | 0.613 | 0.900 | Y |
| 88 | P | −0.013 | 0.624 | 0.900 | Y |
| 89 | P | −0.011 | 0.628 | 0.900 | Y |
| 90 | P | −0.009 | 0.631 | 0.900 | Y |
| 91 | P | −0.007 | 0.633 | 0.900 | Y |
| 92 | P | −0.004 | 0.634 | 0.900 | Y |
| 93 | P | 0.000 | 0.634 | 0.900 | Y |
| 94 | P | 0.003 | 0.633 | 0.900 | Y |
| 95 | P | 0.005 | 0.632 | 0.900 | Y |
| 96 | P | 0.007 | 0.629 | 0.900 | Y |
| 97 | P | 0.008 | 0.626 | 0.900 | Y |
| 98 | S | −0.626 | −0.216 | 0.900 | N |
| 99 | S | −0.626 | −0.228 | 0.900 | N |
| 100 | S | −0.623 | −0.240 | 0.900 | N |
| 101 | S | −0.620 | −0.251 | 0.900 | N |
| 102 | S | −0.614 | −0.262 | 0.900 | N |
| 103 | S | −0.607 | −0.272 | 0.900 | N |
| 104 | S | −0.600 | −0.281 | 0.900 | N |
| 105 | S | −0.591 | −0.290 | 0.900 | N |
| 106 | S | −0.582 | −0.298 | 0.900 | N |
| 107 | S | −0.572 | −0.305 | 0.900 | N |
| 108 | S | −0.562 | −0.312 | 0.900 | N |
| 109 | S | −0.552 | −0.318 | 0.900 | N |
| 110 | S | −0.541 | −0.324 | 0.900 | N |
| 111 | S | −0.530 | −0.328 | 0.900 | N |
| 112 | S | −0.518 | −0.332 | 0.900 | N |
| 113 | S | −0.507 | −0.335 | 0.900 | N |
| 114 | S | −0.495 | −0.337 | 0.900 | N |
| 115 | S | −0.483 | −0.338 | 0.900 | N |
| 116 | S | −0.471 | −0.339 | 0.900 | N |
| 117 | S | −0.458 | −0.338 | 0.900 | N |
| 118 | S | −0.446 | −0.337 | 0.900 | N |
| 119 | S | −0.434 | −0.335 | 0.900 | N |
| 120 | S | −0.423 | −0.333 | 0.900 | N |
| 121 | S | −0.411 | −0.329 | 0.900 | N |
| 122 | S | −0.400 | −0.325 | 0.900 | N |
| 123 | S | −0.388 | −0.321 | 0.900 | N |
| 124 | S | −0.377 | −0.315 | 0.900 | N |
| 125 | S | −0.367 | −0.310 | 0.900 | N |
| 126 | S | −0.356 | −0.304 | 0.900 | N |
| 127 | S | −0.346 | −0.297 | 0.900 | N |
| 128 | S | −0.336 | −0.291 | 0.900 | N |
| 129 | S | −0.326 | −0.283 | 0.900 | N |
| 130 | S | −0.317 | −0.276 | 0.900 | N |
| 131 | S | −0.308 | −0.268 | 0.900 | N |
| 132 | S | −0.299 | −0.260 | 0.900 | N |
| 133 | S | −0.290 | −0.252 | 0.900 | N |
| 134 | S | −0.281 | −0.243 | 0.900 | N |
| 135 | S | −0.273 | −0.234 | 0.900 | N |
| 136 | S | −0.265 | −0.225 | 0.900 | N |
| 137 | S | −0.257 | −0.216 | 0.900 | N |
| 138 | S | −0.249 | −0.207 | 0.900 | N |
| 139 | S | −0.242 | −0.197 | 0.900 | N |
| 140 | S | −0.235 | −0.187 | 0.900 | N |
| 141 | S | −0.228 | −0.177 | 0.900 | N |
| 142 | S | −0.221 | −0.167 | 0.900 | N |
| 143 | S | −0.215 | −0.157 | 0.900 | N |
| 144 | S | −0.208 | −0.147 | 0.900 | N |
| 145 | S | −0.202 | −0.136 | 0.900 | N |
| 146 | S | −0.196 | −0.126 | 0.900 | N |
| 147 | S | −0.190 | −0.115 | 0.900 | N |
| 148 | S | −0.185 | −0.105 | 0.900 | N |
| 149 | S | −0.179 | −0.094 | 0.900 | N |
| 150 | S | −0.174 | −0.083 | 0.900 | N |
| 151 | S | −0.169 | −0.072 | 0.900 | N |
| 152 | S | −0.164 | −0.061 | 0.900 | N |
| 153 | S | −0.159 | −0.050 | 0.900 | N |
| 154 | S | −0.154 | −0.039 | 0.900 | N |
| 155 | S | −0.150 | −0.027 | 0.900 | N |
| 156 | S | −0.145 | −0.016 | 0.900 | N |
| 157 | S | −0.141 | −0.005 | 0.900 | N |
| 158 | S | −0.137 | 0.006 | 0.900 | N |
| 159 | S | −0.132 | 0.018 | 0.900 | N |
| 160 | S | −0.128 | 0.029 | 0.900 | N |
| 161 | S | −0.125 | 0.041 | 0.900 | N |
| 162 | S | −0.121 | 0.052 | 0.900 | N |
| 163 | S | −0.117 | 0.064 | 0.900 | N |
| 164 | S | −0.113 | 0.075 | 0.900 | N |
| 165 | S | −0.110 | 0.087 | 0.900 | N |
| 166 | S | −0.106 | 0.098 | 0.900 | N |
| 167 | S | −0.103 | 0.110 | 0.900 | N |
| 168 | S | −0.099 | 0.122 | 0.900 | N |
| 169 | S | −0.096 | 0.133 | 0.900 | N |
| 170 | S | −0.093 | 0.145 | 0.900 | N |
| 171 | S | −0.090 | 0.157 | 0.900 | N |
| 172 | S | −0.087 | 0.168 | 0.900 | N |
| 173 | S | −0.084 | 0.180 | 0.900 | N |
| 174 | S | −0.081 | 0.192 | 0.900 | N |
| 175 | S | −0.078 | 0.203 | 0.900 | N |
| 176 | S | −0.075 | 0.215 | 0.900 | N |
| 177 | S | −0.072 | 0.227 | 0.900 | N |
| 178 | S | −0.069 | 0.239 | 0.900 | N |
| 179 | S | −0.066 | 0.251 | 0.900 | N |
| 180 | S | −0.063 | 0.262 | 0.900 | N |
| 181 | S | −0.061 | 0.274 | 0.900 | N |
| 182 | S | −0.058 | 0.286 | 0.900 | N |
| 183 | S | −0.055 | 0.298 | 0.900 | N |
| 184 | S | −0.053 | 0.310 | 0.900 | N |
| 185 | S | −0.050 | 0.321 | 0.900 | N |
| 186 | S | −0.048 | 0.333 | 0.900 | N |
| 187 | S | −0.045 | 0.345 | 0.900 | N |
| 188 | S | −0.043 | 0.357 | 0.900 | N |
| 189 | S | −0.040 | 0.369 | 0.900 | N |
| 190 | S | −0.038 | 0.381 | 0.900 | N |
| 191 | S | −0.035 | 0.392 | 0.900 | N |
| 192 | S | −0.033 | 0.404 | 0.900 | N |
| 193 | S | −0.031 | 0.416 | 0.900 | N |
| 194 | S | −0.026 | 0.440 | 0.900 | N |
| 195 | S | −0.024 | 0.452 | 0.900 | N |
| 196 | S | −0.021 | 0.464 | 0.900 | N |
| 197 | S | −0.019 | 0.476 | 0.900 | N |
| 198 | S | −0.017 | 0.487 | 0.900 | N |
| 199 | S | −0.014 | 0.499 | 0.900 | N |
| 200 | S | −0.012 | 0.511 | 0.900 | N |
| 201 | S | −0.010 | 0.523 | 0.900 | N |
| 202 | S | −0.008 | 0.535 | 0.900 | N |
| 203 | S | −0.006 | 0.547 | 0.900 | N |
| 204 | S | −0.003 | 0.559 | 0.900 | N |
| 205 | S | −0.001 | 0.571 | 0.900 | N |
| 206 | S | 0.001 | 0.583 | 0.900 | N |
| 207 | S | 0.003 | 0.595 | 0.900 | N |
| 208 | S | 0.005 | 0.606 | 0.900 | N |
| 209 | S | 0.007 | 0.618 | 0.900 | Y |
| 210 | S | 0.008 | 0.622 | 0.900 | Y |
| 211 | S | 0.008 | 0.622 | 0.900 | Y |
| 1 | P | −0.630 | −0.227 | 1.000 | N |
| 2 | P | −0.630 | −0.215 | 1.000 | N |
| 3 | P | −0.627 | −0.203 | 1.000 | N |
| 4 | P | −0.623 | −0.191 | 1.000 | N |
| 5 | P | −0.617 | −0.181 | 1.000 | N |
| 6 | P | −0.610 | −0.171 | 1.000 | N |
| 7 | P | −0.602 | −0.161 | 1.000 | N |
| 8 | P | −0.593 | −0.153 | 1.000 | N |
| 9 | P | −0.583 | −0.145 | 1.000 | N |
| 10 | P | −0.574 | −0.137 | 1.000 | N |
| 11 | P | −0.564 | −0.129 | 1.000 | N |
| 12 | P | −0.554 | −0.122 | 1.000 | N |
| 13 | P | −0.545 | −0.114 | 1.000 | N |
| 14 | P | −0.536 | −0.106 | 1.000 | N |
| 15 | P | −0.526 | −0.098 | 1.000 | N |
| 16 | P | −0.517 | −0.090 | 1.000 | N |
| 17 | P | −0.508 | −0.081 | 1.000 | N |
| 18 | P | −0.498 | −0.073 | 1.000 | N |

TABLE I-continued

Non-Dimensionalized Values

| N | Side | X | Y | Z | TE? |
|---|---|---|---|---|---|
| 19 | P | −0.489 | −0.065 | 1.000 | N |
| 20 | P | −0.480 | −0.057 | 1.000 | N |
| 21 | P | −0.471 | −0.048 | 1.000 | N |
| 22 | P | −0.462 | −0.040 | 1.000 | N |
| 23 | P | −0.453 | −0.031 | 1.000 | N |
| 24 | P | −0.444 | −0.022 | 1.000 | N |
| 25 | P | −0.436 | −0.014 | 1.000 | N |
| 26 | P | −0.427 | −0.005 | 1.000 | N |
| 27 | P | −0.418 | 0.004 | 1.000 | N |
| 28 | P | −0.409 | 0.013 | 1.000 | N |
| 29 | P | −0.401 | 0.021 | 1.000 | N |
| 30 | P | −0.392 | 0.030 | 1.000 | N |
| 31 | P | −0.384 | 0.039 | 1.000 | N |
| 32 | P | −0.376 | 0.048 | 1.000 | N |
| 33 | P | −0.367 | 0.057 | 1.000 | N |
| 34 | P | −0.359 | 0.067 | 1.000 | N |
| 35 | P | −0.351 | 0.076 | 1.000 | N |
| 36 | P | −0.343 | 0.085 | 1.000 | N |
| 37 | P | −0.334 | 0.094 | 1.000 | N |
| 38 | P | −0.326 | 0.104 | 1.000 | N |
| 39 | P | −0.318 | 0.113 | 1.000 | N |
| 40 | P | −0.311 | 0.123 | 1.000 | N |
| 41 | P | −0.303 | 0.132 | 1.000 | N |
| 42 | P | −0.295 | 0.142 | 1.000 | N |
| 43 | P | −0.287 | 0.151 | 1.000 | N |
| 44 | P | −0.279 | 0.161 | 1.000 | N |
| 45 | P | −0.272 | 0.171 | 1.000 | N |
| 46 | P | −0.264 | 0.181 | 1.000 | N |
| 47 | P | −0.257 | 0.190 | 1.000 | N |
| 48 | P | −0.249 | 0.200 | 1.000 | N |
| 49 | P | −0.242 | 0.210 | 1.000 | N |
| 50 | P | −0.235 | 0.220 | 1.000 | N |
| 51 | P | −0.227 | 0.230 | 1.000 | N |
| 52 | P | −0.220 | 0.240 | 1.000 | N |
| 53 | P | −0.213 | 0.250 | 1.000 | N |
| 54 | P | −0.206 | 0.260 | 1.000 | N |
| 55 | P | −0.199 | 0.270 | 1.000 | N |
| 56 | P | −0.192 | 0.281 | 1.000 | N |
| 57 | P | −0.185 | 0.291 | 1.000 | N |
| 58 | P | −0.178 | 0.301 | 1.000 | N |
| 59 | P | −0.172 | 0.312 | 1.000 | N |
| 60 | P | −0.165 | 0.322 | 1.000 | N |
| 61 | P | −0.158 | 0.332 | 1.000 | N |
| 62 | P | −0.152 | 0.343 | 1.000 | N |
| 63 | P | −0.145 | 0.353 | 1.000 | N |
| 64 | P | −0.139 | 0.364 | 1.000 | N |
| 65 | P | −0.132 | 0.374 | 1.000 | N |
| 66 | P | −0.126 | 0.385 | 1.000 | N |
| 67 | P | −0.120 | 0.396 | 1.000 | N |
| 68 | P | −0.114 | 0.406 | 1.000 | N |
| 69 | P | −0.107 | 0.417 | 1.000 | N |
| 70 | P | −0.101 | 0.428 | 1.000 | N |
| 71 | P | −0.095 | 0.438 | 1.000 | N |
| 72 | P | −0.089 | 0.449 | 1.000 | N |
| 73 | P | −0.083 | 0.460 | 1.000 | N |
| 74 | P | −0.078 | 0.471 | 1.000 | N |
| 75 | P | −0.072 | 0.482 | 1.000 | N |
| 76 | P | −0.066 | 0.493 | 1.000 | N |
| 77 | P | −0.060 | 0.504 | 1.000 | N |
| 78 | P | −0.055 | 0.515 | 1.000 | N |
| 79 | P | −0.049 | 0.526 | 1.000 | N |
| 80 | P | −0.044 | 0.537 | 1.000 | N |
| 81 | P | −0.038 | 0.548 | 1.000 | N |
| 82 | P | −0.033 | 0.559 | 1.000 | N |
| 83 | P | −0.027 | 0.570 | 1.000 | N |
| 84 | P | −0.022 | 0.581 | 1.000 | N |
| 85 | P | −0.017 | 0.592 | 1.000 | N |
| 86 | P | −0.011 | 0.603 | 1.000 | N |
| 87 | P | −0.006 | 0.615 | 1.000 | N |
| 88 | P | −0.001 | 0.626 | 1.000 | Y |
| 89 | P | 0.004 | 0.637 | 1.000 | Y |
| 90 | P | 0.006 | 0.641 | 1.000 | Y |
| 91 | P | 0.008 | 0.643 | 1.000 | Y |
| 92 | P | 0.010 | 0.645 | 1.000 | Y |
| 93 | P | 0.013 | 0.647 | 1.000 | Y |
| 94 | P | 0.016 | 0.647 | 1.000 | Y |
| 95 | P | 0.019 | 0.646 | 1.000 | Y |
| 96 | P | 0.022 | 0.644 | 1.000 | Y |
| 97 | P | 0.024 | 0.641 | 1.000 | Y |
| 98 | P | 0.024 | 0.638 | 1.000 | Y |
| 99 | S | −0.630 | −0.227 | 1.000 | N |
| 100 | S | −0.629 | −0.240 | 1.000 | N |
| 101 | S | −0.625 | −0.251 | 1.000 | N |
| 102 | S | −0.620 | −0.263 | 1.000 | N |
| 103 | S | −0.613 | −0.273 | 1.000 | N |
| 104 | S | −0.606 | −0.283 | 1.000 | N |
| 105 | S | −0.597 | −0.292 | 1.000 | N |
| 106 | S | −0.588 | −0.300 | 1.000 | N |
| 107 | S | −0.578 | −0.307 | 1.000 | N |
| 108 | S | −0.568 | −0.314 | 1.000 | N |
| 109 | S | −0.558 | −0.321 | 1.000 | N |
| 110 | S | −0.547 | −0.326 | 1.000 | N |
| 111 | S | −0.535 | −0.331 | 1.000 | N |
| 112 | S | −0.523 | −0.335 | 1.000 | N |
| 113 | S | −0.512 | −0.338 | 1.000 | N |
| 114 | S | −0.499 | −0.340 | 1.000 | N |
| 115 | S | −0.487 | −0.342 | 1.000 | N |
| 116 | S | −0.475 | −0.342 | 1.000 | N |
| 117 | S | −0.462 | −0.342 | 1.000 | N |
| 118 | S | −0.450 | −0.341 | 1.000 | N |
| 119 | S | −0.438 | −0.339 | 1.000 | N |
| 120 | S | −0.426 | −0.336 | 1.000 | N |
| 121 | S | −0.414 | −0.332 | 1.000 | N |
| 122 | S | −0.402 | −0.328 | 1.000 | N |
| 123 | S | −0.391 | −0.324 | 1.000 | N |
| 124 | S | −0.380 | −0.318 | 1.000 | N |
| 125 | S | −0.369 | −0.313 | 1.000 | N |
| 126 | S | −0.358 | −0.307 | 1.000 | N |
| 127 | S | −0.348 | −0.300 | 1.000 | N |
| 128 | S | −0.338 | −0.293 | 1.000 | N |
| 129 | S | −0.328 | −0.286 | 1.000 | N |
| 130 | S | −0.318 | −0.278 | 1.000 | N |
| 131 | S | −0.308 | −0.270 | 1.000 | N |
| 132 | S | −0.299 | −0.262 | 1.000 | N |
| 133 | S | −0.290 | −0.254 | 1.000 | N |
| 134 | S | −0.281 | −0.245 | 1.000 | N |
| 135 | S | −0.273 | −0.236 | 1.000 | N |
| 136 | S | −0.265 | −0.227 | 1.000 | N |
| 137 | S | −0.257 | −0.217 | 1.000 | N |
| 138 | S | −0.249 | −0.208 | 1.000 | N |
| 139 | S | −0.241 | −0.198 | 1.000 | N |
| 140 | S | −0.234 | −0.188 | 1.000 | N |
| 141 | S | −0.227 | −0.178 | 1.000 | N |
| 142 | S | −0.220 | −0.168 | 1.000 | N |
| 143 | S | −0.213 | −0.158 | 1.000 | N |
| 144 | S | −0.206 | −0.147 | 1.000 | N |
| 145 | S | −0.200 | −0.137 | 1.000 | N |
| 146 | S | −0.194 | −0.126 | 1.000 | N |
| 147 | S | −0.188 | −0.115 | 1.000 | N |
| 148 | S | −0.182 | −0.104 | 1.000 | N |
| 149 | S | −0.176 | −0.093 | 1.000 | N |
| 150 | S | −0.171 | −0.082 | 1.000 | N |
| 151 | S | −0.166 | −0.071 | 1.000 | N |
| 152 | S | −0.160 | −0.060 | 1.000 | N |
| 153 | S | −0.155 | −0.049 | 1.000 | N |
| 154 | S | −0.150 | −0.037 | 1.000 | N |
| 155 | S | −0.146 | −0.026 | 1.000 | N |
| 156 | S | −0.141 | −0.014 | 1.000 | N |
| 157 | S | −0.136 | −0.003 | 1.000 | N |
| 158 | S | −0.132 | 0.009 | 1.000 | N |
| 159 | S | −0.128 | 0.020 | 1.000 | N |
| 160 | S | −0.124 | 0.032 | 1.000 | N |
| 161 | S | −0.119 | 0.043 | 1.000 | N |
| 162 | S | −0.115 | 0.055 | 1.000 | N |
| 163 | S | −0.112 | 0.067 | 1.000 | N |
| 164 | S | −0.108 | 0.078 | 1.000 | N |
| 165 | S | −0.104 | 0.090 | 1.000 | N |
| 166 | S | −0.100 | 0.102 | 1.000 | N |
| 167 | S | −0.097 | 0.114 | 1.000 | N |
| 168 | S | −0.093 | 0.126 | 1.000 | N |
| 169 | S | −0.090 | 0.138 | 1.000 | N |
| 170 | S | −0.086 | 0.149 | 1.000 | N |

TABLE I-continued

Non-Dimensionalized Values

| N | Side | X | Y | Z | TE? |
|---|---|---|---|---|---|
| 171 | S | −0.083 | 0.161 | 1.000 | N |
| 172 | S | −0.080 | 0.173 | 1.000 | N |
| 173 | S | −0.076 | 0.185 | 1.000 | N |
| 174 | S | −0.073 | 0.197 | 1.000 | N |
| 175 | S | −0.070 | 0.209 | 1.000 | N |
| 176 | S | −0.067 | 0.221 | 1.000 | N |
| 177 | S | −0.064 | 0.233 | 1.000 | N |
| 178 | S | −0.061 | 0.245 | 1.000 | N |
| 179 | S | −0.058 | 0.257 | 1.000 | N |
| 180 | S | −0.055 | 0.269 | 1.000 | N |
| 181 | S | −0.052 | 0.281 | 1.000 | N |
| 182 | S | −0.049 | 0.293 | 1.000 | N |
| 183 | S | −0.046 | 0.305 | 1.000 | N |
| 184 | S | −0.043 | 0.317 | 1.000 | N |
| 185 | S | −0.041 | 0.329 | 1.000 | N |
| 186 | S | −0.038 | 0.341 | 1.000 | N |
| 187 | S | −0.035 | 0.353 | 1.000 | N |
| 188 | S | −0.032 | 0.365 | 1.000 | N |
| 189 | S | −0.030 | 0.377 | 1.000 | N |
| 190 | S | −0.027 | 0.389 | 1.000 | N |
| 191 | S | −0.024 | 0.401 | 1.000 | N |
| 192 | S | −0.022 | 0.413 | 1.000 | N |
| 193 | S | −0.019 | 0.425 | 1.000 | N |
| 194 | S | −0.017 | 0.437 | 1.000 | N |
| 195 | S | −0.014 | 0.449 | 1.000 | N |
| 196 | S | −0.011 | 0.461 | 1.000 | N |
| 197 | S | −0.009 | 0.473 | 1.000 | N |
| 198 | S | −0.006 | 0.486 | 1.000 | N |
| 199 | S | −0.001 | 0.510 | 1.000 | N |
| 200 | S | 0.001 | 0.522 | 1.000 | N |
| 201 | S | 0.004 | 0.534 | 1.000 | N |
| 202 | S | 0.006 | 0.546 | 1.000 | N |
| 203 | S | 0.009 | 0.558 | 1.000 | N |
| 204 | S | 0.011 | 0.570 | 1.000 | N |
| 205 | S | 0.014 | 0.582 | 1.000 | N |
| 206 | S | 0.016 | 0.594 | 1.000 | N |
| 207 | S | 0.019 | 0.606 | 1.000 | N |
| 208 | S | 0.021 | 0.619 | 1.000 | N |
| 209 | S | 0.024 | 0.631 | 1.000 | Y |
| 210 | S | 0.024 | 0.635 | 1.000 | Y |
| 211 | S | 0.024 | 0.638 | 1.000 | Y |

Embodiments of the disclosure provide various technical and commercial advantages, examples of which are discussed herein. Embodiments of the disclosed airfoil shape provide a unique profile to achieve, for example: 1) improvements in aerodynamic performance attributable to the airfoil geometry(ies) described herein, including those defined in TABLE I; 2) similar improvements in turbomachine power output attributable to better aerodynamic performance as compared to conventional airfoils; 3) additional space for placement of cooling circuits and hence higher cooling capacity and help to make the cooling holes more drillable; 4) stronger mechanical integrity attributable to the shape of airfoil 130, cooling features defined therein, etc.; and 5) aeromechanic properties stemming from the geometrical features of airfoil 130 and/or other technical advantages discussed herein. The disclosed loci of points defined in TABLE I allow GT system 100 or any other suitable turbine system to run in an efficient, safe and smooth manner. As also noted, any scale of the disclosed airfoil 130 may be adopted as long as: 1) interaction between other stages in turbine 108 (FIGS. 1, 2); 2) aerodynamic efficiency; and 3) normalized aerodynamic and mechanical blade and/or airfoil loadings, are maintained in the turbomachine(s) where embodiments of the disclosure are implemented.

Airfoil 130 described herein thus improves overall GT system 100 efficiency. Airfoil 130 also meets all aeromechanical and stress requirements. Nozzle structure 112 described herein has very specific aerodynamic design requirements. Significant cross-functional design effort was required to meet these design goals. Airfoil 130 of nozzle structure 112 thus possesses a specific shape to meet aerodynamic, mechanical, and heat transfer requirements in an efficient and cost effective manner.

The apparatus and devices of the present disclosure are not limited to any one particular turbomachine, engine, turbine, jet engine, power generation system or other system, and may be used with other turbomachines such as aircraft systems, power generation systems and/or related systems (e.g., combined cycle, simple cycle, nuclear reactor, etc.). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for contemplating embodiments with various modifications as are suited to a particular use.

We claim:

1. A nozzle structure adapted for placement within a flowpath of a turbomachine, the nozzle structure comprising:

an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region; and an endwall connected with the root region or the tip region of the airfoil along the suction side, the pressure side, the trailing edge, and the leading edge, wherein the trailing edge of the airfoil has an elliptical shape having a nominal profile substantially in accordance with Cartesian coordinate values of X, Y, and Z set forth in TABLE I, wherein the Cartesian coordinate values are non-dimensional values of from 0% to 100% convertible to distances by multiplying values by a height of the airfoil expressed in units of distance, and wherein X and Y values connected by arcs define airfoil profile sections at each distance Z along at least a portion of the airfoil, the profile sections at the Z distances being joined with each other to form the nominal profile.

2. The nozzle structure of claim 1, wherein the nozzle structure is within a stationary vane of the turbomachine.

3. The nozzle structure of claim 2, wherein the nozzle structure is adapted for installation within a first stage of a turbine.

4. The nozzle structure of claim 1, further comprising a fillet connecting a surface of the endwall to a surface of the airfoil.

5. The nozzle structure of claim 1, wherein the shape having the nominal profile substantially in accordance with the Cartesian coordinate values of X, Y, and Z in TABLE I includes the airfoil profile sections defined within approximately 5% and approximately 95% of the height of the airfoil.

6. The nozzle structure of claim 1, wherein the shape having the nominal profile substantially in accordance with the Cartesian coordinate values of X, Y, and Z in TABLE I includes the airfoil profile sections defined within approximately 10% and approximately 90% of the height of the airfoil.

7. The nozzle structure of claim 1, wherein each of the suction side and the pressure side of the airfoil has a shape having a respective nominal profile substantially in accordance with Cartesian coordinate values of X, Y and Z set forth in TABLE I, wherein the Cartesian coordinate values are non-dimensional values of from 0% to 100% convertible to distances by multiplying the values by the height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the respective nominal profiles.

8. A turbine section for a turbomachine, the turbine section comprising:
at least one nozzle structure having:
an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region; and
an endwall connected with the root region or the tip region of the airfoil along the suction side, the pressure side, the trailing edge, and the leading edge,
wherein the trailing edge of the airfoil has an elliptical shape having a nominal profile substantially in accordance with Cartesian coordinate values of X, Y, and Z set forth in TABLE I, wherein the Cartesian coordinate values are non-dimensional values of from 0% to 100% convertible to distances by multiplying values by a height of the airfoil expressed in units of distance, and wherein X and Y values connected by arcs define airfoil profile sections at each distance Z along at least a portion of the airfoil, the profile sections at the Z distances being joined with each other to form the nominal profile.

9. The turbine section of claim 8, wherein the turbine section is a first stage of the turbomachine.

10. The turbine section of claim 8, further comprising a fillet connecting a surface of the endwall to a surface of the airfoil.

11. The turbine section of claim 8, wherein the shape having the nominal profile substantially in accordance with the Cartesian coordinate values of X, Y, and Z in TABLE I includes the airfoil profile sections defined within approximately 5% and approximately 95% of the height of the airfoil.

12. The turbine section of claim 8, wherein the shape having the nominal profile substantially in accordance with the Cartesian coordinate values of X, Y, and Z in TABLE I includes the airfoil profile sections defined within approximately 10% and approximately 90% of the height of the airfoil.

13. The turbine section of claim 8, wherein each of the suction side and the pressure side of the airfoil has a shape having a respective nominal profile substantially in accordance with Cartesian coordinate values of X, Y and Z set forth in TABLE I, wherein the Cartesian coordinate values are non-dimensional values of from 0% to 100% convertible to distances by multiplying the values by the height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the respective nominal profiles.

14. A turbine comprising a plurality of nozzle structures, each of the plurality of nozzle structures comprising:
a nozzle structure within a flowpath of the turbine, the nozzle structure comprising:
an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region; and
an endwall connected with the root region or the tip region of the airfoil along the suction side, the pressure side, the trailing edge, and the leading edge,
wherein the trailing edge of the airfoil has an elliptical shape having a nominal profile substantially in accordance with Cartesian coordinate values of X, Y, and Z set forth in TABLE I, wherein the Cartesian coordinate values are non-dimensional values of from 0% to 100% convertible to distances by multiplying values by a height of the airfoil expressed in units of distance, and wherein X and Y values connected by arcs define airfoil profile sections at each distance Z along at least a portion of the airfoil, the profile sections at the Z distances being joined with each other to form the nominal profile.

15. The turbine of claim 14, wherein the plurality of nozzle structures is disposed in a first stage of a turbomachine.

16. The turbine of claim 14, further comprising a fillet connecting a surface of the endwall to a surface of the airfoil.

17. The turbine of claim 14, wherein the shape having the nominal profile substantially in accordance with the Cartesian coordinate values of X, Y, and Z in TABLE I includes the airfoil profile sections defined within approximately 5% and approximately 95% of the height of the airfoil.

18. The turbine of claim 14, wherein the shape having the nominal profile substantially in accordance with the Cartesian coordinate values of X, Y, and Z in TABLE I includes the airfoil profile sections defined within approximately 10% and approximately 90% of the height of the airfoil.

19. The turbine of claim 14, wherein the nozzle structure is within a stationary vane of the turbine.

20. The turbine of claim 14, wherein each of the suction side and the pressure side of the airfoil has a shape having a respective nominal profile substantially in accordance with Cartesian coordinate values of X, Y and Z set forth in TABLE I, wherein the Cartesian coordinate values are non-dimensional values of from 0% to 100% convertible to distances by multiplying the values by the height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the respective nominal profiles.

* * * * *